United States Patent

Imoto

[11] Patent Number: 5,264,948
[45] Date of Patent: Nov. 23, 1993

[54] IMAGE READ DEVICE

[75] Inventor: Yoshiya Imoto, Kanagawa, Japan

[73] Assignee: Fuji Xerox Co., Ltd., Tokyo, Japan

[21] Appl. No.: 549,173

[22] Filed: Jul. 6, 1990

[30] Foreign Application Priority Data

Jul. 8, 1989 [JP] Japan .................. 1-176122

[51] Int. Cl.$^5$ .............................. H04N 1/024
[52] U.S. Cl. ...................... 358/474; 355/55; 358/487
[58] Field of Search ............... 358/497, 486, 481, 75, 358/474, 471, 487; 359/381; 355/55

[56] References Cited

U.S. PATENT DOCUMENTS

| | | | |
|---|---|---|---|
| 4,656,525 | 4/1987 | Norris | 358/75 |
| 4,819,035 | 4/1989 | Arai et al. | 355/55 |
| 4,901,157 | 2/1990 | Ohmori | 358/474 |
| 5,099,275 | 3/1992 | Hicks | 355/55 |

FOREIGN PATENT DOCUMENTS 2-137574 5/1990 Japan.
2-145085 6/1990 Japan.

Primary Examiner—Edward L. Coles, Sr.
Assistant Examiner—Jerome Grant, II
Attorney, Agent, or Firm—Finnegan, Henderson, Farabow, Garrett & Dunner

[57] ABSTRACT

An image read device in which an optical scan mechanism is disposed between an original and a read sensor. The optical scan mechanism comprises a plurality of mirrors for transmitting an optical image of an image on the original, a first optical lens for platen (platen lens) for focusing the optical image on the read sensor, and a second optical lens for film projector (F/P lens) for focusing a film projection image on the read sensor. In a platen mode, an image read from an original is focused on the read sensor by the first optical lens. In an F/P mode, an image from a film is focused on the read sensor by the second optical lens. A good image can be read without degrading the modulation transfer function.

17 Claims, 50 Drawing Sheets

→ - - - → : SERIAL COMMUNICATION INTERFACE

←——→ : INTERMODULAR COMMUNICATION INTERFACE

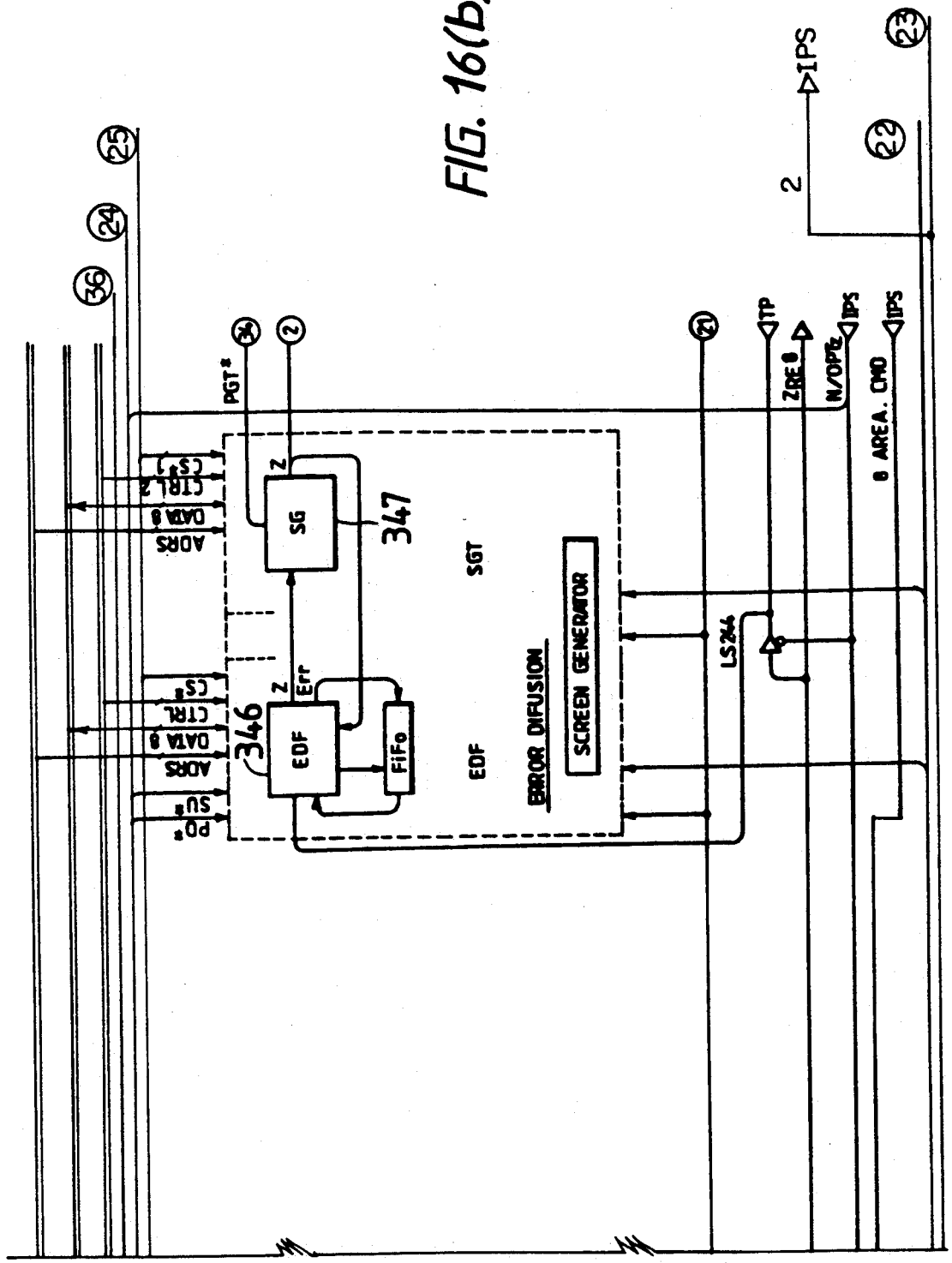

Y (MAIN SCAN DIRECTION)
X (SUBSIDIARY SCAN DIRECTION)

IMAGE READ DEVICE

BACKGROUND OF THE INVENTION

1. Field of the Invention

The present invention relates to an image read device of a reduction optical system for inputting image data, such as digital copying machine, facsimile, and printer, and more particularly to an image read device of the reduction optical system for inputting image data projected from a film projector.

2. Description of the Related Art

There has been proposed a copying machine with an image read device of the reduction optical system. This type of the image read device is made up of an exposure lamp for radiating an original to form an optically read image (optical image), a mirror unit for transmitting the optical image, which includes a full rate mirror (FRM) and a half rate mirror (HRM), and an optical lens for reducing the size of the optical image transmitted through the mirror unit and focusing it on an organic photosensitive belt.

Recently, digital color copying machines have been studied and developed. The applicant of the present patent application also proposed an inventive digital copying machine in Japanese Patent Application No. 63-292195, for example. The proposed digital copying machine is provided with an image input terminal (IIT). The IIT optically reads an image on an original in terms of three primary colors, red (R), green (G), and blue (B), and converts optical image information of those colors into electrical digital signals representative of optical density.

The IIT is made up of an imaging unit, a drive means for moving the imaging unit, and an electrical hardware. The imaging unit includes an exposure lamp, a rod lens array for reading an image on an original, and a CCD line sensor, and optically reads the image by scanning the original. The hardware applies converting processing to the read signals derived from the CCD line sensor.

Since the digital color copying machine digitally processes the image signals, various types of processings can easily be performed, and therefore provides color copies of high quality.

In the digital color copying machine, attempt has been made to make a copy of an image recorded in a film, as disclosed in Japanese Patent Application No. 63-299359, filed by the present applicant.

The imaging unit of the IIT in the digital color copying machine is of the closed type, and hence its structure is relatively large. In the light of space saving, it is desirable that the size of the device is as small as possible.

To this end, the possibility exists that the image read device of the reduction type is applied for the IIT of the digital color copying machine. In designing a digital copying machine based on the possibility, if the film projector is simply used, the resultant color copying machine uses two optical lenses, an optical lens in the film projector and an optical lens for focusing an image in the IIT. As a result, a modulation transfer function (MTF) of a copy of a film image from the film projector is reduced.

In such a copying machine, a mirror unit is additionally used which is for projecting a film image on a platen glass by the film projector. Because of this mirror unit, the size of the film projector is proportionally increased.

SUMMARY OF THE INVENTION

Accordingly, an object of the present invention is to provide an image read device which can read a film image without degrading the MTF, and can reduce the size of the device.

Another object of the present invention is to provide an image read device which allows use of a filter projector as small as possible.

To solve the above problems, in the present invention, an optical scan mechanism including a plurality of mirrors for transmitting an optical image of an image on an original and an optical lens for platen (platen lens) for focusing the optical image on a read sensor, is disposed between the original and the read sensor. An optical lens for film projector (F/P lens) for focusing a film projection image on the read sensor is further contained in the optical scan mechanism. In the present invention, when the image read device is in a platen mode, an image read from an original is focused on a CCD sensor by the platen lens. In an F/P mode, an image from a film is focused on the CCD sensor by the F/P lens.

It is noted that the optical lenses exclusively used for the platen mode and the F/P mode are separately provided. With this feature, a good image read is ensured without degrading the MFT. Since the image read device of the reduction type is used, there is no need of providing an imaging lens in the F/P. This fact allows a mirror to be provided in the F/P main body. In other words, there is no need for the mirror unit provided separately from the F/P main body. Accordingly, the F/P per se can be made compact.

DETAILED DESCRIPTION OF THE INVENTION

The present invention will be described in detail by using some specific embodiments in connection with the accompanying drawings.

CONTENTS

The embodiment description in this specification is divided into the following sections and subsections. Sections I and II describe an overall system of a color copying machine to which an image read device according to the present invention is applied. Section III describes in detail the embodiments of an image read device according to the present invention.

(I) INTRODUCTION
  (I-1) System Configuration
  (I-2) Functions and Features
    (A) Functions
    (B) Features
    (C) Use Distinction
  (I-3) Electrical Control System
    (A) Hardware Architecture and Software Architecture
    (B) State Division
(II) SYSTEM DETAILS
  (II-1) System Configuration
  (II-2) Image Processing System (IPS)
    (A) IPS Modules
    (B) IPS Hardware
  (II-3) Image Output Terminal (IOT)
    (A) General
    (B) Transfer Loop
  (II-4) User Interface (U/I)
    (A) Use of Color Display
    (B) System Configuration
    (C) Effective Use of Display Screen
    (D) Hard Control Panel
(III) IMAGE READ DEVICE
  (III-1) Outline
    (A) Simultaneous Movement of Platen Lens and F/P Lens
    (B) F/P Lens Contained IIT
    (C) Optical Lens Contained F/P
  (III-2) Video Signal Processing System
    (A) Circuit Arrangement
    (B) Operation
    (C) Read Data Adjustment
  (III-3) IIT Control
  (III-4) Control Flow in F/P Mode
  (III-5) Operation Procedure in F/P Mode and Signal Timings

(I) INTRODUCTION

(I-1) System Configuration

Figure 2:
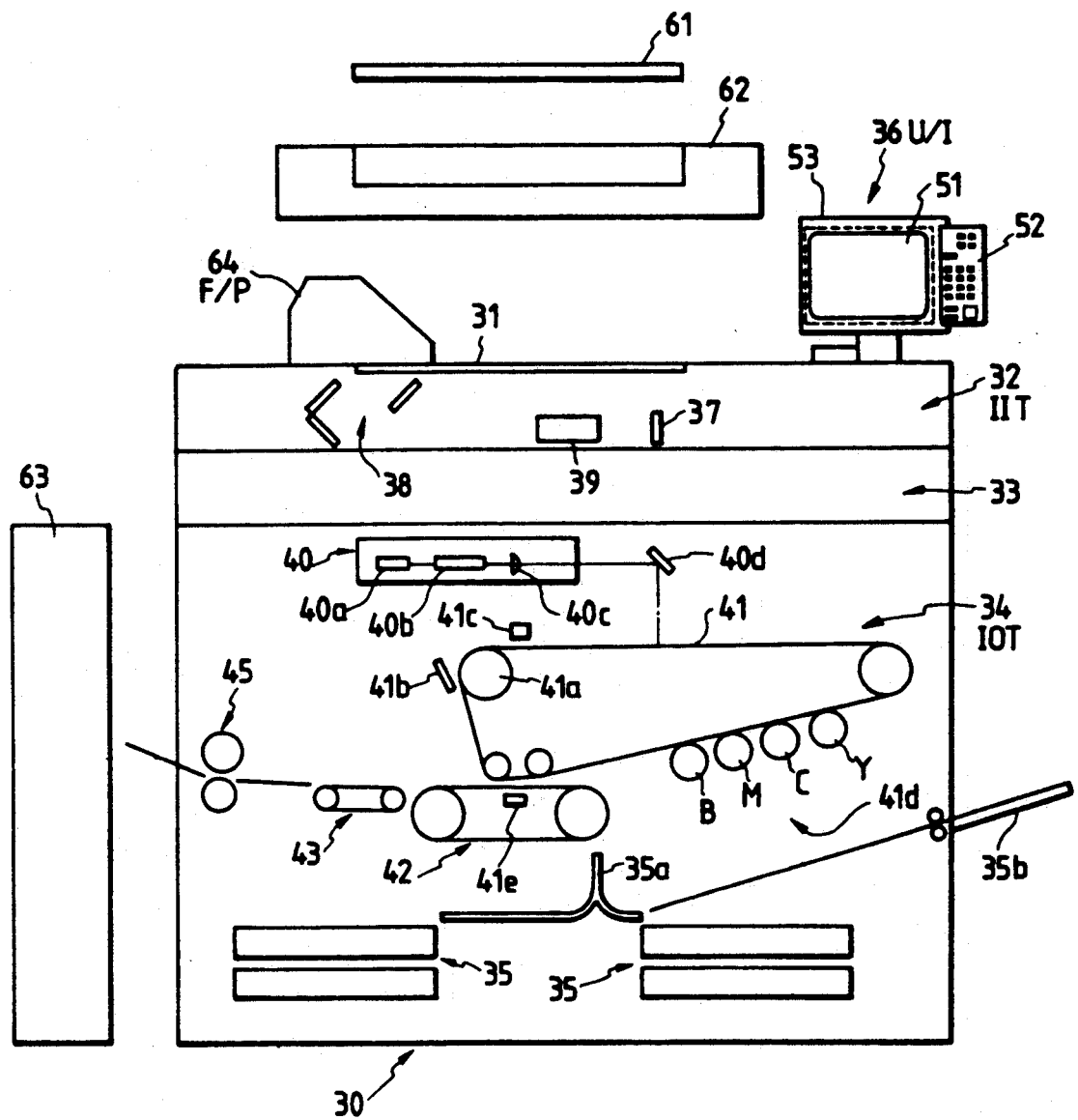
FIG. 2 is a longitudinal sectional view showing an overall structure of the color copying machine.

FIG. 2 shows a configuration of a color copying machine into which the present invention is incorporated.

In the color copying machine incorporating the present invention, a base machine 30 is made up of a platen glass 31, image input terminal (IIT) 32, electric control housing 33, image output terminal (IOT) 34, tray 35, and user interface (U/I) 36. The base machine 30 optionally includes an edit pad 61, auto document feeder (ADF) 62, sorter 63, and film projector (F/P) 64.

An electrical hardware is required for controlling the IIT, IOT, U/I, etc. The electrical hardware is divided into a plurality of circuit sections with different signal/data processing functions, such as IIT, IPS for processing the output image signals of the IIT, U/I, and F/P. These circuit sections are assembled into circuit boards, respectively. Together with an SYS board for controlling the above circuit boards, and an MCB (machine control board) for controlling the IOT, ADF, sorter, etc., these circuit boards are housed in the electrical control housing 33.

The IIT 32 is made up of a read sensor 37, such as a CCD sensor, and an optical scan mechanism including a plurality of scan mirrors 38 and an optical lens 39 for focusing an optical image on the read sensor 37. The IIT 32 reads a color image on an original in terms of image signals of the primary colors, blue (B), green (G) and red (R), by using color filters, and converts them into digital image signals, and sends the separated color image signals to an image processing system (IPS).

In the IPS, the B, G and R signals from the IIT 32 are converted into toner primary colors yellow (Y), cyan (C), magenta (M), and black (K). The Y, C, M and K signals are subjected to various processings for improving the reproducibility of color, gradation, definition, and the like. Further, the gradation toner signal of each process color is converted into an on/off or two-level toner signal, and the two-level signals are transferred to the IOT 34.

In the IOT 34 containing a scanner 40 and a photosensitive belt 41, a laser output unit 40a converts the image signals from the IPS into light signals. The light signals travel an optical path including a polygon mirror 40b, F/θ lens 40c and reflecting mirror 40d, and reaches the photosensitive belt 41, and forms a latent image corresponding to the original image on the surface of the belt. The photosensitive belt 41 is driven by a drive pulley 41a. A cleaner 41b, charger 41c, developing units 41d for the primary colors Y, M, C and K, and a transfer unit 41e are disposed around the belt 41. A tow roll loop 42 is disposed close to the transfer unit 41e, as shown. The tow roll transfer loop 42 picks up a sheet of paper as is transported along a paper transfer path 35a from a tray 35, and in cooperation with the transfer unit transfers color toners on the paper. In the case of the full color copy of the 4 pass color type, the tow roll loop is turned four times, and the color toners are transferred on the paper in the order of Y, M, C and K. The paper bearing the transferred color toner image is transported through a vacuum transfer belt 43 to a fixing or fusing unit 45, and then is ejected outside the base machine. If necessary, a single sheet inserter (SSI) 35b may feed a sheet of paper to the paper transfer path 35a.

The U/I 36 is used by a user when he selects a desired function and sets up the conditions to exercise the function. The U/I 36 is provided with a color display 51, and a hard control panel 52 located by the display. In combination with an infrared-ray touch board 53, it enables the user to directly designate necessary functions by soft buttons on the display screen.

The option units available for the base machine follows. The first optional unit is an edit pad 61 as a coordinates input device, which is placed on the platen glass 31. The edit pad enables a user to variously edit images with the aid of a pen or by a memory card. Further, the ADF 62 and the sorter 63 may optionally be used.

According to the instant embodiment, a color image can be read directly from a color film in a manner that a film image is formed on the platen glass 31 by the light projected by the F/P 64, and an optical image as projected is read for each of the primary colors, R, G and B by the read sensor 37 with the aid of the optical scan mechanism. The original to be copied may contain negative films, reversal films, and the like.

(I-2) Functions and Features

(A) Functions

The color copying machine according to the present invention has various types of functions meeting user's needs, and is operable in a complete automated manner, throughout the copying process. A display unit, for example, a CRT, that is is used in the user interface, visually presents select of various functions, select of the conditions to exercise the selected functions, and other necessary menus. Any person including highly skilled persons and beginners may make an easy access to the copying machine.

One of the major functions of the color copying machine consists of hard control panel select operations of items that are out of operation flows, such as start, stop, all clear, ten keys, interrupt, information, and languages, and selective operations of the respective functions by touching soft buttons in a basic display. Touching a pathway tab of a pathway as a function select area allows an operator to select any of various types of edit functions, such as marker edit, business edit, and creative edit. With such functions, any operator can operate the color copying machine for copies of both the mono color and full color in a simple and easy way as operating the conventional copying machine.

The copying machine of the present invention is featured by the full color or 4-pass color copying function, but is operable in the 3-pass color or black copy mode, if necessary.

In respect to paper feed, an automatic paper size select and a paper size designation are possible.

Reduction/enlargement is possible in a broad range from 50% to 400% with steps of 1%. Additional functions are to independently set the magnifications of the horizontal and vertical sides of an image and to automatically select the magnification.

An optimum copy density can be automatically set for the mono color original.

When a color original is copied, an auto color balance mode may be used, in which a user may designate a subtractive color.

A memory card storing job programs is used for making an access to the job programs. A maximum of eight jobs can be stored in the memory card. The memory card has a memory capacity of 32 K bytes. Other jobs than that of the film projector mode can be programmed.

Additional functions are a copy output, copy sharpness, copy contrast, copy position, film projector, page programing, and margin.

In the case of the copying machine or copier coupled with a sorter optionally available, when an uncollated mode is selected, the copy output function operates and hence a maximum adjusting function operates to set a set number of copies within a maximum number of copies which a bin of the sorter can accommodate.

In regard with the copy sharpness to effect the edge emphasis, a manual sharpness adjustment mode of seven steps and a photo sharpness adjustment mode of photo, character, print, and photo/character are optionally provided. The default is a tool pathway and may be set appropriately.

The copy contrast may be set with seven steps by an operator. The default is the tool pathway, and may be set appropriately.

The copy position is for selecting a position on a sheet of paper where an image is to be copied. An auto centering function to set the center of a copied image at the center of the sheet is optionally used. The default is the auto centering.

The film projector enables images of various types of films to be copied. Any of the following modes can be selected; projections of 35 mm negative and positive films, 35 mm negative film platen placement, 6 cm×6 cm slide platen placement, and 4 in×4 in slide platen placement. In the film projector mode, paper of A4 size is automatically selected unless the paper size is designated. The film projector pop-up has a color balancer. When the color balancer is set to "Reddish", the projected image is tinged with red. When it is set to "Bluish", the image is tinged with blue. Particular auto and manual density controls are used.

The page programming function comes in four varieties; a covering function to attach a front/back cover or a front cover to the copies, an insert function to insert a white sheet or a color sheet into a stack of copies, a color mode in which a color mode is set up every page, and a paper size select function in which a desired paper tray, together with the color mode, is selected every page.

The margin function is for setting a margin of the copy with the steps of 1 mm in the range of 0 to 30 mm. The margin can be set to only one side for one original.

The marker edit edits the image within an area enclosed by a marker. This function is directed to the edition of documents and treats the documents as black and white documents. In a black mode, a designated area on the document is painted color of the palette on the CRT, while the other area than the designated one is painted black. In a reddish black mode, an image on the document is painted red, while the remaining area is painted reddish black. The marker edit has the functions of trim, mask, color mesh, and black-to-color. The specific area may be designated by depicting a closed loop on the document, or by using ten keys or the edit pad. This is also applied to the area designation in the editing functions to be given later.

The trim functions to allow the image within a marked area to be copied in mono color, but to prevent the image outside the marked area from being copied, viz., to erase the image outside the marked area.

The mask functions to erase the image within a marked area, but to copy the image outside the marked area in mono color.

When the color mesh mode is exercised, a designated color mesh pattern is placed on a marked area and an image is copied in mono color. The color of the color mesh may be selected from among eight (8) standard colors (predetermined colors) and eight (8) registered colors (registered by a user, and eight different colors can be selected from 16,700,000 colors and registered simultaneously). A mesh pattern can be selected from among four patterns.

In the black-to-color mode, the image within the marked area can be copied with a color selected from the 8 standard colors and the 8 registered colors.

The business edit is mainly applied for business documents and quickly edits high quality originals. In this mode, the originals are treated as full color originals. The area or point designation is required for all the functions. A plurality of different functions can be simultaneously set for a single original. In a black/mono color mode, the image outside the specified area is black or mono color, while the black image within the specified area is changed to the palette color on the CRT display. In a reddish black mode, the image outside the specified area is colored in reddish black, while the image within that area is colored in red. The business edit, like the marker edit, is exercised in a variety of modes, such as trim, mask, color mesh, black-to-color, and further logotype, line, paint 1, correction, and function clear.

The logotype mode is exercised to insert a logotype such as a symbol mark at a specified point on an image. Two types of logotypes may be vertically or horizontally inserted. In this case, one logotype is allowed to be used for one original. The logo patterns are prepared in accordance with the client's request and stored into a ROM.

The line mode is provided to depict lines in two-dot expression vertically and horizontally with respect to the x-distance. The color of the line may be selected from the 8 standard colors and the 8 registered colors. The number of lines that can be designated is infinity. The number of colors that can be used simultaneously is seven colors.

In the paint 1 mode, one point within an area defined by a closed loop is designated, and that area is entirely painted with one color selected from among the 8 standard colors and the 8 registered colors. When a plurality of loops are used, the painting is carried out for each area.

The mesh can be selected from four patterns for each area. The number of loops that can be designated is infinite. Up to seven color mesh patterns can be used.

The correction function confirms, corrects, changes, and erases the matters concerning an area as specified, and executes these functions by using three operation modes, an area/point change mode, area/point correction, and area/point cancel mode. The area/point change mode confirms and changes the set functions for each area. The area/point correction mode changes the area size, and changes the point position with steps of 1 mm. The area/point cancel mode erases the specified area.

The creative edit is exercised by using many functions including an image composition, copy-on-copy, color composition, partial display change, multi-page enlargement, paint 1, color mesh, color change, negative/positive inversion, repeat, paint 2, density control, color balance, copy contrast, copy sharpness, color mode, trim, mask, mirror image, margin, line, shift, logotype, split scan, correction, function clear, and add function. In the creative edit mode, the original is treated as a color original. A plurality of functions can be set for one document. Different functions may be used for one area. The area may be specified in a rectangular by a two-point designation and in a point by a one-point designation.

In the image composition mode, a base original is color copied through the 4-cycle color copying operation. The resultant copied paper is left on the transfer belt. Then, a trimmed original is superposedly copied on the copied paper through the 4-cycle copying operation. Finally, the paper thus copied is delivered outside.

In the copy-on-copy mode, a first original is copied through the 4-cycle color copying operation. The resultant copied paper is left on the transfer belt. Then, a second original is superposedly copied on the copied paper through the 4-cycle copying operation. Finally, the paper thus copied is delivered outside.

In the color composition mode, a first original is copied using magenta toner, and the copied paper is left on the transfer belt. A second original is superposedly copied on the first copied paper, using cyan, and the copied paper is fixedly placed there. Finally, a third original is superposedly copied on the second copied paper, using yellow. In a 4-color composition mode, a fourth original is superposedly copied on the third copied paper, using black.

In the partial display shift, after a color copy is obtained through the 4-cycle color copying operation, the color copied paper is left on the transfer belt. Subsequently, another copy is superposed on the first paper through the 4-cycle copying operation. Finally, the paper thus copied is delivered outside.

Of those color modes, the full color mode is based on the 4-cycle copying operation. The 3-pass color mode is based on the 3-cycle copying operation in other modes than the editing mode. The black mode is based on the 1-cycle copying operation in other modes than the editing mode. The plus-one mode is based on the 1- to 3-cycle copying operations.

The tool pathway mode is exercised by using many functions including an auditron, machine setup, default selection, color registration, film type registration, color correction, preset, film projector scan area correction, audio tone, timer set, billing meter, diagnosis mode, max. adjustment, and a memory card formatting. In this pathway mode, a password is needed for making settings and changes. Accordingly, only key operators and customer engineers are permitted to make the settings/changes in this mode. Use of the diagnosis mode is permitted for customer engineers alone.

The color registration is used for registering colors in the register color button in the color palette. The CCD sensor reads the color to be registered from the color original.

The color correction is used for a fine correction of the colors registered in the register color button.

The film type registration is for registering a register film type used in a film projector mode. When it is not registered, a register button cannot be selected on the film projector mode display.

The preset mode is for presetting reduction/enlargement values, 7 steps of copy density, 7 steps of copy sharpness, and 7 steps of copy contrast.

The film projector scan area correction is for adjusting a scan area in the film projector mode.

The audio tone is for adjusting a volume of a select sound, for example.

The timer is for setting a timer releasable to key operators.

Some additional functions are provided for a trouble system. A first function is used when the subsystem is placed in a clashing state. In such a situation, this function operates and re-drives the subsystem to recover it from the clashing state. A second function is used when the subsystem is still in the clashing state even if the clash recovery is applied two times. In such a situation, this function operates to set up a fault mode in the subsystem. A third function operates when jamming occurs in the copying machine. In this case, the third function operates to stop the machine operation.

It is evident that the color copying machine of the present invention is operable with the combination of basic copying function and additional function, and the combination of the basic copying function/additional function and marker edit, business edit, creative edit, and the like.

A copying system including the color copying machine with the above functions offers advantageous and convenient features as described hereinafter.

(B) Features a) High quality full color

A high quality full color providing a clear and distinctive color image of a color document is attained, with improvements of black image reproduction, light color reproduction, generation copy quality, OHP image quality, thin line reproduction, image quality reproduction of film copies, and copied image sustaining.

b) Cost reduction

Cost of image forming materials and expendables such as a photosensitive drum, developing unit and toner is reduced. Service cost including UMR and parts cost is reduced. The color copying machine is operable as a mono color copying machine. The copying speed for mono color copies is increased about three times that of the conventional copying machine, and is 30 copies/A4. In this respect, the running cost is reduced.

c) Improved productivity

Input/output devices such as an ADF and a sorter are optionally available, and hence a large number of documents can be copied. A magnification may be set in a broad range of 50% to 400%. A maximum size of document that can be copied is A3. Three stages of paper trays are used, the upper tray accommodating B5 to B4 size, the medium tray accommodating B5 to B4, and the lower tray accommodating B5 to A3 and SSIB5 to A3. The copy speed for the full color (4-pass color) copy is 4.5CPM for A4, 4.8CPM for B4, and 2.4CPM for A3. The copy speed for the mono color copy is 19.2CPM for A4, 19.2CPM for B4, and 9.6CPM for A3. A warm-up time is within 8 minutes. FCOT is 28 seconds or less for the 4-color full color copy, and 7 seconds or less for the mono color copy. A continuous copy speed is 7.5 copies/A4 for the full color copy and 30 copies/A4 for the mono color copy.

d) Improved operability

Two types of operation buttons are used, hard buttons on the hard control panel and soft buttons on the soft panel of the CRT display screen. Use of these buttons provides an easy operation for beginners and simple operation for experts, and further enables operators to directly select desired functions. As for the layout of controls including these buttons, the controls are concentrated at one location for ease of operations. Effective use of colors correctly sends necessary information to operators. A high fidelity copy can be obtained by using the operations on the hard control panel and the basic display. The hard button is used for the operations out of an operation flow, such as start, stop, all clear, and interrupt. The operations on the soft panel of the basic display are used for paper size select, reduction/enlargement, copy density, picture quality adjustment, color mode, color balance adjustment, and the like. Such soft panel operations would smoothly be accepted by users accustomed to the mono color copying machine. To access the various edit functions, a pathway is opened by merely touching a pathway tab in a pathway area on the soft panel, and an operator may readily access the edit modes. Storage of copy modes and conditions for exercising them in a memory card realizes an automation of relation manual operations.

e) Variety of functions

A variety of editing functions can be used by touching a pathway tab in the pathway area on the soft panel to open the pathway. In the marker edit, mono color documents can be edited by using a tool of a marker. In the business edit, mainly business documents can be prepared quickly and in high quality. In the creative edit, various editing functions are available. In the full color, black and mono color copy modes, many choices are used, meeting the needs by various expertized operators, such as designers, men engaging in copy service business, and professional key operators. The area specified when the editing functions are used is displayed in the form of bit map area, providing a visual confirmation of the specified area. With such various editing functions and color creation, a smart expression by sentences is secured.

f) Power saving

A high performance color copying machine of the full color (4-pass color) realized by the present invention is operable at 1.5 kVA. A control system realizing the 1.5 kVA specification in the respective operation modes is decided. A power distribution to the circuit systems for different functions is also decided. An energy transmission system table for confirming energy transmission systems is prepared. The management and verification of power consumption are carried out by using the energy transmission system table.

(C) Use Distinction

The color copy machine of the present invention is operable as a full color copying machine and a mono color copying machine. The operations of the copying machine is easy for unexpertized operators and simple for expertized operators. The copying machine with a variety of useful functions is used not only as a mere copying machine, but also as a machine to aid the creative work. Accordingly, the copying machine satisfies the requirements by professional operators and artists as well. Use of the copying machine may be made distinctive. Some examples of the use of the color copying machine will be given.

Posters, calenders, cards or invitations cards, and New Year's cards with photograph that have been formed by a printing machine, may be formed at much lower cost than by the printing machine, if the number of each of these items is not so large. If the editing functions are well used, original calenders, for example, may be made according to your preference. Further, the calenders may be prepared for each division of a company, while those have uniformly printed for the whole company.

As seen from recent marketing of industrial products, for example, electric appliances, and interior, the coloring of the products and interior greatly influences the marketing figures. The color copying machine of the present invention can offer a necessary number of colored designs at the manufacturing stage of products. Accordingly, a plurality of persons including designers and persons relating to the manufacturing and selling the products can satisfactorily study and discuss the designs for producing products attractive to the market, while seeing the colored design copies. Particularly in apparel business, the present color copying machine is very useful. In this field of business, the order for manufacturing the products, i.e. dress and its garments, is sometimes given to remote markers concerned. In ordering this, the complete designs with necessary colors can be sent to the makers. Accordingly, the order is exact and the work of manufacturing the order products is smoothly and effectively carried out.

It is noted that the color copying machine of the present invention is operable as both the full color copying machine and the mono color copying machine. Therefore, it is possible to copy one original in necessary number of copies of the two types, color copies and mono color copies. This feature is very convenient for the students who are learning the chromatics in colleges and universities. When studying a graphic design, they can copy the design in both the color and mono color copies, and comparatively study the design. With the comparative study, the fact that in red, gray is in almost uniform level is clearly seen. Further, they know how a gray level and a saturation affect the visual sensation.

(I-3) Electrical Control System

This section will handle hardware architecture, software architecture and state division in an electrical control system of the color copying machine according to the present invention.

(A) Hardware Architecture and Software Architecture

When a color CRT is used as an U/I as in the present color copying machine, an amount of data for color display is increased than when a monochromatic display is used. Attempt to build a friendlier UI by contriving a display layout on the display and display transitions also brings about an increase of the amount of necessary data.

Use of a CPU with a large memory would be possible, if required, but it requires a large board. The large board creates additional problems. It is difficult to house it in the base machine. The large board makes it difficult to alter the design of the copying machine. Further, it increases the cost to manufacture.

To cope with the increase of data amount, in the present color copying machine, the data processing functions (CPUs) are decentralised in such a way that the techniques, such as the CRT control, that can be used in common with other models or machines, are handled in the form of remotes.

Figure 3:
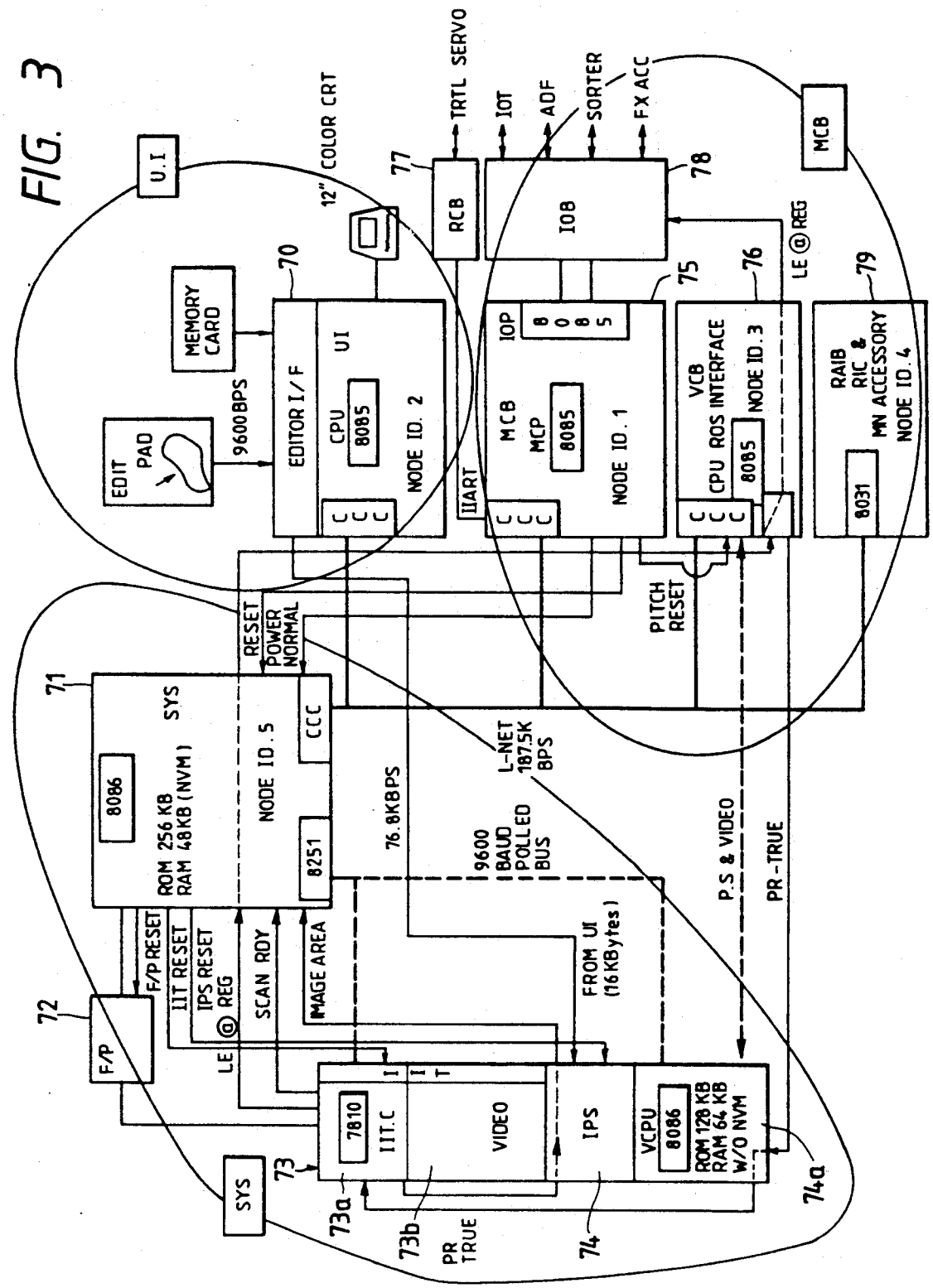
FIG. 3 is a diagram showing a hardware architecture.

A hardware of the electrical system, as shown in FIG. 3, is categorized into three systems, a UI system, SYS system and MCB system. The UI system contains a UI remote 70 alone. In the SYS system, an F/P remote 72 for controlling the F/P, IIT remote 73 for reading an image of an original, and an IPS remote 74 for executing various image processings are operated in a decentralized manner. The IIT remote 73 includes an IIT controller 73a for controlling the imaging unit, and a VIDEO circuit 73b for digitizing a read image signal and transferring the digitized image signal to the IPS remote 74. The IIT remote 73, and the IPS remote 74 as well are controlled by a VCPU 74a. The SYS (system) remote 71 is provided for synthetically controlling the respective remotes as mentioned above and to be given later.

The SYS remote 71 requires a memory of a large memory capacity, because a program for controlling the display transitions of the UI, and others must be stored. 8086 containing a 16-bit microprocessor is used for the SYS remote 71. If required, 68000 may be used.

The MCB system is composed of a VCB (video control board) remote 76, RCB remote 77, IOB remote 78, and an MCB (master control board) remote 75. The VCB remote 76, serving as a raster output scan (ROS) interface, receives from the IPS remote 74 a video signal to form a latent image on the photosensitive belt by a laser beam, and sends the video signal to the IOT. The RCB remote 77 controls a servo system of the transfer belt (turtle). The IOB remote 78 serves as an I/O port for the IOT, ADF, sorter, and accessories. The MCB (master control board) remote 75 synthetically controls those remotes.

Each remote in the drawing of FIG. 3 is mounted on a single board. In the figure, a bold continuous line indicates a high speed communication network LNET of 187.5 kbps; a bold broken line, a master/slave serial communication network of 9600 bps; and thin continuous lines, hot lines as transmission lines for control signals. A line 76.8 kbps indicates a line exclusively used for transmitting graphic information as depicted on the edit pad, copy mode data entered from the memory card, and graphic data in the edit area from the UI remote 70 to the IPS remote 74. CCC (communication control chip) indicates an IC for supporting a protocol for the high speed communication line LNET.

As described above, the hardware architecture is composed of the UI system, SYS system, and MCB system. The processings shared by those systems will be described with reference to a software architecture of FIG. 4. Arrows indicate the directions of data transmission through the high speed communication network LNET of 187.5 kbps and the master/slave serial communication network of 9600 bps, and the directions of control signals flowing through the hot lines.

The UI remote unit 70 is made up of an LLUI (low level UI) module 80 and a module (not shown) for the processing of the edit pad and the memory card. The LLUI module 80, that is similar to a so-called CRT controller, is a software module for displaying an image on a color CRT display. Images to be displayed and how to display them are determined and controlled by an SYSUI module 81 and an MCBUIT module 86. As seen from the above, the UI remote unit can be used in common with other models and apparatus. The reason for this is that how to lay out the display screen and how to change the display are determined by the apparatus used, but the CRT controller is used in combination with the CRT.

The SYS remote unit 71 is made up of three modules, SYSUI module 81, SYSTEM module 82, and SYS.-DIAG module 83.

The SYSUI module 81 is a software module for controlling the display change or transition. The SYSTEM module 82 contains a software for recognizing coordinates as selected on the software panel and a display presenting the selected coordinates, viz., an F/F (feature function) select software recognizing a job as selected, a job check software to finally check as to if there is a contradiction in the conditions for copy job execution, and a software for controlling the transfer of various types of data, such as F/F select, job recovery, and machine states, with other modules.

The SYS.DIAG module 83 operates in a customer simulation mode in which the copying operation is done in a diagnostic state for self-test. In the customer simulation mode, the color copying machine under discussion operates as it operates in a normal copying operation mode. Accordingly, the DIAG module 83 is substantially the same as the SYS.DIAG module 82, but it is used in a special state, or the diagnostic state. For this reason, the DIAG module 83 and the SYSTEM module 82 are separated, but partially overlap in the drawing.

An IIT module 84 for controlling a stepping motor used in the imaging unit is contained in the IIT remote unit 73. An IPS module 85 for executing various processings is contained in the IPS remote unit 74. These modules are controlled by the SYSTEM module 82.

The MCB remote unit 75 contains software modules, such as an MCBUI module 86 as a software for controlling display changes in the diagnostic mode, auditron mode, and fault state such as jamming, an IOT module 90 for executing the processings necessary for the copying operation, such as photosensitive belt control, developing unit control, and fuser control, an ADF module 91 for controlling the ADF, a SORTER module 92 for controlling a sorter, a copier executive module 87 for managing the above software modules, a dia. executive module 88 for executing various diagnoses, and an auditron module 89 for charge calculation that is made by accessing an electronic counter with a password.

The RCB remote unit 77 contains a turtle servo module 93 for controlling an operation of the turtle. The module 93 is under control of the IOT module 90, in order to control the transfer process in the Zerography cycle. In drawing, the copier executive module 87 and the dia. executive module 88 are depicted partially overlapping with each other. The reason for this is the same as that for the partial overlapping of the SYSTEM module 82 with the SYS.DIAG module 83.

Figure 5A:
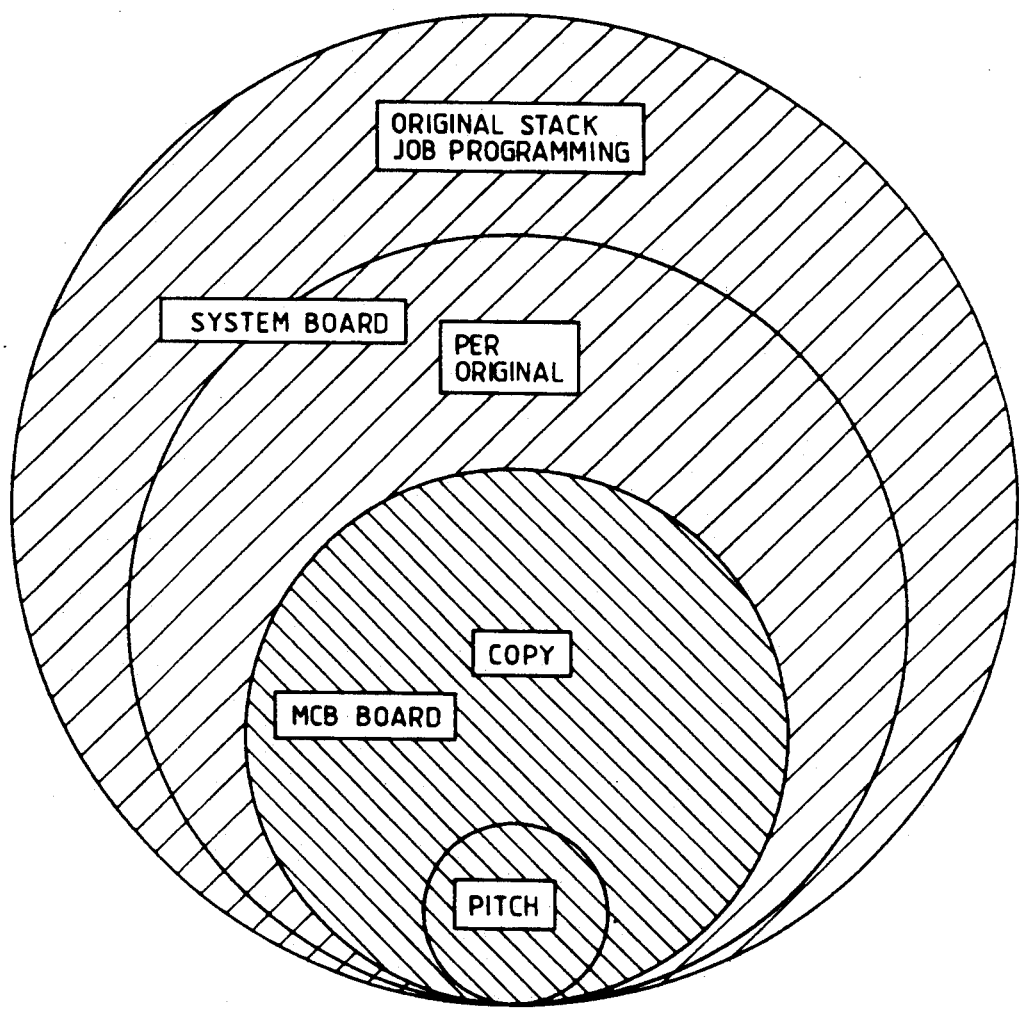
FIGS. 5(a) through 5(e) are diagrams showing copy layers.

The shared processings will be described while tracing a sequential flow of a copying operation. The copying operation, except the difference of colors, consists of repetitive similar operations, and hence it may be divided into some layers, as shown in FIG. 5(a).

A unit of operation, called a pitch, is repeated to make a sheet of color copy. The operation for copying a mono color copy may consist of processings how to operate the developing unit, transfer unit, and the like, and how to detect jamming. The repetitive applications of a sequence of the pitch processings to three colors Y, M and C makes a three-pass color copy. When it is applied to four colors Y, M, C and K, a four-pass color copy is made. This sequence of copying operations forms a copy layer. In the copy layer, the toners of three colors are transferred to the paper, the transferred color toner image is fused, and the copy paper or the paper bearing the fused color image is delivered outside the base machine. The processing up to this point is managed by the copier executive module 87.

Figure 4:
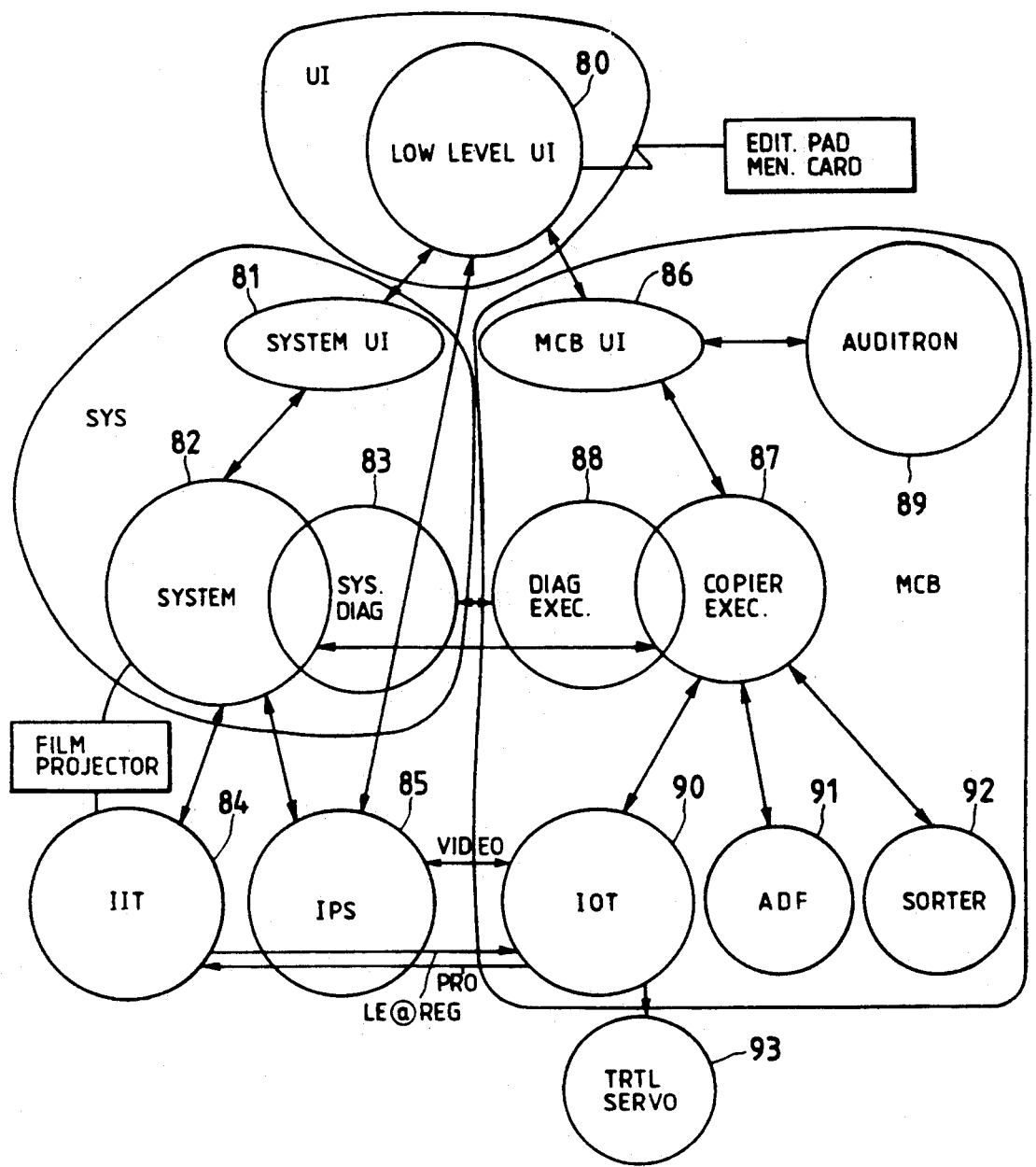
FIG. 4 is a diagram showing a software architecture.

The IIT module 84 and the IPS module 85 in the SYS system are also used in the stage of the pitch processings. To this end, the IOT module 90 communicates with the IIT module 84 by using two types of signals, a PR-TRUE signal and a LE@REG signal, as shown in FIGS. 3 and 4. More specifically, a PR (pitch reset) signal providing a reference timing for the control of the IOT is recursively generated by the MCB every time the photosensitive belt rotates by ½ or ⅓ turns. To attain an effective use and increase a copy speed, the motion pitch of the photosensitive belt is divided in accordance with the size of paper. For example, for paper of A3 it is driven at the rate of 2 pitches, and for paper of A4, it is driven at the rate of 3 pitches. The period of the PR signal generated every pitch is long, 3 sec. for the 2-pitch rate, and is short, 2 sec. for the 3-pitch rate.

The PR signal generated by the MCB is distributed to the necessary portions within the IOT, such as a VB remote handling mainly the VIDEO signal, by way of the hot lines.

The VCB, containing a gate circuitry, selects only the pitch signal allowing the imaging within the IOT, viz., allowing the photosensitive belt to be exposed to an image light, and sends it to the IPS remote. This signal is a PR-TRUE signal. The data to generate the PR-TRUE signal is transferred from the MCB through the LNET on the basis of the PR signal that is received through the hot line from the MCB.

During the period that the image cannot be projected on the photosensitive belt, an idle pitch of 1 pitch is involved in the photosensitive belt. No PR-TRUE signal is outputted for such an idle pitch. As such a pitch requiring generation of no PR-TRUE signal, one may enumerate a period from an instant that the transfer unit has eliminated the transferred copy paper till the next paper reaches the transfer unit. In the case of a long paper of A3 size, for example, if it is eliminated from the transfer unit immediately after the toner image transfer onto the paper is completed, the leading end of the paper hits the entrance of the fuser. At this time, the paper is shocked and with the shock, the transferred toner image is possibly damaged. To avoid this problem, following completion of the image transfer on the large paper, the paper is rotated by one turn at a constant speed while being held by a grip bar to be given later, and then is transferred to the next stage. It is for this reason that the skip of 1 pitch is required for the photosensitive belt motion.

No PR-TRUE signal is generated also during a period from the copy start by a start key till a cycle-up sequence is completed, because during this period, the reading of an original image is not yet carried out and hence the photosensitive belt cannot be exposed to an image light.

The PR-TRUE signal outputted from the VCB remote is received by the IPS remote, and is also applied to the IIT remote. In the IIT remote, it is used as a trigger signal for scan start of the IIT.

The pitch processings in the IIT remote and the IPS remote may be synchronized with the operation of the IOT. At this time, a video signal to modulate a laser beam that is used for forming a latent image on the photosensitive drum is transferred between the IPS remote and the VCB remote 76. The video signal received by the VCB remote 76, which is a parallel signal, is converted into a serial signal. Then, the serial signal is directly applied, as a VIDEO modulation signal, to the laser output section 40a through the ROS interface.

The above sequence of pitch operations is repeated four times, to form a 4-pass color copy, and one cycle of copying operations is completed.

The signal transmissions and the timings of them in a copying process between the outputting of image signals read by the IIT to the IOT and the image transfer on a sheet of paper at the transfer point will be described with reference to FIGS. 5(b) through 5(e).

Figure 5B:
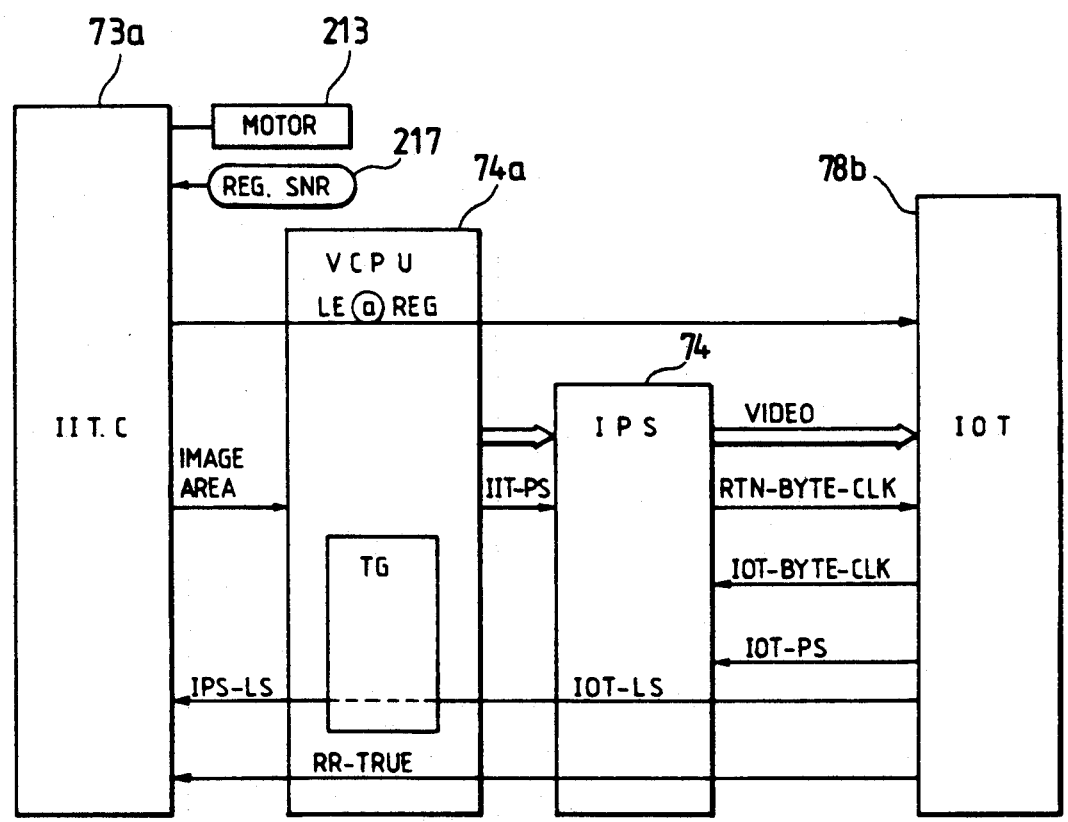
Figure 5C:
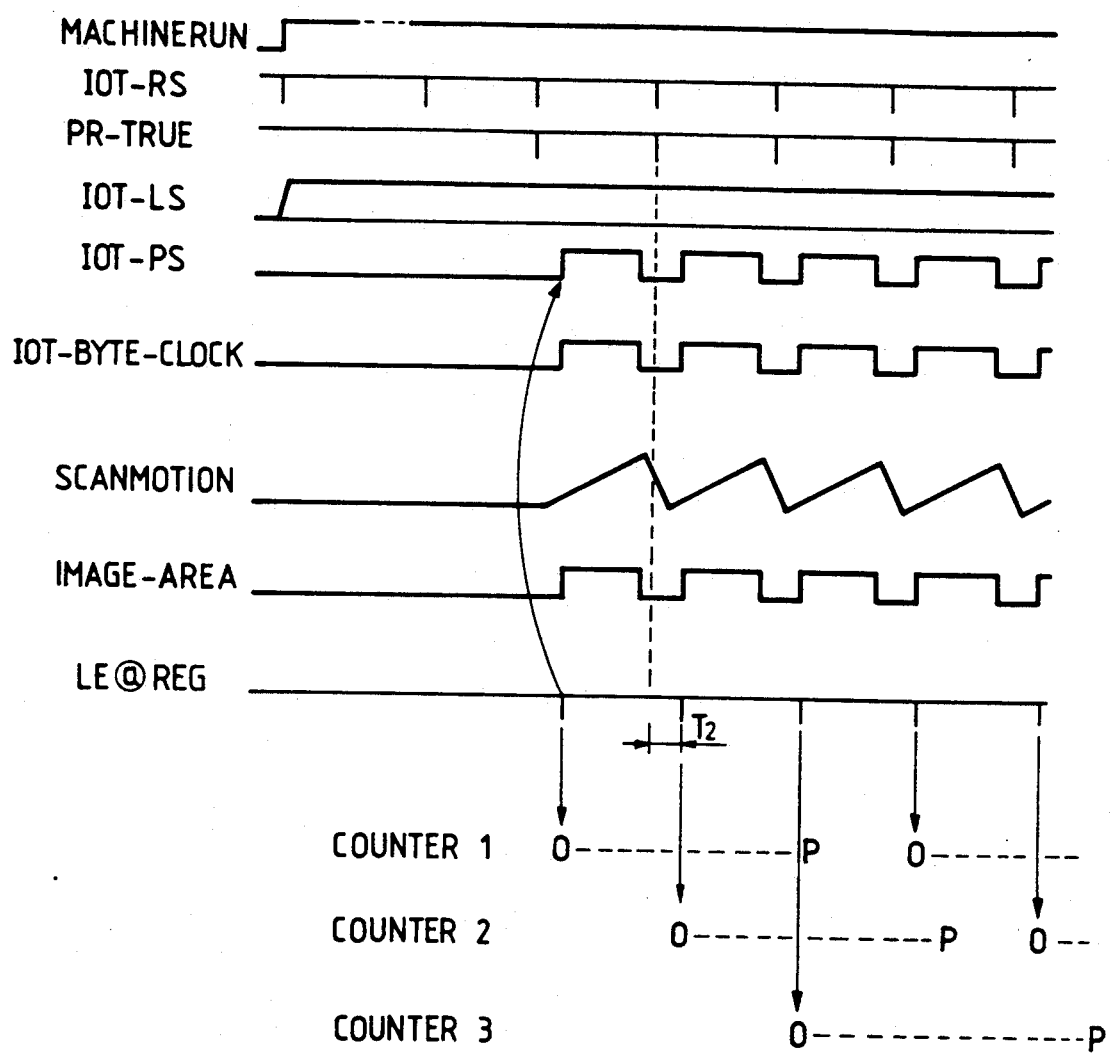
Figure 5D:
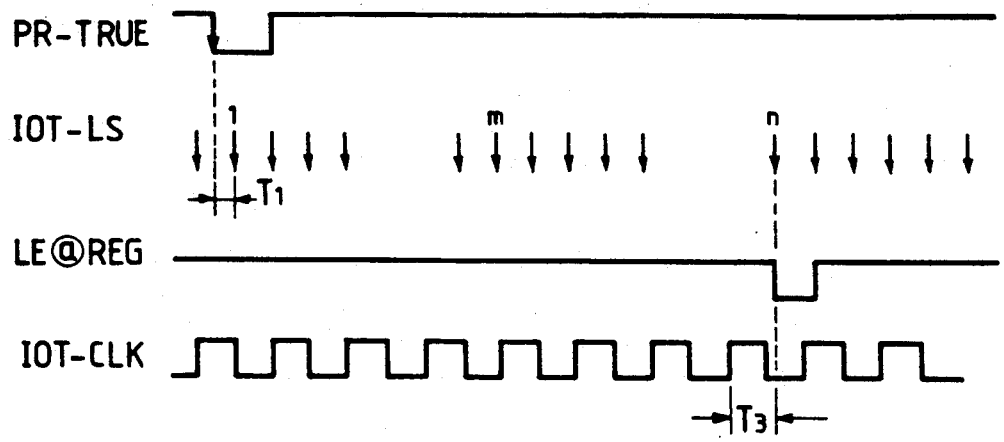

When receiving a command of a start job from the SYS remote 71, the operation of the IOT 78b enters a cycle-up sequence, such as drive of a main motor and power on of a high voltage power supply, as shown in FIGS. 5(b) and 5(c). The IOT 78b produces a PR (pitch reset) signal, in order to form a latent image of a length corresponding to a paper length on the photosensitive belt. For example, a 3-pitch PR signal is generated for the A4 size, and a 2-pitch PR signal, for the A3 size. Upon completion of the cycle-up sequence in the IOT 78b, a PR-TRUE signal is applied to the IIT controller 73a in synchronism with the PR signal, in connection with only the pitch requiring the imaging.

From the IOT 78b, an IOT-LS (line sink) signal outputted every one-line rotation of the ROS (raster output scan) is sent to a timing generator (TG) in the VCPU74a. An IPS-LS whose phase is apparently advanced by a delay corresponding to a total of pipe lines of the IPS with respect to the IOT-LS signal, is transferred to the IIT controller 73a.

When receiving the PR-TRUE signal, the IIT controller 73a enables a counter, and counts the IOT-LS signal by the counter. When a count by the counter reaches a predetermined value, a stepping motor 213 for driving the imaging unit 37 is started up, and the imaging unit starts to scan an original. The counter further continues its counting, and after T2 sec., an LE@REG signal is outputted at the start position of reading the original, and is sent to the IOT 78b.

In respect to the read start position, a position of a reginsor 217 (near the reg. position, more exactly located at a position separated by about 10 mm from the reg. position toward the scan side) is detected, and a true reg. position is calculated using the detected position of the reginsor 217. At the same time, a normal stop position (home position) can also be calculated. The reg. positions of the copying machines differ from one another due to a mechanical dispersion. To cope with this, the corrected values are stored in an NVM (non-volatile memory). When the true reg. position and the home position are calculated, the stored values are used for their correction, thereby to obtain a correct original start position. The corrected value may be altered through the electrical re-programming it in factories or by servicemen. The reason why the position of the reginsor 217 is separated by about 10 mm from the true reg. position toward the scan side is that for easing the adjustment and simplifying a software, a minus value can be always used for the correction.

The IIT controller 73a outputs an IMAGE-AREA signal in synchronism with the signal LE@REG. A length of the IMAGE AREA signal is equal to the scan length that is defined by a start command transferred from the SYSTEM module 82 to the IIT module 84. More specifically, when a document size is detected for the copying operation, the scan length is equal to the document length. When a magnification is designated for the copying operation, the scan length is determined by a divisor of a copy paper length and a magnification (100% is set at 1). The IMAGE-AREA signal is applied to the VCPU 74a. The VCPU 74a outputs it as an IIT-PS (page sink) for transmission to the IPS 74. The IIT-PS signal indicates time to execute an image processing.

When the LE@REG signal is outputted, data of one line of the line sensor is read in synchronism with the IOT-LS signal. The data as read is transferred to the VIDEO circuit (FIG. 3) where it is subjected to various correction processings and the A/D conversion. The output data signal of the VIDEO circuit is then transferred to the IPS 74. In the IPS 74 transfers the video data of one line to the IOT 78b in synchronism with the IOT-LS signal. At this time, a signal RTN-BYTE-CLK, together with the data, is returned to the IOT, and the data and clock are also delayed, thereby to secure a reliable synchronism.

When the signal LE@REG is inputted to the IOT78b, the video data is transferred to the ROS in synchronism with the IOT-LS signal, so that a latent image is formed on the photosensitive belt. When receiving the signal LE@REG, the IOT 78b starts to count by the signal IOT-CLK with reference to the timing of the signal LE@REG. The servo motor of the transfer unit is controlled so that the leading end of a paper is positioned at the transfer point defined by a predetermined count. As seen from FIG. 5(d), the PR-TRUE signal generated by the rotation of the photosensitive belt is not synchronized with the IOT-LS signal outputted by the rotation of the ROS, inherently. Therefore, When the signal PR-TRUE is received, the count starts at the next IOT-LS, the imaging unit 37 is driven at a count "m", and the signal LE@REG is outputted at a count "n", the signal LE@REG is delayed by time T1 behind the signal PR-REG. A maximum of this delay is one line sink. In the case of the full color copy, the delay is accumulated and the accumulation results in a color displacement.

Figure 5E:
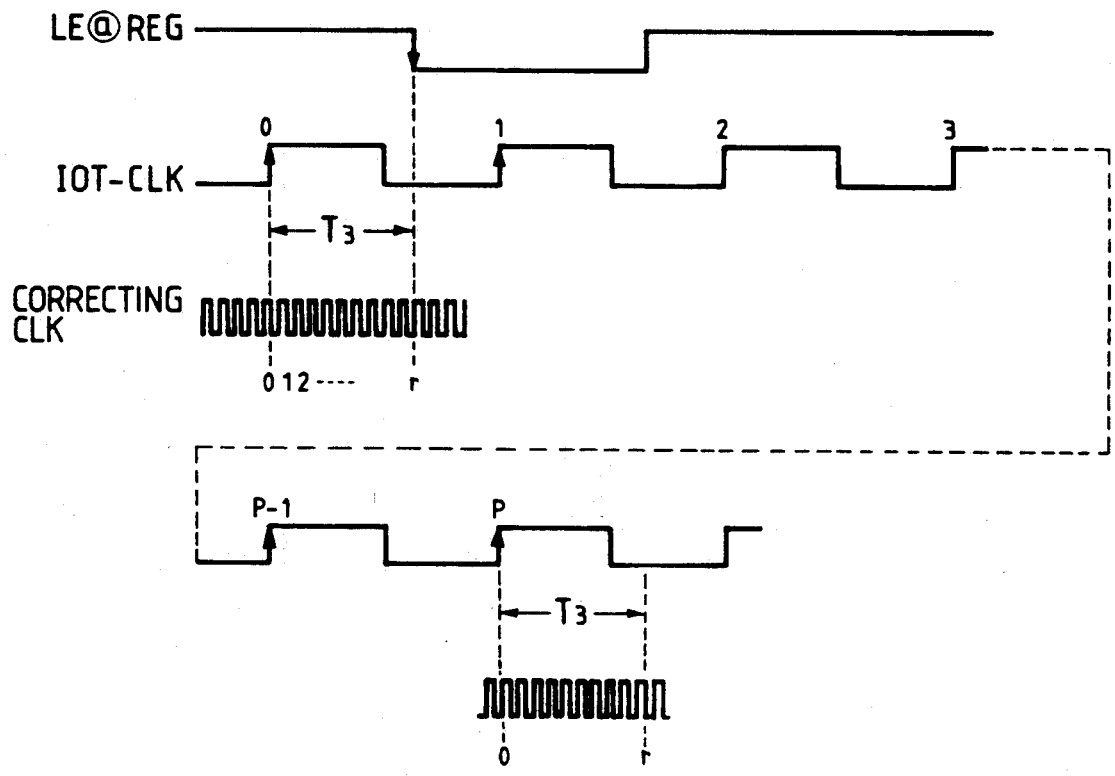

As a measure for the above, as shown in FIG. 5(c), when the first signal LE@REG reaches, the counter 1 starts to count, and when the second and third signals LE@REG reach, the counters 2 and 3 start to count. When those counters count "p" of the transfer point, the counters are cleared. For the fourth count and the subsequent ones, these counters start to count in a similarly way. As shown in FIG. 5(e), when the signal LE@REG reaches, time T3 lasting from the pulse of the IOT-CLK immediately before the signal LE@REG is counted in accordance with a correction clock. A latent image formed on the photosensitive drum approaches to the transfer point and a count by the counter based on the signal IOT-CLK reaches the count "p". At the instant that the count "p" is reached, the counting based on the correction clock starts. The sum of it and a count "r" corresponding to the time T3 indicates a correct transfer point. This is introduced into the control of the counter that is exclusively used for controlling a transfer point (timing) of the transfer unit. In this way, the servo motor of the transfer unit is controlled so that the leading end of the paper is exactly synchronized with the signal LE@REG.

Following the processings described above that are categorized into the copy layer, another processing to set the number of jobs as copy units executed for a sheet of original, viz., to set the number of copies is executed. This is executed in a per original (see FIG. 5(a)). An additional layer following the per original is a job programming layer to change parameters in jobs. More exactly, the job programming layer checks as to whether or not the ADF is used, a color of a part of an original is changed, and the one-side magnification function is operated. These layers of the per original and the job programming are managed by the SYS module 83 in the SYS system. Accordingly, the SYSTEM module 82 checks and confirms the jobs transferred from the LLUI module 80, generates necessary data, and transfers the job to the IIT module 84 and the IPS module 85 through the 9600 bps serial communication network, and also informs of the same the MCB system through the LNET.

As seen from the foregoing description, the controls that can be independently processed and can be made common with another apparatus or device are decentralised into the UI system, SYS system and MCB system. The modules for managing the copying machine are determined in accordance with the layers of the copying processings. This approach brings about many advantageous features. The design work of the electrical control system the copying machine may be classified and itemized. The developing techniques, such as software, can be standardized. The time limit of delivery and the cost to manufacture can be exactly predicted. When some specifications are changed, it is only needed to replace the related modules with other new ones. Accordingly, the developing works can be effectively executed.

(B) State Division

In the previous subsection, the shared controls of the UI system, SYS system and MCB system were described. In this subsection, the controls these systems in the respective stages of the machine operation will be described tracing a flow of the machine operation.

Figure 6:
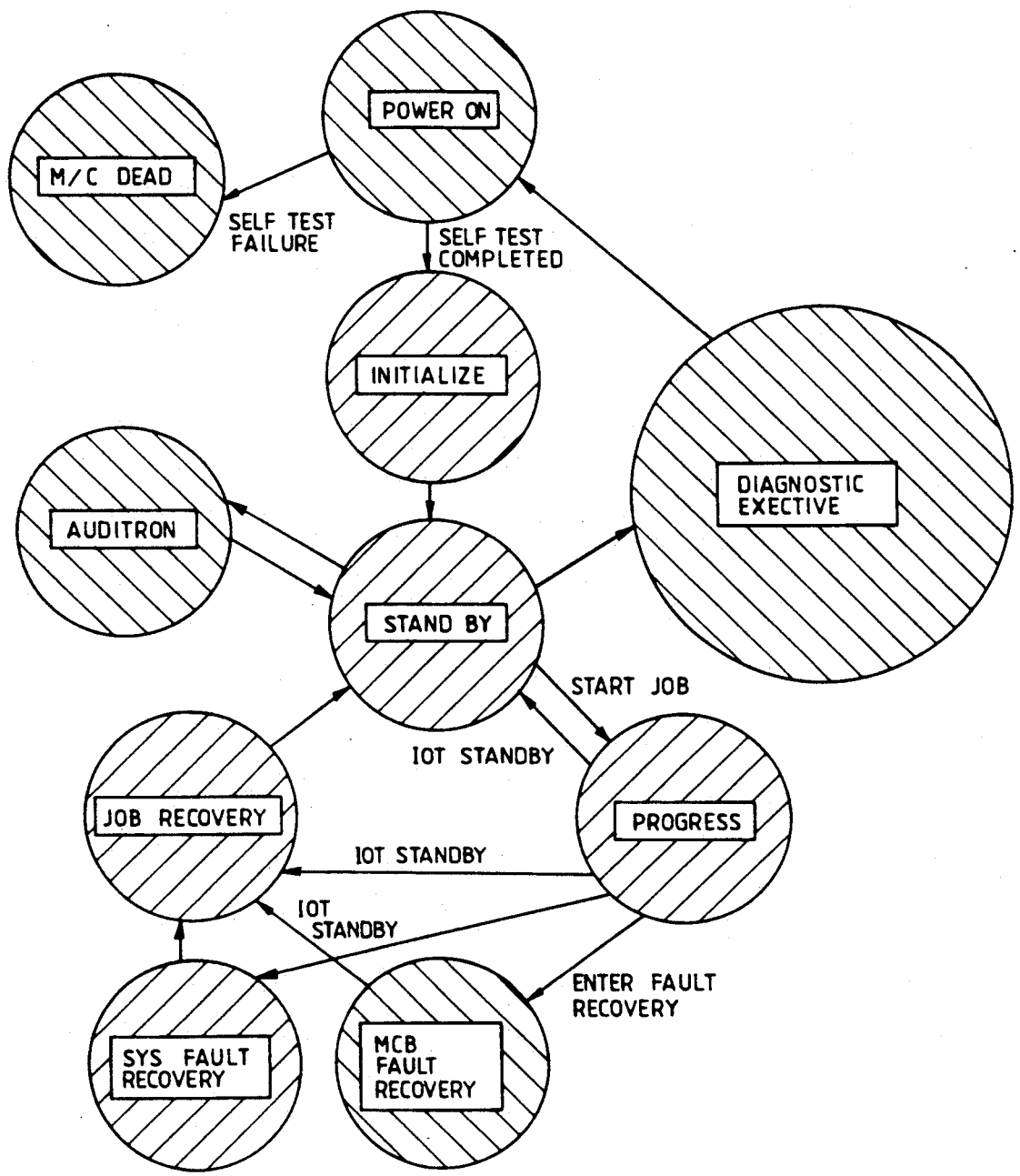
FIG. 6 is an explanatory diagram for explaining state divisions.

In the present color copying machine, a flow of machine operation including the power-on, copying operation, end of copying operation, and machine state posterior to the copying operation, are divided into a plurality of states. These states are assigned jobs, respectively. Control cannot proceed to the next state until the job in a state is completed. This ensures the good efficiency of control progression and the exactness of control. The above manner to control the machine operation is called a state division. In this instance, the machine operation is divided into states, as shown in FIG. 6.

The state division is featured in that in some operation modes, the SYS remote 71 possesses a control right to control all of the states and a UI master right to use the UI in a state, and in some control modes, the MCB remote possesses them. With the decentralization of control, the LLUI module 80 of the UI remote 70 is controlled not only by the SYSUI module but also by the MCBUI module 86. The processings are shared such that the pitch and copy processings are under control of the copier executive module 87 in the MCB system, and the per original processings and the job programming processings are controlled by the SYS module 82. Accordingly, in some states the SYS module 82 has the control right and the UI master right in some states, and in some states the copier executive module 87 has them. In FIG. 6, in states indicated by circles filled with vertical thin lines, the UI master right is possessed by the copier executive module 87 in the MCB system. In states indicated by circles painted black the UI master right is possessed by the SYS module 82.

Figure 7:
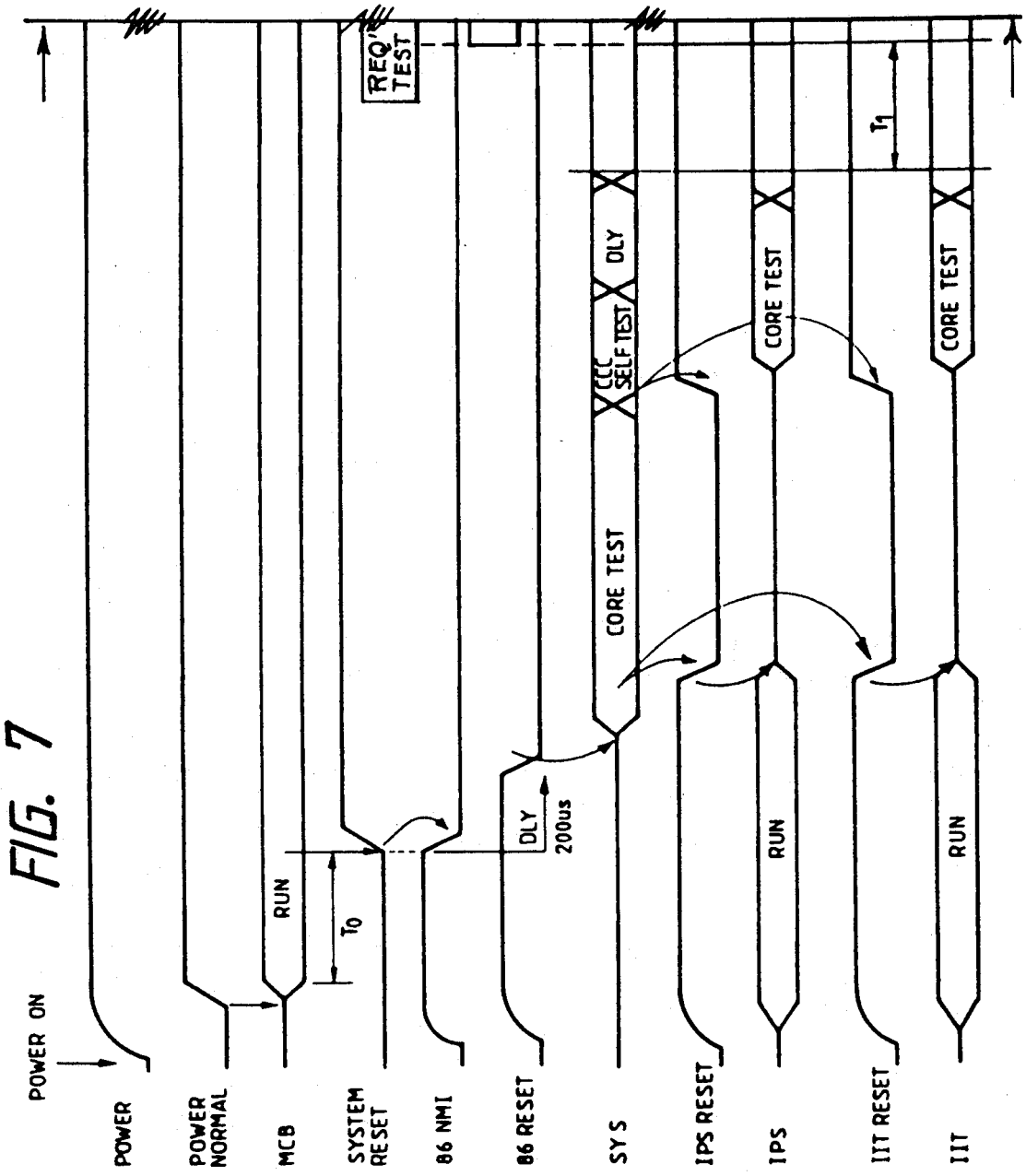
FIG. 7 is a timing chart for explaining the operation of the copier from the power on to the standby state.
Figure 7A:
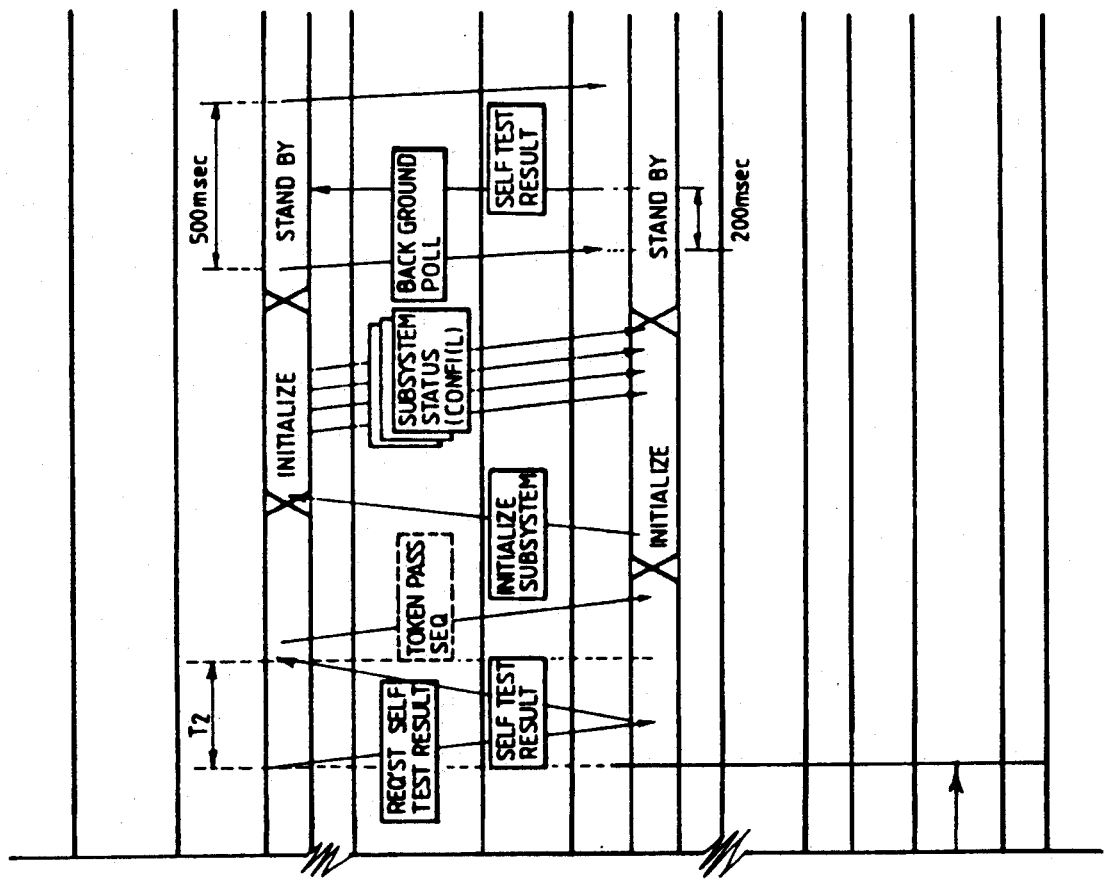

Of the states shown in FIG. 6, the machine operation from the power-on state to the standby state will be described with reference to FIG. 7.

A power switch is turned on, and the machine is in a power-on state. An IPS reset signal and an IIT reset signal that are supplied from the SYS remote 71 to the IIT remote 74 and the IPS remote 74 (FIG. 3) become H (high) in logic state. Upon receipt of these signals, the IPS remote 74 and the IIT remote 73 are released from the reset status and start to operate. The settle-down of the power voltage is detected and a power normal signal rises. The MCB remote 75 starts to operate and to establish the control right a the UI master right. At the same time it tests the high speed communication network LNET. The power normal signal is transferred from the MCB remote 75 to the SYS remote 71, by way of the hot line.

When time T0 elapses from the operation start of the MCB remote 75, a system reset signal supplied from the MCB remote 75 through the hot line to the SYS remote 71 goes high. Then, the SYS remote 71 is released from the reset status and starts to operate. The operation start of the SYS remote 71 is delayed by time T0 plus 200 μsec by two signals, 86NMI and 86 reset, that are internal signals of the SYS remote 71. The time period of 200 μsec is provided for storing the present state of the copying machine into a nonvolatile memory when the copying machine stops or runs away due to clash, i.e., temporary trouble, power interrupt, software runaway, and software bug.

When the SYS remote 71 starts to operate, a core test is conducted for a period of approximately 3.8 sec. The test checks the contents of the ROM and RAM, and the hardware. At this time, if undesired data is mistakenly entered, the machine will possibly run away. To avoid this, the SYS remote 71, on its decision, renders low (L) the IPS reset signal and the IIT reset signal, at the time of the start of the core test. By the L signals, the IPS remote 74 and the IIT remote 73 are reset and come to a standstill.

Upon completion of the core test, the SYS remote 71 conducts a CCC self test during a period of 10 to 3100 msec, and at the same time renders high the IPS reset signal and the IIT reset signal, thereby to cause the IPS remote 74 and the IIT remote 73 to operate again, and to cause them to conduct the core tests. In the CCC self test, the SYS remote 71 sends predetermined data to the LNET, receives the return data, and checks as to whether or not the transmitted data is coincident with the received data. The times of the self tests of the CCCs are staggered one another, to prevent the different self tests from being conducted concurrently.

The LNET employs a contention system. In this system, the nodes such as the SYS remote 71 and the MCB remote 75 transmit data when they desire so. If different data collide, the same data is retransmitted after a predetermined time lapses. The reason why the contention system is used is that when the SYS remote 71 is conducting the CCC self test, if another node uses the LNET, the data collision occurs and it cannot conduct the CCC self test. Accordingly, before the SYS remote 71 starts the CCC self test, the LNET test by the MCB remote is completed.

When the CCC self test ends, the SYS remote waits till the core tests by the IPS remote 74 and the IIT remote 73 are completed. It conducts a communication test of the SYSTEM node during a period T1. This communication test is for testing the serial communication network of 9600 bps. In the test, predetermined data is transferred in a predetermined sequence. Upon completion of the communication test, during a period T2 the LNET communication test is conducted between the SYS remote 71 and the MCB remote 75. In the communication test, the MCB remote 75 requests the SYS remote 71 to return the results of the self test. In response to the request, the SYS remote 71 returns the results of the tests thus far conducted, as self test results, to the MCB remote 75.

When receiving the self test result, the MCB remote 75 issues a token pass toward the SYS remote 71. The token pass is used to transfer the UI master right. For example, when the token pass is transferred to the SYS remote 71, the UI master right is transferred from the MSB remote 75 to the SYS remote 71. The operations up to this point belong to a power-on sequence. In this sequence, the UI remote 70 displays a message of "Please wait a minute", for example, and executes various tests, such as a core test of the remote 70 itself and communication test.

In the self test sequence, when the return of the self test result is requested, but no return is made, or the returned self test result contains an error, the MCB remote 75 makes the copying machine dead, exercises the UI control right to control the UI remote 70, and visually presents a faulty state of the machine.

An initialize state to set up the respective remotes follows the power-on state. In the initialize state, the SYS remote 71 possesses the control right to control all of the states and the UI master right. The SYS remote 71 initializes the SYS system, and issues a command INITIALIZE SUBSYSTEM to the MCB remote 75 and initializes the MCB system. The result of the initialization is returned as subsystem status from the MCB remote 75. Through the initializing state, in the IOT, the fuse is heated, and the elevator of the tray is set at a predetermined position. The operations up to this point constitute the initialize state.

Upon completion of the initialize state, the respective remotes enter a stand-by state in which the they are ready for a copying operation. In this state, the SYS remote 71 possesses the UI master right. Accordingly, it exercises the UI master right to display the F/F on the UI display screen, and is ready for accepting the conditions for executing the copying operations. At this time, the MOCB remote 75 monitors the IOT. In the stand-by state, to check a faulty in the copier, the MCB remote 75 issues a background pole to the SYS remote 71 every 500 msec. In response to this, the SYS remote 71 returns the self test result to the MCB remote 75 within 200 msec. When no return of the self test result is made, or the returned self test result contains an error, the MCB remote 75 informs the UI remote 70 of occurrence of a faulty state, and causes it to display a faulty state of the machine.

When the auditron is used in the stand-by state, the copier enters an auditron state. In this state, the MCB remote 75 exercises the auditron control, and at the same time controls the UI remote 70 to cause it to present an auditron display. When the F/F is set up and the start key is operated in the stand-by state, the copier enters a progress state. The progress state is further divided into six substates, a set-up, cycle-up, skip pitch, normal cycle-down, and cycle-down shutdown. These substates will be described with reference to FIG. 8.

Figure 8:
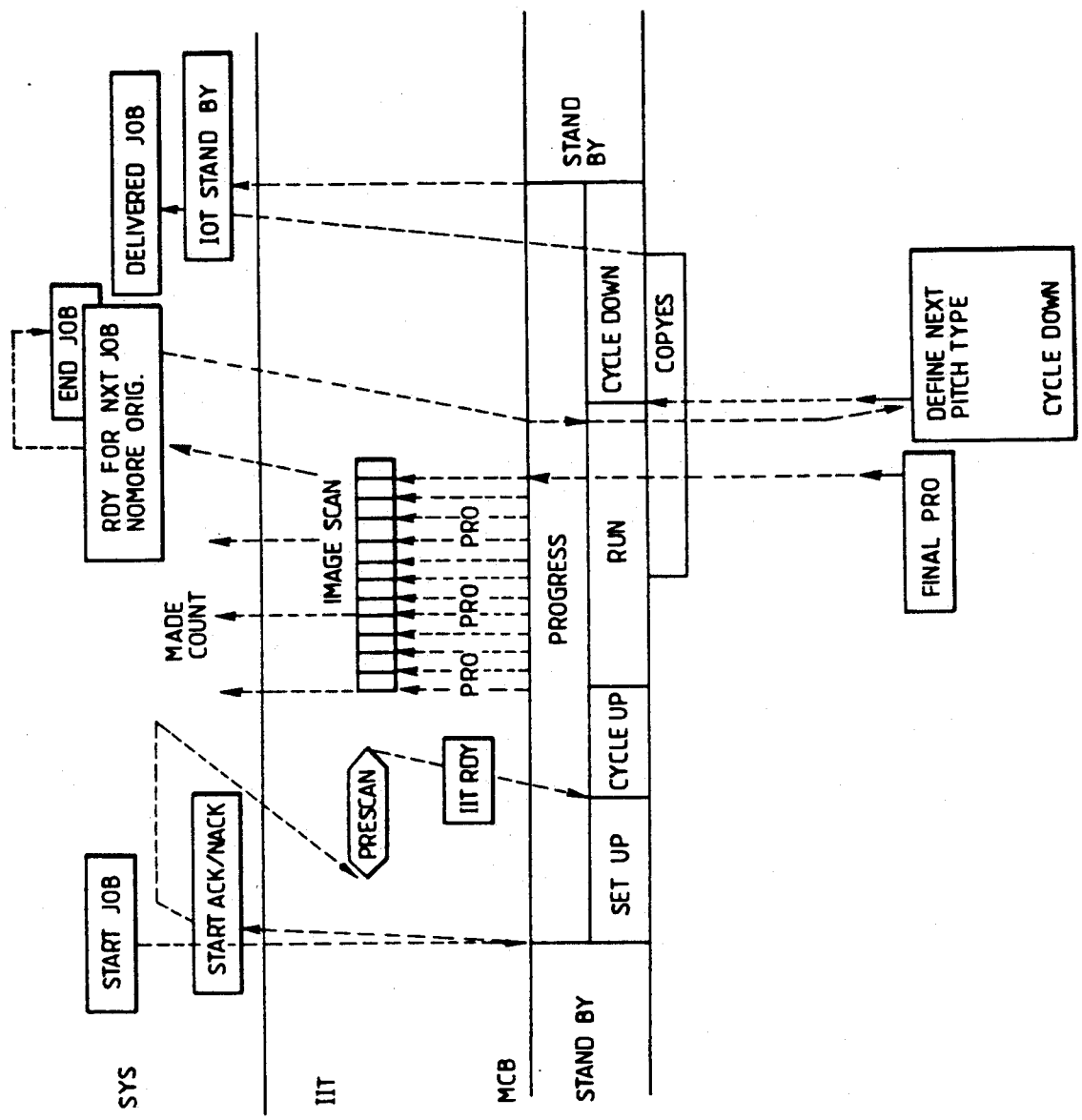
FIG. 8 is a diagram showing a sequence of a progress state.

A timing chart illustrated in FIG. 8 was plotted under conditions that the copier is set in a platen mode, full color mode, and the number of copies is set at three.

When detecting the depression of the start key, the SYS remote 71 sends the contents of a job to the IIT remote 73 and the IPS remote 74, through the serial communication network. The same also issues a command "start job", and sends the job contents and the start job command as well to the copier executive module 87 in the MCB remote 75. As a result, the copier enters the set-up substate, and the respective remotes prepare for executing the designated job. In the IOT module 90, a main motor is driven, and parameters for the photosensitive belt are set to correct values.

The SYS remote 71 confirms that an ACK (acknowledge) signal as a response of the MCB remote 75 to the start job reaches, and causes the IIT remote 73 to prescan. In this instance, four types of prescans are used; a prescan to detect size of an original, a prescan to detect a color in a specified portion on the document, a prescan to detect a closed loop for an outline drawing for coloring, and a prescan for reading a marker in the marker edit mode. A maximum of three prescans is repeated in accordance with the selected F/F. At this time, the UI displays a message "Please wait a minute", for example.

When the prescan operation ends, a command "IIT ready" is issued to the copier executive module 87. From this point, the copier, or the copying machine, enters the cycle- up substate. In the cycle-up state, the copier waits for the respective remote to start up and settle down. The MCB remote 75 starts up the IOT and the transfer unit. The SYS remote initializes the IPS remote 74. At this time, the UI displays the progress state being exercised and the contents of the selected job.

Upon completion of the cycle-up substate, the run substate is executed and the copying operation starts. When a first PR0 is produced from the IOT module 90 of the MCB remote 75, the IIT performs a first time scan, and the IOT performs the development of a first color. Here, the processing of one pitch is completed. Then, when the second PR0 is produced, the processing of the second pitch is completed. The above sequence of the processings is repeated four times to complete the processings of 4 pitches. Then, the IOT fuses the toner image and delivers the paper with the fused image outside the base machine. At this point, the copying operation of the first copy is completed. The above sequence of processings is repeated to produce three copies as is preset.

The processings of the pitch layer and the copy layer are under control of the MCB remote 75. The setting of the number of copies in the per original as the upper layer of the above two layers is carried out by the SYS layer 71. Accordingly, Accordingly, in order that the SYS remote 71 can recognize what number of copies is currently made, when the first PR0 for each copy is produced, the MCB remote 75 produces a made count signal for transfer to the SYS remote 71. When the final PR0 is produced, the MCB remote 75 requests the SYS remote 71 to send the next job by issuing a command "RDY FOR NXT JOB" to the SYS remote 71. At this time, if the start job is issued, the job can be continued. When a user does not set the next job, the job ends. In this case, the SYS remote 71 issues a command "END JOB" to the MCB remote 75. When the MCB remote 75 receives the "END JOB" and confirms that the job ends, the copier enters the normal cycle-down substate. In this state, the MCB remote 75 stops the operation of the IOT.

During the course of the cycle-down, when the copy papers have been delivered out of the base machine and the MCB remote 75 confirms the delivery of the copy papers, the remote 75 informs the SYS remote 71 of it by issuing a command "DELIVERED JOB". Also when the normal cycle down ends and the machine comes to stop, the MCB remote 75 informs the SYS remote 71 of it by issuing a command "IOT STAND BY". At this point, the progress state ends and control returns to the standby state.

The substates of the skip pitch and the cycle-down shut-down that have not yet been described will be referred to below. In the skip pitch, the SYS remote 71 initializes the SYS system for the next job, and the MCB remote 75 is ready for the next copy. In the cycle-down shut-down state that is used when a fault occurs, the SYS remote 71 and the MCB remote 75 both execute a fault processing.

As seen from the foregoing description, in the progress state, the MCB remote 75 controls the pitch processing and copy processing, and the SYS remote 71 controls the per original and the job programming. Accordingly, the control right is possessed by the MCB remote 75 or the SYS remote 71 in accordance with the shared processing that is currently performed. The UI master right, however, is exclusively possessed by the SYS remote 71. The reason for this is that the UI must display the number of copies as is set and the selected edit processings, these jobs belong to the per original layer and the job programming layer, and hence under control of the SYS remote 71.

When a fault occurs in the progress state, control goes to a fault recovery state. The word "fault" means an abnormal state of the copier including no paper, jamming, abnormal and damaged parts, and the like. The fault comes in two categories, a first fault that a user can remove by resetting the F/F, and a second fault that requires some action by a serviceman, such as parts replacement. As described above, basically, the faulty display work is shared by the MCBUI module 86, but the F/F is controlled by the SYS module 82. The machine recovery from the first fault that can be cured by the resetting of the F/F is shared by the SYS module 82. The machine recovery work from other faults is shared by the copier executive module 87.

The SYS system and the MCB system are used for detecting faults. Faults occurring in the IIT, IPS, and F/P are detected by the SYS remote 71, because these are controlled by the remote 71. Faults occurring in the IOT, ADF, and sorter are detected by the MCB remote 75, because these are controlled by the remote 75. Accordingly, the faults possibly occurring in the copying machine may be categorized into four types of faults to be given below.

1) Fault Detected and Cured by SYS Node

This type of fault occurs when the start key is depressed before the F/P is set. The faulty state of the machine can be removed by resetting the F/P.

2) Fault Detected by SYS Node, and Cured by MCB Node

This type of fault includes trouble of the reginsor, abnormal speed of the imaging unit, overrun of the imaging unit, abnormal PR0 signal, abnormal CCC, trouble in the serial communication network, check error of the ROM or RAM, and the like. When any of the above faulty state occurs, the UI displays the contents of the fault and a message "Call a serviceman".

3) Fault Detected by MCB Node and Cured by SYS Node

When the sorter is actually set, if the F/F sets the sorter, the MCB node detects a fault. Such a faulty state in the copying machine can be removed by resetting the F/F by a user. The same thing is true for the ADF. A fault is detected when a less amount of toner is left, no tray is set, and no paper is present. These faults can be removed by merely supplying toner and toner, and setting a tray. When papers are used up in a tray, setting of another tray can recover the machine from the faulty state. When toner of a certain color is used up, designation of toner of another color can recover the faulty machine. Thus, since the F/F selection can make the recovery of the faulty machine, the recovery work is shared by the SYS node.

4) Fault Detected and Cured by MCB Node

When the developing unit is abnormal, the toner supply is abnormal, the motor clutch is abnormal, or the fuser is abnormal, the MCB node detects such a fault and the UI displays a faulty location and a message "Call a servicemen". When a jamming occurs, the same displays a location of jamming and the way to clear jamming. In this way, the machine recovery work is put into the hands of users.

As described above, in the fault recovery state, the control right and the UI master right are possessed by the SYS node or the MCB node depending on faulty locations and the recovery methods used.

When the MCB node issues an IOT stand-by command after the fault recover, control goes to the job recovery state and executes the remaining jobs. Let us consider a situation that the number of copies is set at 3, and a jamming occurs during the copying operation of the second copy. In this case, after the jamming is cleared, the remaining two copies must be made. Accordingly, the SYS node and the MCB node execute their processings, to recover the job. Also in the job recovery state, the control right is possessed by the SYS node or the MCB node depending on their sharing of processings, but the UI master right is possessed by the SYS node. The reason for this follows. To exercise the job recovery state, a display for job recovery must be made, such as "Push a start key" and "Set the remaining document". Such a display processing belongs to the per original layer or the job programming layer that are under control of the SYS node.

Also when an IOT stand-by command is issued in the progress state, the job recovery state is exercised. When the job execution end is confirmed, control goes to the stand-by state, and waits for the next job. In the stand-by state, control is allowed to proceed to the diagnostic (referred simply to as a diag.) state by a pregiven key operation.

Figure 9:
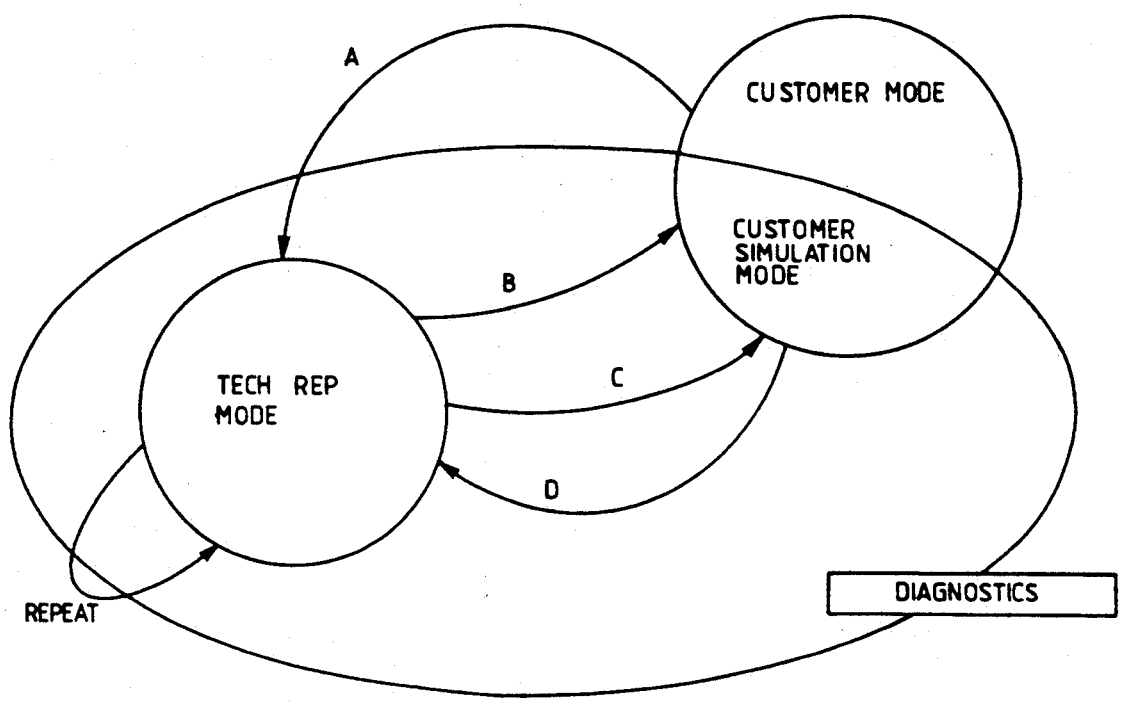
FIG. 9 is a diagram showing an outline of a diagnostic process.

The diag. state consists of the self test processings such as for input/output check of parts, setting of various parameters, setting of various modes, and initializing the NVM (nonvolatile memory). The schematic illustration of the diag. state is given in FIG. 9. As seen from the figure, two modes are used, a TECH REP mode and a customer simulation mode.

The TECH REP mode is used for the machine diagnosis by a serviceman, such as input and output checks. The customer simulation mode is used when customers operates the customer mode, that is used for the copying operation, in the diag. state.

Let us assume now that control proceeds from the stand- by state of the customer mode the TECH REP mode by way of a route A. When controls makes only various checks and parameter settings in the TECH REP mode and returns to the customer mode (by way of a route B), a mere operation of a pregiven key allows control to go to the power-on state (FIG. 6) and to return to the stand-by state through the sequence of FIG. 7. Remember that the copying machine of the present invention makes the color copy and is provided with various edit functions. Therefore, after various parameters are set in the TECH REP mode, check must be needed as to whether or not desired colors are produced and whether the edit functions are normal or not by actually making the copy. It is the customer simulation mode that executes the above checks. The customer simulation mode is different from the customer mode in that no billing is made and the UI displays the diag. state being exercised. This is the meaning of used of the customer simulation mode that is the customer mode used in the diag. state. The shift of control from the TECH REP mode to the customer simulation mode (via a route C) and the reverse shift of control from the customer simulation mode to the TECH REP mode (via a route D) may be made by pregiven operations. The TECH REP mode progresses under control of the diag. executive module 88 (FIG. 4). In this case, accordingly, the MCB node has both the control right and the MCB master right. In the customer simulation mode, the actual copying operation is performed under control of the diag. module 83 (FIG. 4). In this case, the SYS node has both the control right and the US master right.

(II) SYSTEM DETAILS

(II-1) System Configuration

Figure 10:
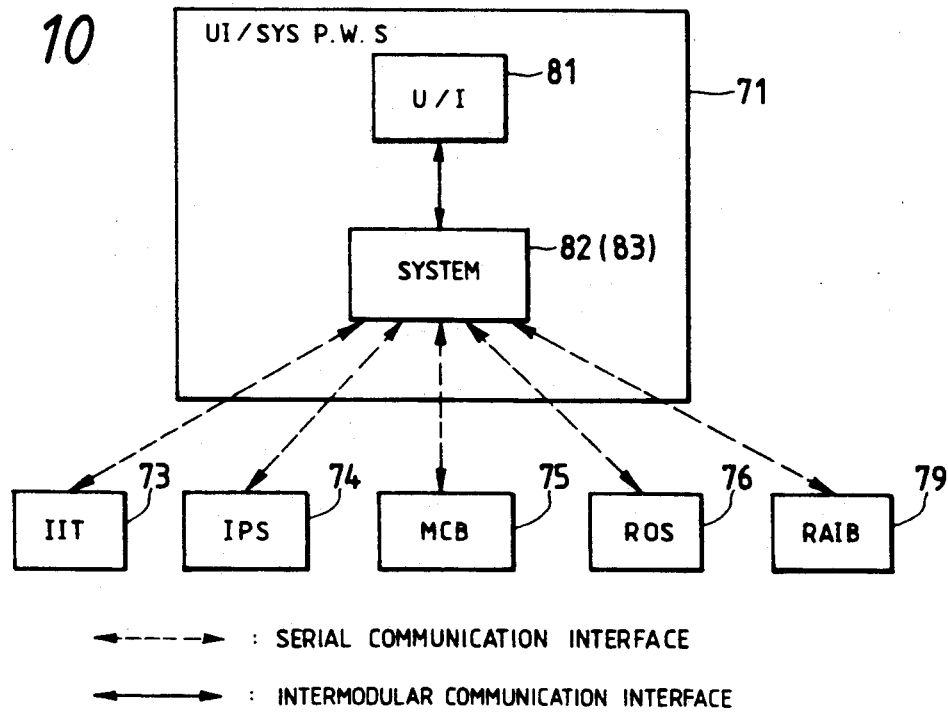
FIG. 10 is a diagram showing relationships of the system and remotes.

FIG. 10 shows relationships between a system and other remotes.

As described, the SYS remote 71 uses the SYSUI module 81 and the SYSTEM module 82. Data is transferred between these modules 81 and 82 through a module interface. A serial communication interface intervenes between the SYSTEM module 82, and the IIT 73 and and IPS 74. An LNET communication network couples the SYSTEM module 82 with the MCB 75, ROS 76 and RAIB 79.

A module configuration of the system will be described.

Figure 11:
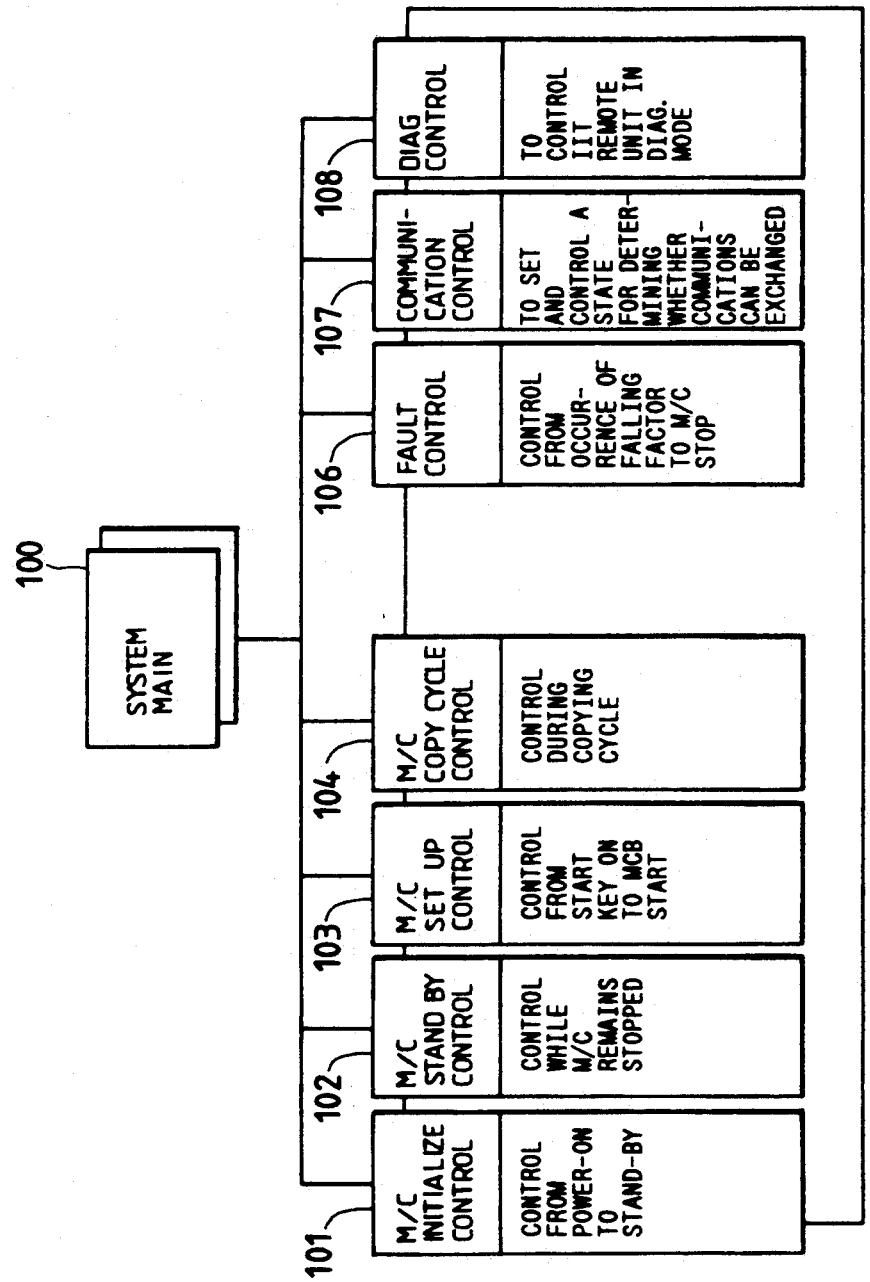
FIG. 11 is a diagram showing a module configuration of the system.

FIG. 11 shows a module configuration of the system.

In the color copying machine of the present invention, the modules such as IIT, IPS and IOT function like passive parts, and the modules in the system for controlling the above modules function like active parts with intellect. The copying machine employs the decentralised CPU system. The per original layer and the job programming layer are shared by the system. The system has the control right to control the initialize state, stand-by state, set-up state, and cycle state, and the UI master right for using the UI in the above states. Accordingly, the modules corresponding to them make up the system.

A system main 100 fetches the data received from the SYSUI, MCB, and the like into the internal buffer, clears the data in the internal buffer, calls the respective lower order modules in the system main 100 and transfers the job to them, thereby to execute the updating processings.

An M/C initialize control module 101 controls an initialize sequence from the power-on to the setting up the stand-by mode. This is driven when the power-on state for executing various types of tests after the power-on by the MCB.

An M/C set-up control module 103 controls a set-up sequence from the pushing the start key till the MCB for executing the copy layer is driven. Specifically, it forms job modes using FEATURE (directions given to the M/C in order to reply the request by a user) that is specified by the SYSUI, and determines a set-up sequence in accordance with the job modes.

Figure 12A:
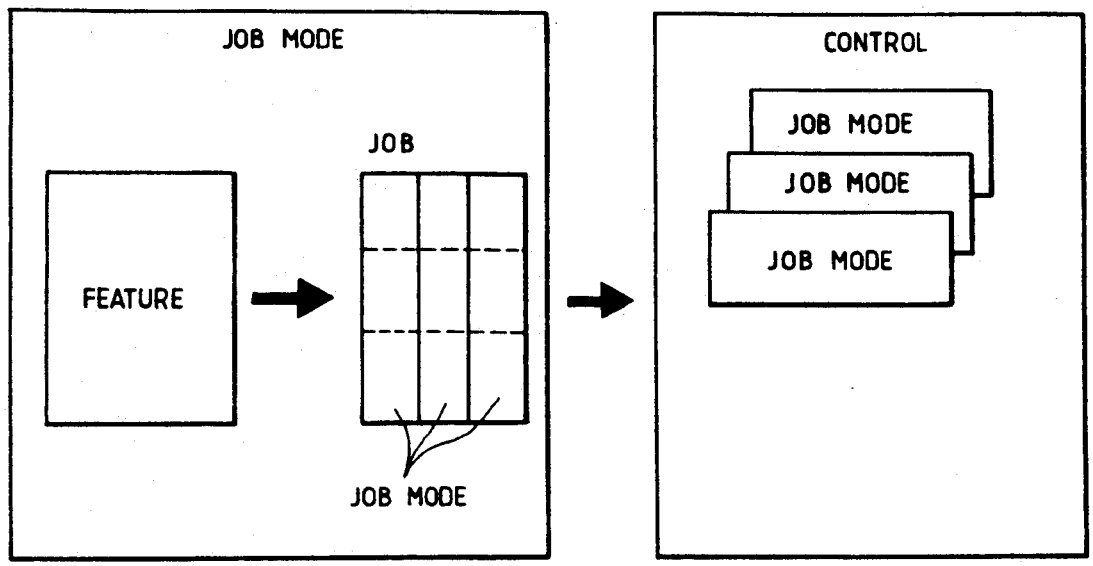
FIGS. 12(a) through 12(c) are explanatory diagrams showing how to prepare a job mode.
Figure 12B:
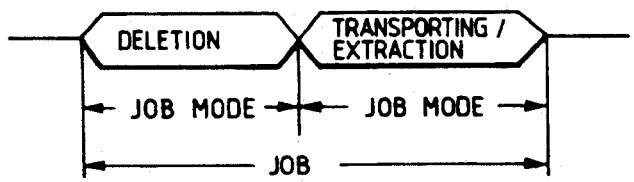
Figure 12C:
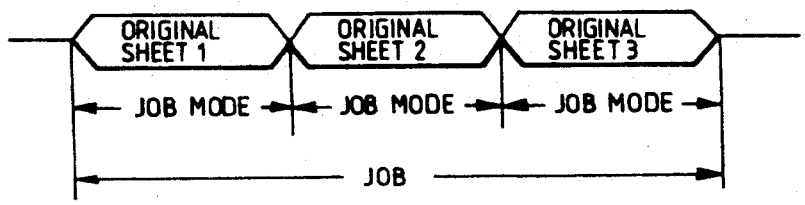

As shown in FIG. 12(a), for forming the job modes, a mode as indicated by the F/F is analyzed and divided into job modes. Here, the job means the M/C operation from the start of it till the copies are all delivered as requested, and it stops. The job mode is the unit of the smallest job into which the job is allowed to be divided. The job is a colligation of the job modes. For example, in the case of an inlay composition, the job modes are a delete and a transporting/extraction as shown in FIG. 12(b). These modes constitute a job. In the case of three ADF originals, job modes are feed processings of originals 1, 2 and 3 as shown in FIG. 12(c). These job modes are collegated into a job.

In an auto mode, a document scan is done. In a coloring-outline-drawing mode, a prescan is done. In a marker edit mode, a prescan is done. In a color detection mode, a sample scan is done (a maximum of three prescans is allowed). A copy mode required for the copy cycle is assigned to the IIT, IPS and MCB. At the end of the set-up sequence, the MCB is driven.

An M/C stand-by control module 102 controls a sequence during the M/C stand-by state, more exactly controls reception of the start key and color registration, and enters the diag. mode.

An M/C copy cycle control module 104 controls a copy sequence from the start of the MCB to the stop. Specifically, it provides information of a paper feed count, recognizes the end of a job and requests the start of the IIT. Further, it recognizes the stop of the MCB and requests the stop of the IPS.

Additionally, the module 104 sends a through command that is generated during the M/C stop or the M/C operation, to a destination remote.

A fault control module 106 monitors stop parameters from the IIT and IPS. When a stop parameter is generated, the module 106 requests the stop of the MCB. More specifically, the module 106 recognizes a fail command from the IIT or IPS, and stops it. After a stop request is generated by the MCB, the fault control module determines the recovery when the M/C is stopped, and makes the recovery in response to a jamming command from the MCB, for example.

A diag. control module 108 controls in the input check mode and the output check mode that are contained in the diag. mode.

Description to follow is the data transfer among the modules or between the modules and other subsystems.

Figure 13:
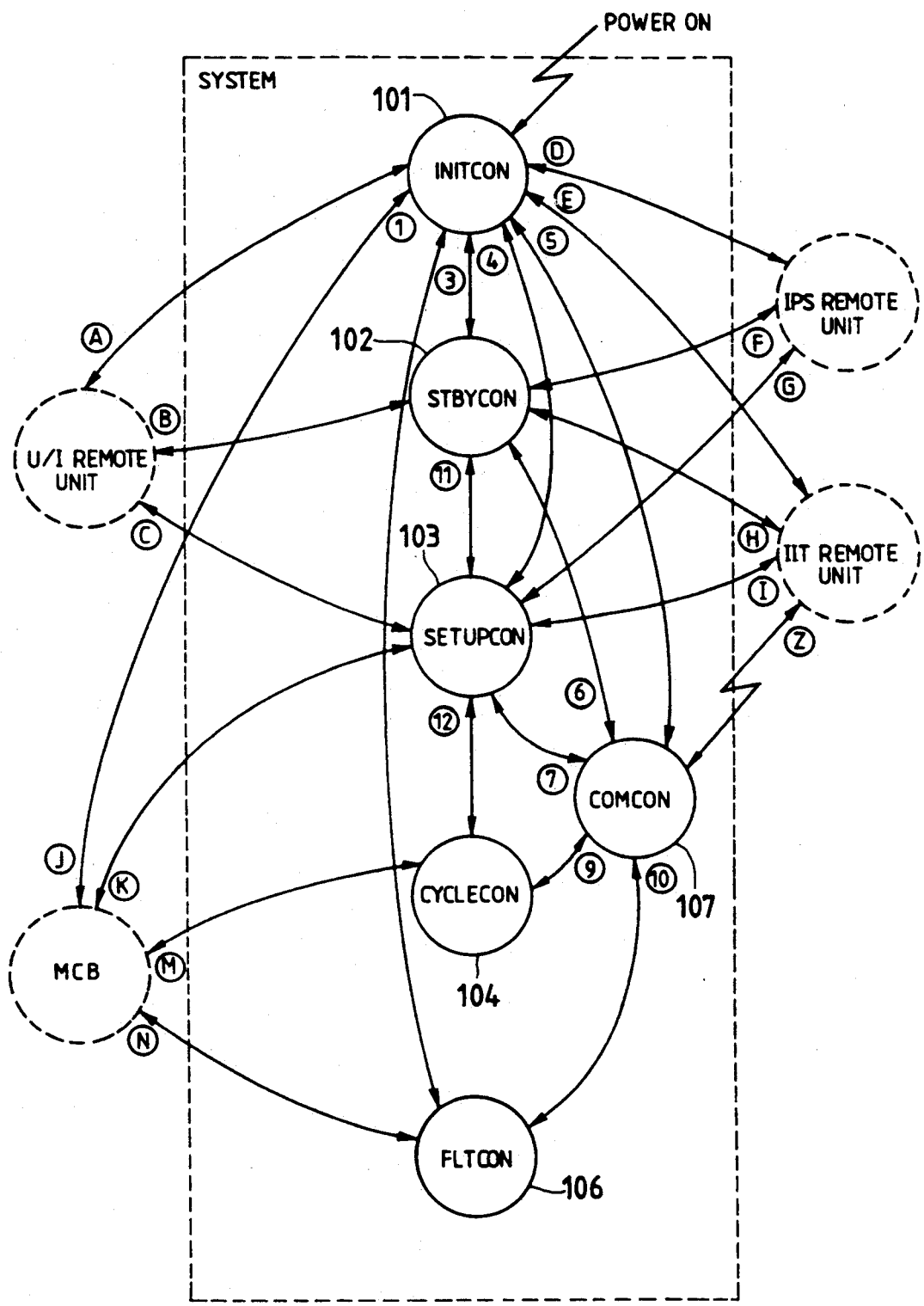
FIG. 13 shows a data flow between the system and the respective remotes.

FIG. 13 illustrates data flows between the system and the remotes, and data flows among the modules in the system. In the figure, A to N indicate serial communications, Z a hot line, and (1) to (12) data flow among the modules.

In the communication between the SYSUI remote and the initialize control module 101, the SYSUI sends a token command indicative of transfer the control right for the CRT, to the SYSTEM node. The initialize control module sends a configuration command to it.

In the communication between the SYSUI remote and the stand-by control module 102, the SYSUI remote sends to the stand-by control module a mode change command, start copy command, job cancel command, color registration request command, and tray command. The stand-by control module 102 sends to the SYSUI remote an M/C status command, tray status command, toner status command, toner collection bottle command, color registration answer command, and token command.

In the communication between the SYSUI remote and the set-up control module 103, the set-up control module 103 sends an M/C status command (progress) and APMS status command. The SYSUI remote sends a stop request command and an interrupt command.

In the communication between the IPS remote and the initialize control module 101, the IPS remote sends an initialize command to the control module 101. The control module 101 sends an NVM parameter command to the IPS remote.

In the communication between the IIT remote and the initialize control module 101, the IIT remote sends an IIT ready command to the module 101. The module 101 sends an NVM parameter command and an initialize command to the IIT remote.

In the communication between the IPS remote and the stand-by control module 102, the commands sent by the IPS remote to the control module 102 are an initialize free hand area command, answer command, remove area answer command, and color data command. The commands sent by the module 102 to the IPS remote are a color detect point command, initialize free hand area command, and a remove area command.

In the communication between the IPS remote and the set-up control module 103, the commands sent by the IPS remote to the control module 103 are an IPS ready command and a document information command. The commands sent by the set-up control module 103 to the IPS module are a scan information command, basic copy mode command, edit mode command and M/C stop command.

In the communication between the IIT remote and the stand-by control module 102, the IIT remote sends an IIT ready command indicative of the prescan end to the control module 102. The control module 102 sends to the IIT remote a sample scan start command and an initialize command.

In the communication between the IIT remote and the set-up control module 103, the IIT sends an IIT ready command and an initialize end command to the control module 103. The control module 103 sends a document scan start command, sample scan command, and copy scan start command to the IIT remote.

In the communication between the MBC remote and the stand-by control module 102, the stand-by control module 102 sends an initialize subsystem command and a stand-by selection command to the MBC remote. The MBC remote sends a subsystem status command to the stand-by control module.

In the communication between the MBC remote and the set-up control module 103, the module 103 sends a start job command, IIT ready command, stop job command, and declare system fault command to the MBC remote. The MBC remote sends an IOT stand-by command and a declare MCB fault command to the module.

In the communication between the MBC remote and the cycle control module 104, the module 104 sends a stop job command to the MBC remote. The MBC remote sends a made command, ready for next job command, job delivered command, and IOT stand-by command to the control module.

In the communication between the MBC remote and the fault control module 106, the control module 106 sends a declare system fault command and a system down end command to the MBC remote. The MBC remote sends a declare MCB fault command and a system shut-down command to the control module 106.

In the communication between the IIT remote and the communication control module 107, the IIT remote sends a scan ready signal and an image area signal to the control module 107.

The interfaces among the respective modules will be described below.

The system main 100 sends a reception remote Nos. and reception data to the respective modules (101 to 107). Upon receipt of them, each module transfers data to and from its remote. On the other hand, the respective modules sends nothing to the system main 100.

The initialize control module 101, when completing the initialize processing, sends a system state (stand-by) to the fault control module 106 and the stand-by control module 102.

The communication control module 107 sends communication yes/no data to the initialize control module 101, stand-by control module 102, set-up control module 103, copy cycle control module 104, copy cycle control module 104, and fault control module 106.

The stand-by control module 102 sends a system state (progress) to the set-up control module 103, when the start key is depressed.

The set-up control section 103, when the set-up is completed, sends a system state (cycle) to the copy cycle control module 104.

(II-2) Image Processing System (IPS)

(A) IPS modules

Figure 14:
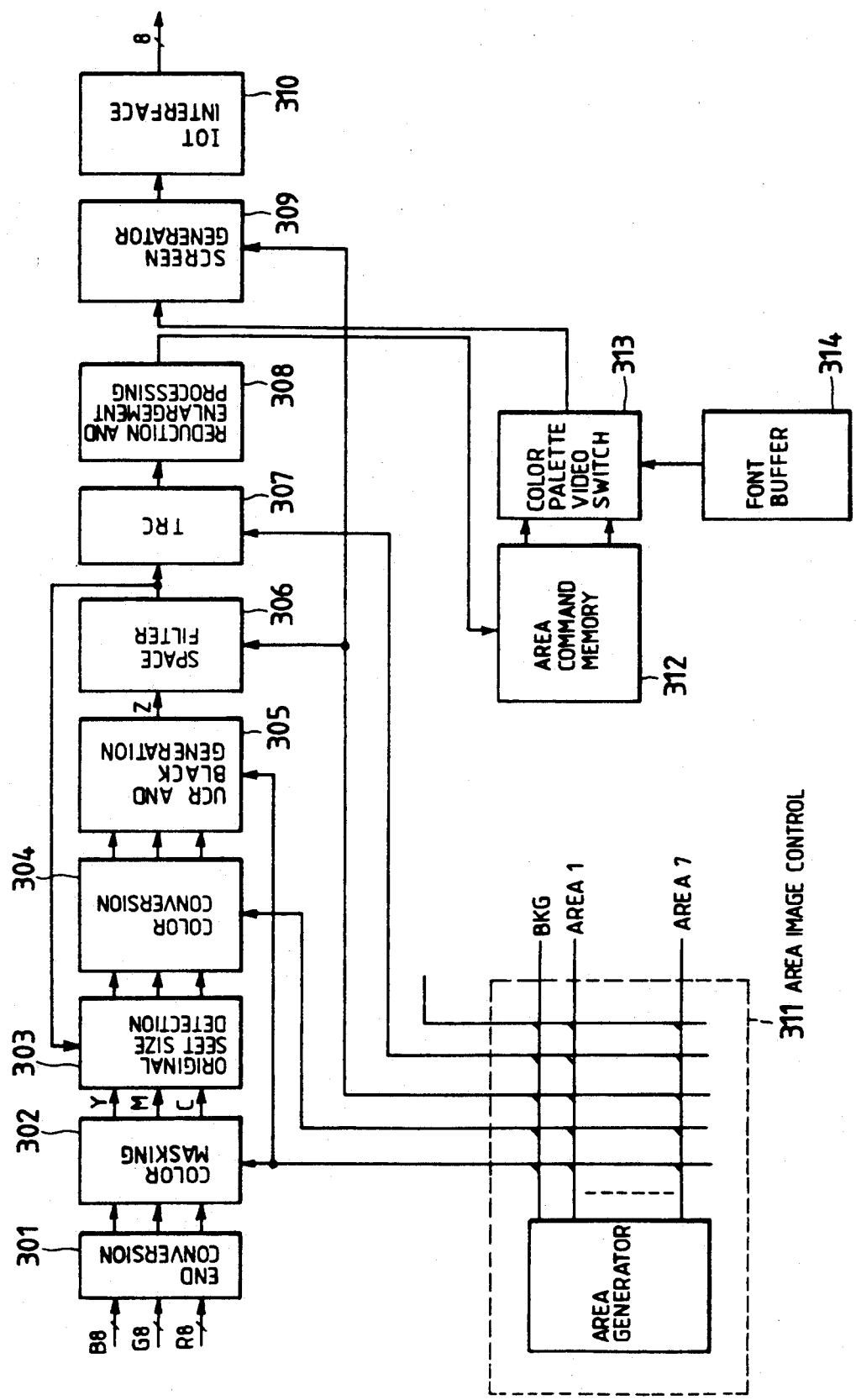
FIG. 14 is a diagram showing a module configuration of the IPS.

FIG. 14 shows an arrangement of IPS modules in the image processing system (IPS).

In the color image recording apparatus, the IIT (image input terminal) reads a color image on an original in the form of primary three light colors B (blue), G (green) and R (red) by using the CCD image sensor, and converts these signals signals of toner primary colors of Y (yellow), M (magenta), C (cyan), and K (black or tusche), and the IOT (image output terminal) performs the exposure by the laser beam and development to reproduce the original color image. In this case, the four separated toner images of Y, M, C and K are used. A copy process (pitch) is performed one time using the process color of Y. Subsequently, the copy processes will be performed for the remaining process colors M, C and K. A total of four copy cycles are executed. These four images consisting of mesh points are superposed to reproduce a single color image of the full color. Accordingly, when the separated color signals of B, G and R are converted into toner signals of Y, M, C and K, a designer encounters the problems how to adjust the color balance, how to reproduce colors in accordance with the read characteristic of the IIT and the output characteristic of the IOT, how to adjust the balance of density and contrast, and how to adjust the emphasis and blur of the edge, and how to adjust Moire.

The IPS receives the separated color signals of B, G and R, applies various data processings to these signals for improving the reproducibility of colors, tone, and definition, and converts the toner signals of the developing process colors into on/off signals, and outputs them to the IOT. As shown in FIG. 14, the IPS is made up of an END (equivalent neutral density) conversion module 301, color masking module 302, original size detect module 303, color conversion module 304, UCR (under color removal)/black generating module 305, spatial filter 306, TRC (tone reproduction control) module 307, reduction/enlargement processing module 308, screen generator 309, IOT interface module 310, area image control module 311 including an area generator and a switch matrix, and edit control module including an area command memory 312, color palette video switch circuit 313, and font buffer 314.

In the IPS, the 8-bit data (256 gray levels) on each of the separated color signals B, G and R is applied to the END conversion module 301. The module 301 converts the data into the toner signals of Y, M, C and K. A process color toner signal X is selected, and is digitized. The digitized signals are transferred, as the on/off data of the process color toner signals, from the IOT interface module 310 to the IOT. Accordingly, in the case of the full color (4 colors), the prescan is executed to detect an original size, an edit area, and other necessary information of the original. Then, a first copy cycle is executed using Y as the toner signal X of the process color. Then, a second copy cycle is executed using M for the toner signal X. Subsequently, copy cycles will be executed for the remaining process colors. A total of four copy cycles are repeated.

In the IIT, the color components of R, G and B of the image are read by using the CCD sensor, with the size of one pixel of 16 dots/mm. The IIT outputs the read signals as the data of 24 bits (3 colors×8 bits; 256 gray levels). B, G and R filters are laid on the upper surface of the CCD sensor with the density of 16 dots/mm and whose total length is 300 mm. The CCD sensor makes scan of 16 lines/mm at the process speed of 190.5 mm/sec. Accordingly, the sensor produces the read data at the rate of about 15M pixels/sec for each color. The IIT log converts the analog data of B, G and R pixels to obtain the density data from the reflectivity data, and then digitizes the density data.

The respective modules will be described in detail.

Figure 15A:
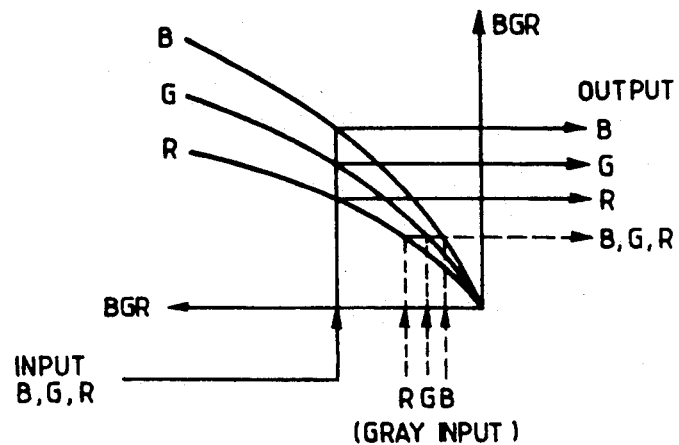
FIGS. 15(a) through 15(q) are diagrams showing the respective modules constituting the IPS.
Figure 15B:
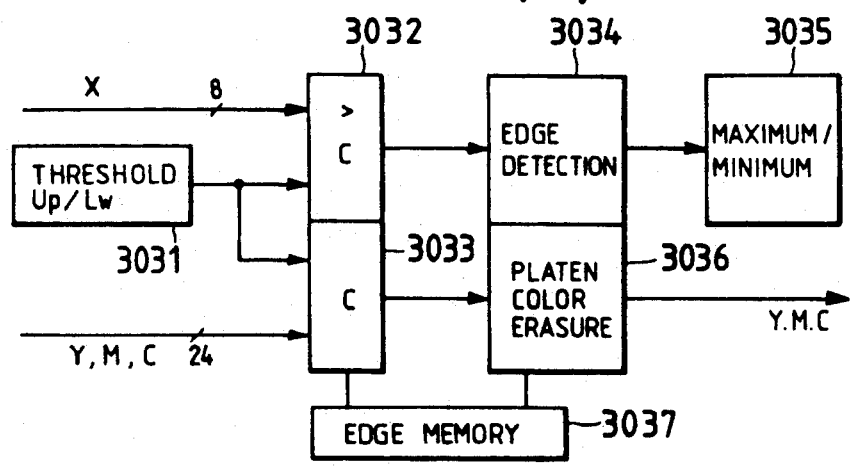
Figure 15C:
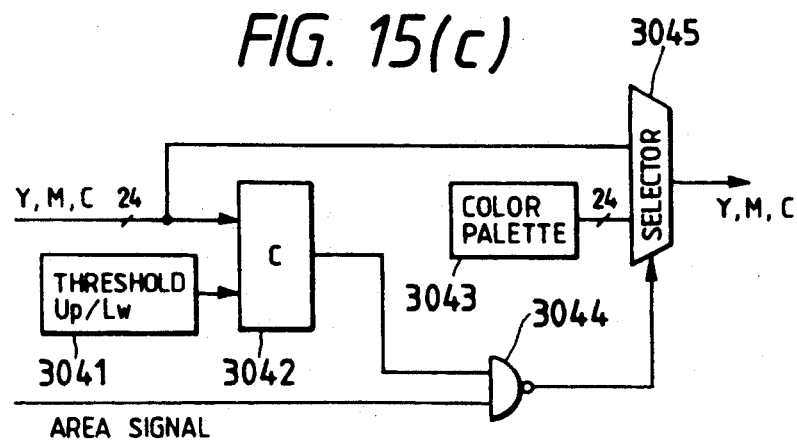
Figure 15D:
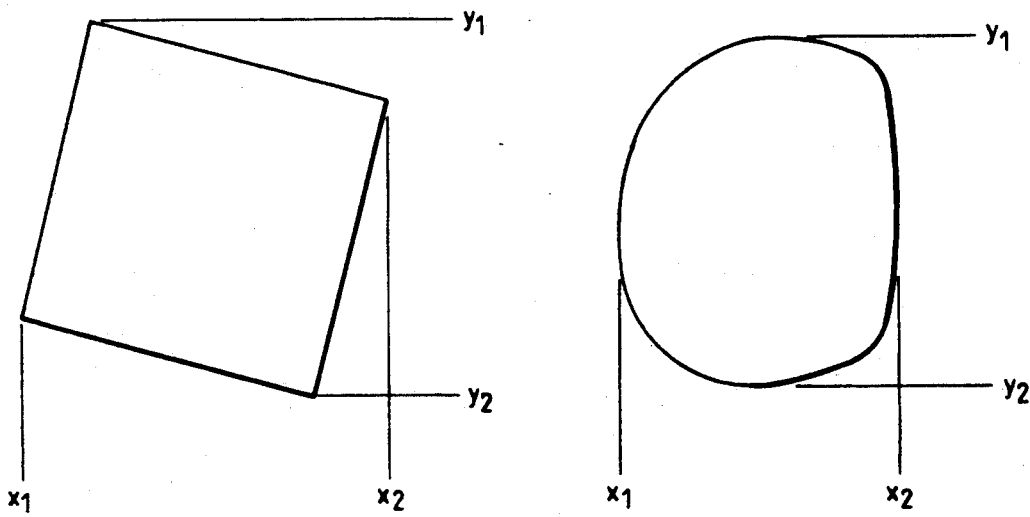
Figure 15E:
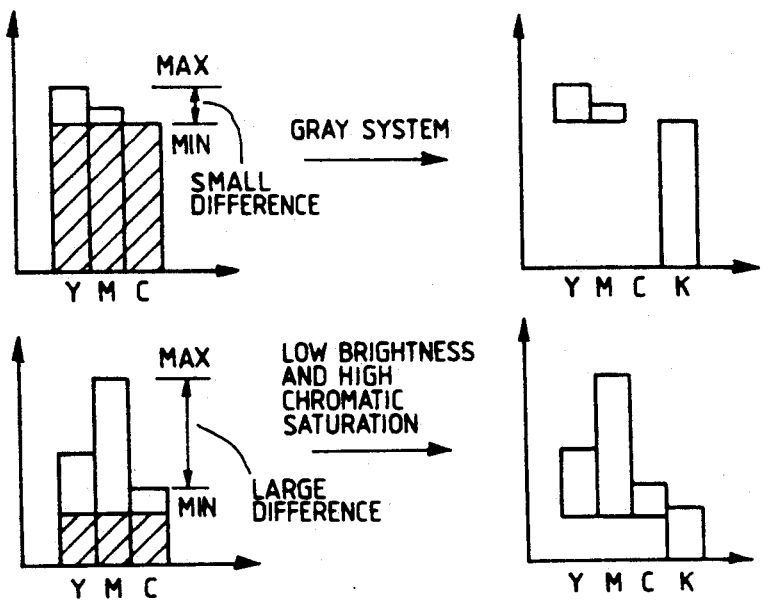
Figure 15F:
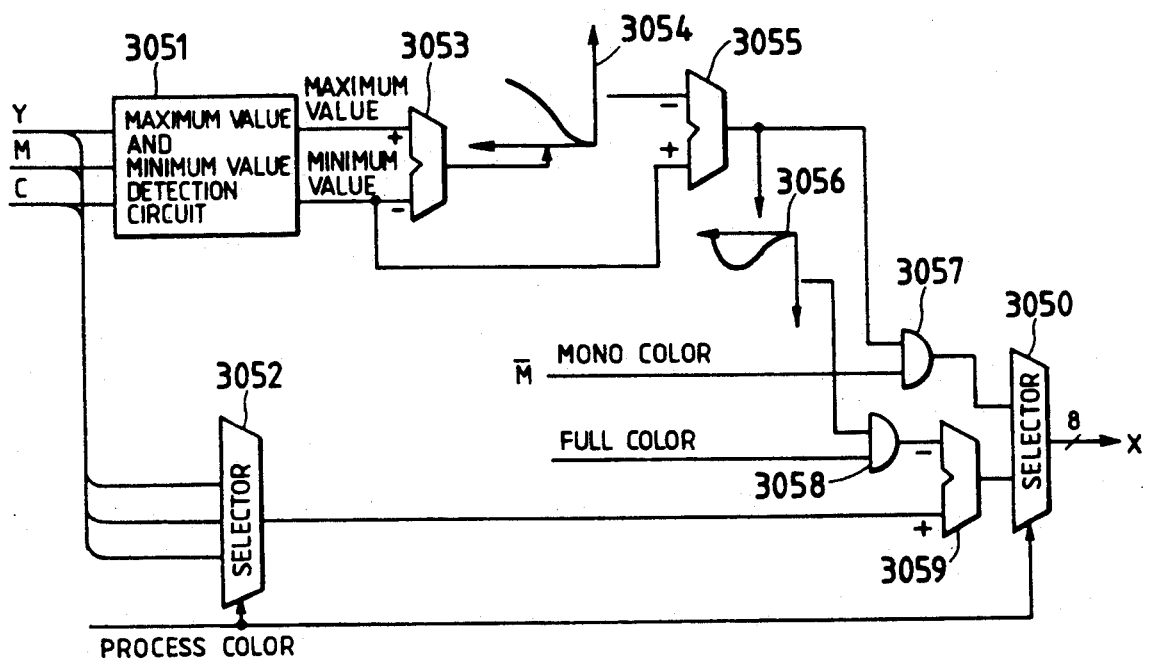
Figure 15G:
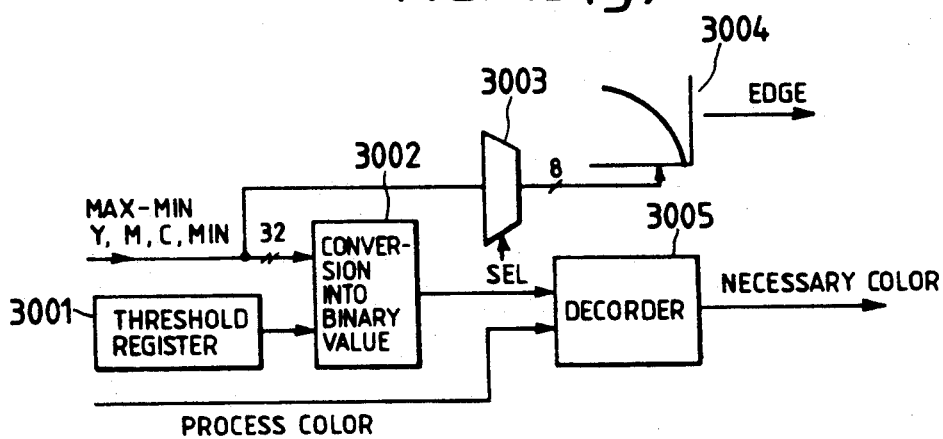
Figure 15H:
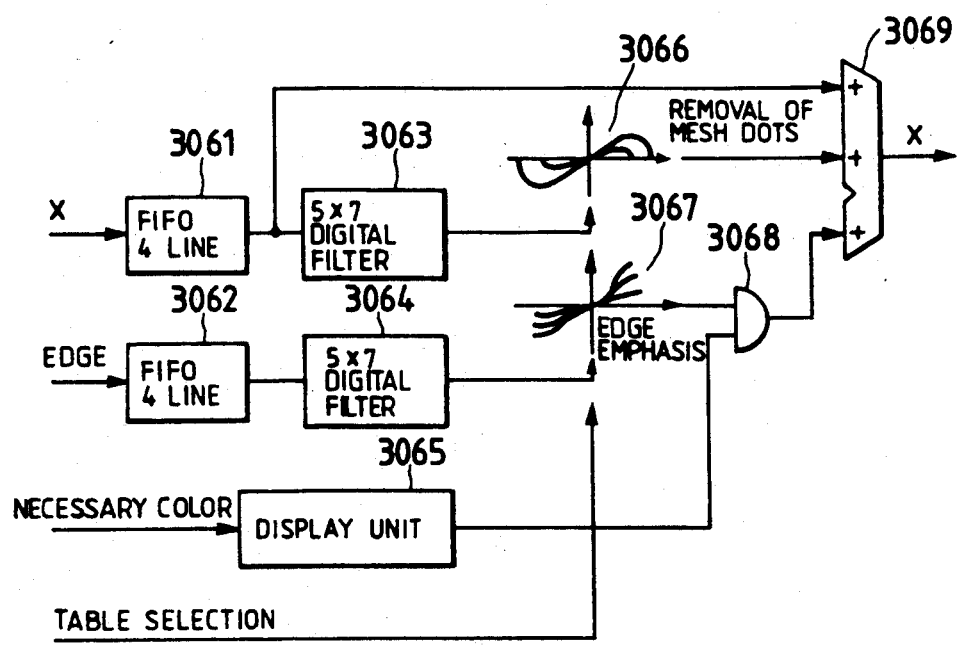
Figure 15J:
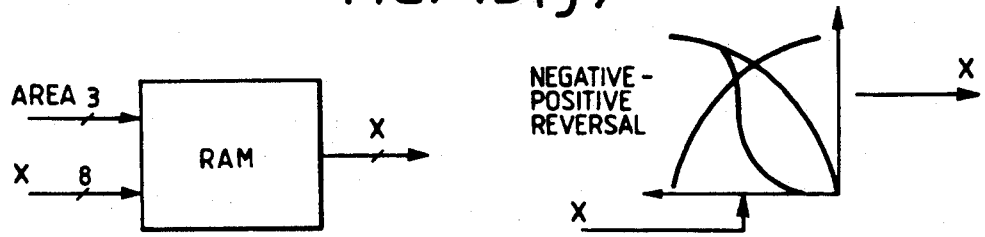
Figure 15K:
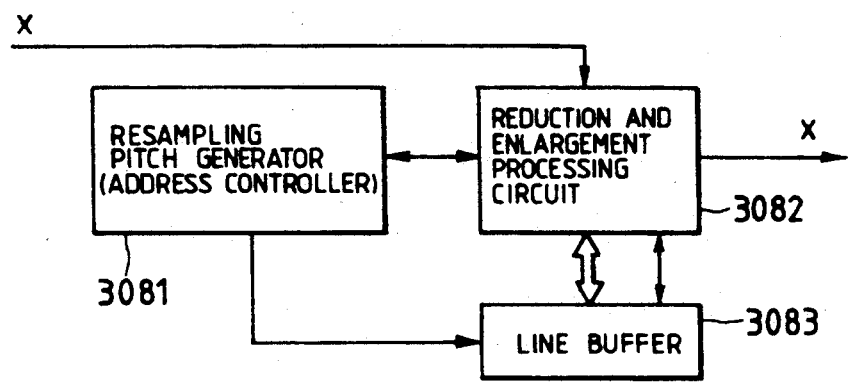
Figure 15I:
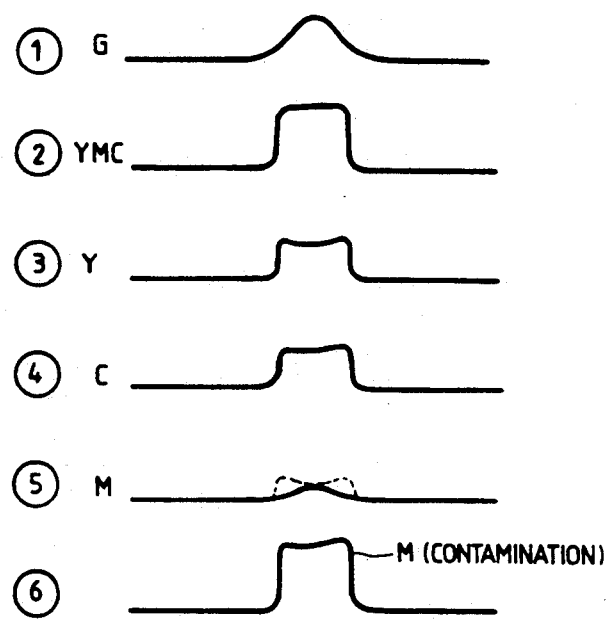
Figure 15L:
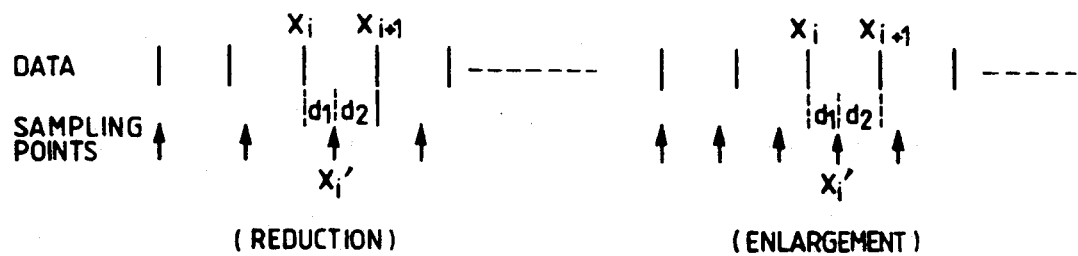
Figure 15M:
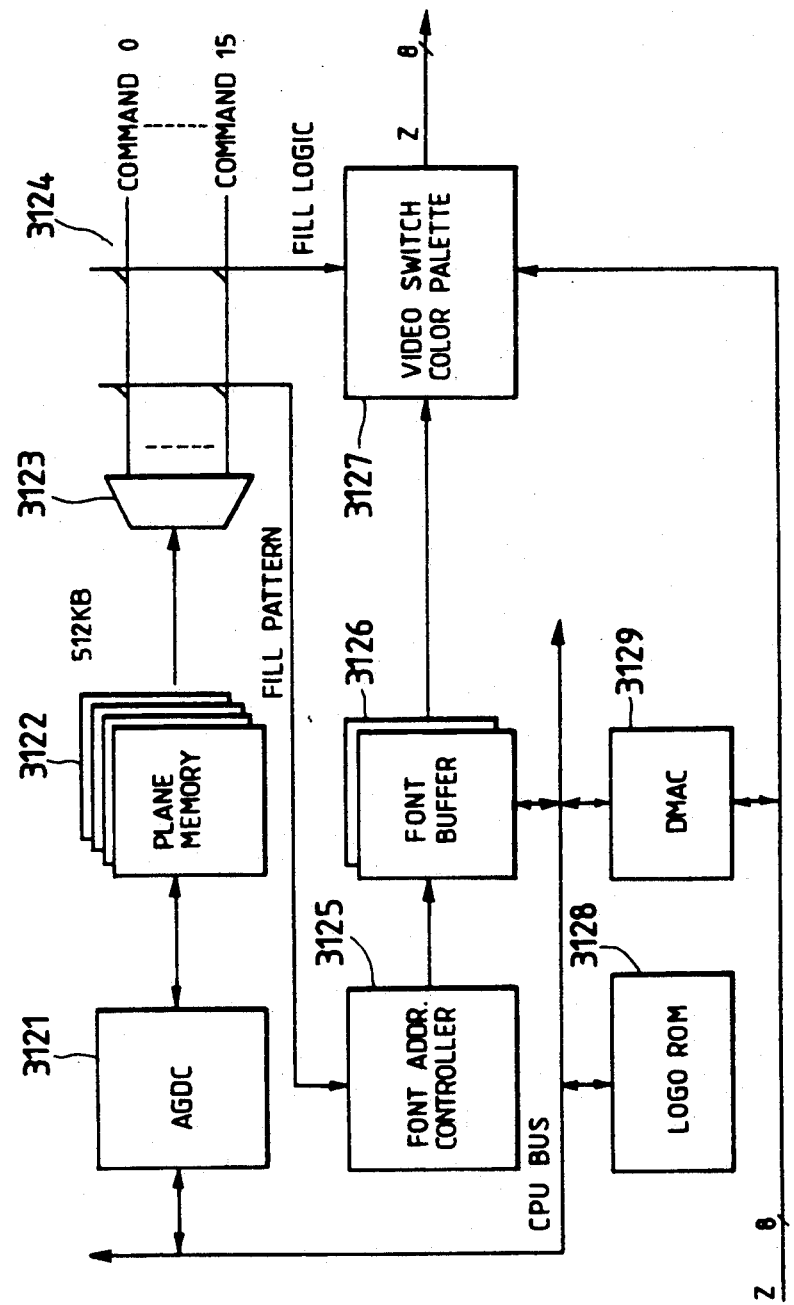
Figure 15N:
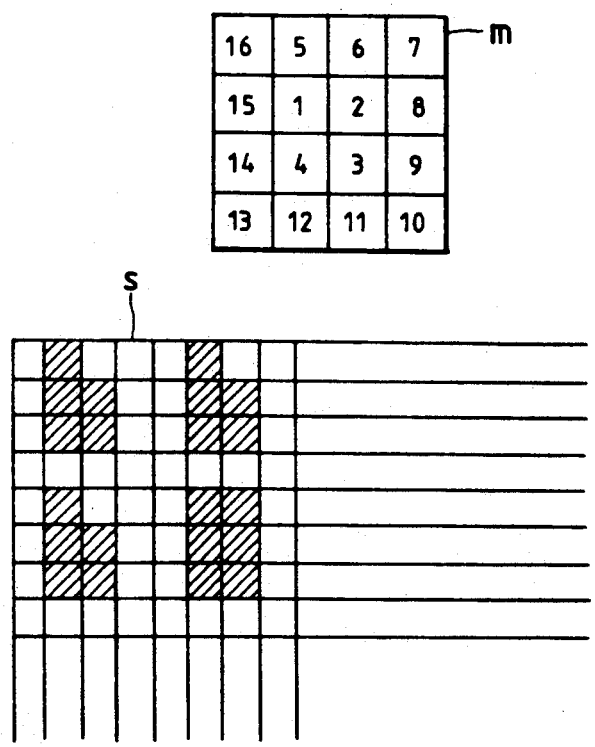
Figure 15O:
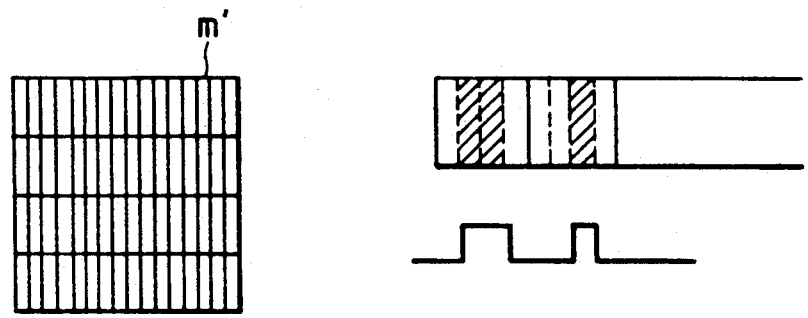
Figure 15P:
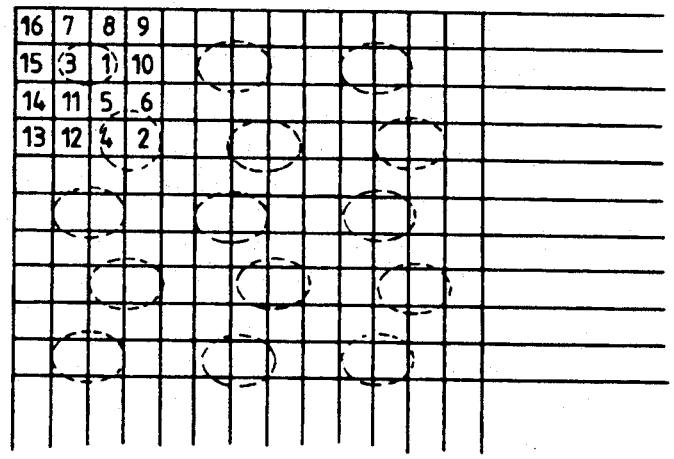
Figure 15Q:
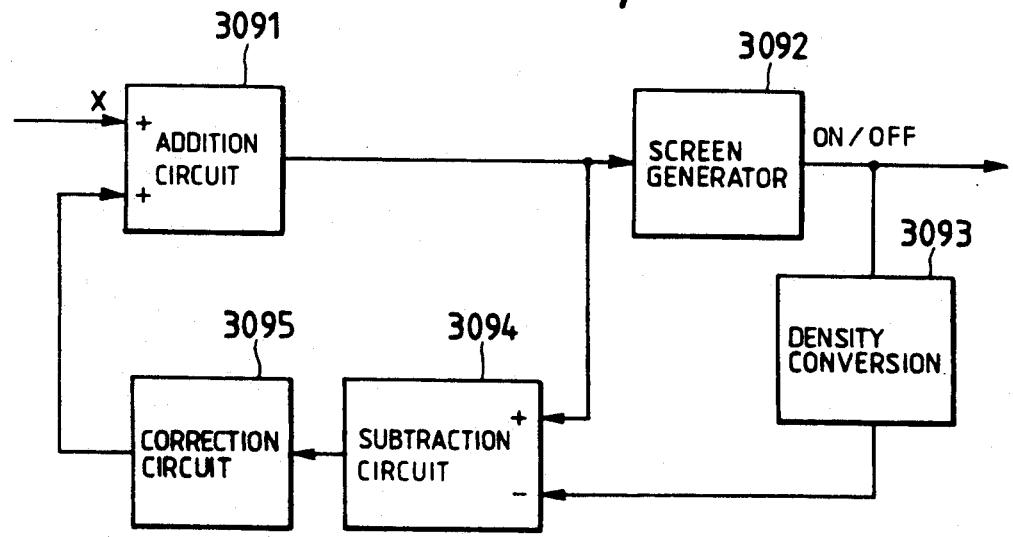

FIGS. 15(a) through 15(q) are explanatory diagrams for explaining the respective modules of the IPS.

a) END conversion module

The END conversion module 301 adjusts (converts) the optically read signal of the color original obtained by the IIT into a gray balanced color signal. The toners of the color image are equal to one another when the color is gray. The toner amount of gray is used as a reference toner amount. However, the separated color signals of B, G and R produced from the IIT when it reads the gray document, are not equal in value, because the spectral characteristics of the light source and the color separation filter are not ideal. These imbalanced color signals are balanced by using a converting table (LUT: look up table) as shown in FIG. 15(a). This balancing work by the LUT is the END conversion. When a gray original is read, the LUT converts the B, G and R color separated signals into those signals at the equal gradation in accordance with a level (black→white) of the read gray. The LUT depends on the characteristics of the IIT. 16 LUTs are used. Of those LUTs, 16 tables are for the film projectors including negative films. 3 tables are for copy, photograph, and generation copy.

b) Color Masking Module

The color masking module 302 converts the B, G and R color signals into signals indicative of toner amounts of Y, M and C, respectively, through a matrix operation. This conversion is applied to the signals after these are subjected to the gray balance adjustment by the END conversion.

In this instance, the conversion matrix for the color masking is a 3×3 matrix exclusively used for converting the B, G and R into Y, M and C. A matrix capable of dealing with BG, GR, RB, $B^2$, $G^2$, and $R^2$, in addition to B, G and R may also be used. Any other suitable matrix may be used, if necessary. Two sets of matrices are used, one for an ordinary color adjustment and the other for emphasis signal generation in the mono color mode.

Thus, when the video signal from the IIT is processed by the IPS, the gray balance adjustment is first conducted. If it follows the color masking process, the gray balance adjustment using the gray original must be made allowing for the characteristics of the color masking. This makes the conversion table more intricate.

c) Original Size Detection Module

Original to be copied contains not only the standard size document, but also patched up documents and others. To select paper of a proper size corresponding to the size of an original, it is necessary to detect the original size. In case that the paper size is larger than the original size, if the peripheral region of the original is masked, the resultant copy is excellent. For this reason, the original size detection module 303 detects the original size at the time of scanning and suppresses the platen color (edge suppress) at the time of scanning to read the original image. Accordingly, color, for example, black, that is clearly distinguished from the original is used for the platen color. The upper limit value and lower limit value for the platen color discrimination are set in a threshold register 3031, as shown in FIG. 15(b). At the time of prescan, the signal is converted (γ conversion) into a signal X representing the data approximate to the reflectivity of the original (by using the spatial filter 306 to be given in detail). The signal X is compared with the upper/lower limit value as is set in the register 3031, by a comparator 3032. An edge detect circuit 3034 detects the edge of the original, and stores the maximum and minimum values of X and Y in the coordinates into a max./min. sorter 3035.

As shown in FIG. 15(*d*), when the original is obliqued or its figure is not rectangular, the maximum values and the minimum values (x1, x2, y1, y2) at four points on the outline of the figure are detected and stored. At the time of scanning for reading the original, the comparator 3033 compares the Y, M and C of the original with the upper/lower limit values in the register 3031. A platen color suppress circuit 3035 suppresses the pictorial information outside the edge, viz., the read signal of the platen, to effect the edge suppressing processing.

d) Color Change Module

The color change module 305 sets up a condition that a designated color in a specific area on an original is erasable. As shown in FIG. 15(*c*), this module is made up of a window comparator 3052, threshold register 3051, and color palette 3053. To effect color change, the upper/lower limit values of Y, M and C of the colors to be changed are set in the threshold register 3051. the upper/lower limit values of Y, M and C of the converted colors are set in the the color palette 3053. According to an area signal applied from the area image control module, the NAND gate 3054 is controlled. When it is not a color change area, the color signals of Y, M and C of the original are transferred from a selector 3055, as intact. When the color change area is reached, and the color signals of Y, M and C of the original are between the upper limit values and the lower limit values as set in the threshold register 3051, the selector 3055 is switched by the output signal of the window comparator 3052 and it sends the converted color signals of Y, M and C that are set in the color palette 3053.

As for the designated color, by directly pointing an original by a digitizer, 25 pixels of B, G and R in the vicinity of the coordinates as designated at the time of prescan are averaged and the designated color is recognized on the basis of the average. By the averaging operation, even in the case of the 150 lines original, the designated color can be recognized with the precision within 5 of color difference. To the B, G and R density data, the designated coordinates are converted into an address and the density data are read out of the IIT shading correction circuit, with that address. In the address conversion, readjustment corresponding to the registration adjustment is needed, as in the case of the original size detection. In the prescan, the IIT operates in the sample scan mode. The B, G and R density data read out of the shading RAM are subjected to a shading correction by a software, and averaged. Further, the data are subjected to the END correction and the color masking, and then are set in the window comparator 3052. The registered colors are selected from 16,700,000 colors, and up to eight colors can be simultaneously registered. The reference color prepared include a total of 14 colors, Y, M, C, G, B and R, colors between these colors, and K and W.

e) UCR/Black Generation Module

When the color signals of Y, M and C, if these have equal quantities, are combined, gray is produced. Theoretically, the same color can be obtained by replacing the colors of Y, M and C of equal quantities with black. In this case, however, the color is impure and hence the reproduced color is not fresh. To cope with this problem, the UCR/black generation module 305 generates a proper amount of K to prevent such a color impurity, and equally reduces the toner colors Y, M and C in accordance with the amount of the generated K (this process is called an under color removal (UCR)). More specifically, the maximum and the minimum values of the toner colors Y, M and C are detected. A K is generated by a conversion table in accordance with the difference between the maximum value and the minimum value. Further, the toner colors Y, M and C are UCR processed in accordance with the generated K.

As shown in FIG. 15(*e*), in the case of a color closer to gray, the difference between the maximum and the minimum values is small. Accordingly, the minimum value or its near value of each color Y, M and C is removed for generating the color K. When the difference is large, the removal quantities of the colors Y, M and C are set below the minimum values of them, thereby to reduce the quantity of the generated K. In this way, the mixing of tusche into the pure color and the hue degradation of a low gradation, high hue color can be prevented.

In FIG. 15(*f*) showing a specific circuit arrangement of the UCR/black generation module, a max./min. value detector 3051 detects the maximum and the minimum values of the process colors Y, M and C. A calculating circuit 3053 calculates the difference between the maximum and the minimum values of each color. A conversion table 3054 and another calculating circuit 3055 cooperate to generate the black K. The conversion table 3054 adjusts the value of K. When the difference the maximum and the minimum values is small, the output signal of the conversion table is zero. Accordingly, the calculating circuit 3055 produces the minimum value as intact in the form of the value of K. When the difference is large, the output value of the conversion table 3054 is not zero, the calculating circuit 3055 subtracts the difference from the minimum value and produces the result of the subtraction as the value of K. A conversion table 3056 provides the values to be removed from the colors Y, M and C in accordance with the K value. In cooperation with the conversion table 3056, an additional calculating circuit 3059 subtracts the values as defined by the k value from the process colors Y, M and C. AND gates 3057 and 3058 operate for the signal K, and the signals of Y, M and C after UCR processed in accordance with the signals in the mono color mode and the full color mode. The selector 3052 and 3050 are used for selecting any of the toner signals Y, M, C and K by the process color signals. A color is thus reproduced by the mesh points of Y, M, and C are used. Accordingly, the curves and tables that are empirically formed are used for the removal of Y, M and C and for determining the generation ratio of K.

f) Spatial Filter Module

In the color image recording apparatus incorporating the present invention, the IIT reads an image of an original while the original image being scanned by the CCD. When the data is used as intact, the resultant data is faded data. The mesh points are used for image reproduction. Accordingly, Moire occurs between the mesh point period of the printed matter and the sampling period of 16 dots/mm. The same phenomenon occurs between the mesh point period generated by the machine and that of the original. The spatial filter module 306 is provided to remove the above fading and the Moire phenomenon. For the Moire removal, a low-pass filter and for edge emphasis, a high-pass filter is used.

In the spatial filter module 306, as shown in FIG. 15(*g*), a selector 3003 selects one of the input signals Y, M, Min and Max-Min. A conversion table 3004 converts it into a data signals approximately indicative of the reflectivity. Use of this type of data makes it easy to pick up the edge data. In this instance, the selected color signal is Y. A threshold register 3001, 40 bit digitizer 3002, and decoder 3005 separates the color signals Y, M, C, Min, and Max-Min into eight colors, Y, M, C, K, B, G, R, and W (white), for each pixel. A decoder 3005 recognizes the hue in accordance with the digitized data signal, and produces a 1-bit data indicative of necessary process color or not.

The output signal of the circuit of FIG. 15(g) is applied to a circuit of FIG. 15(h). In the circuit, an FIFO 3061, 5×7 digital filter 3063, and modulation table 3066 cooperate to generate the mesh-point removal data. An FIFO 3062, 5×7 digital filter 3064, modulation table 3067, and delay circuit 3065 cooperate to generate edge emphasis data by using the output data of the output circuit of FIG. 15(g). The modulation tables 3066 and 3067 are selectively used in accordance with a copy mode used, such as a photograph copy, character only copy, and photo/character copy.

In respect with the edge emphasis, when a green character as shown in FIG. 15(i) (1) is reproduced in the form of a character (2), the colors Y and C are emphasized at the edges as indicated by waveforms (3) and (4), but the color M is not emphasized as indicated by a solid line of a waveform (5). The switching for this is carried out by the AND gate 3068. In this case, if the waveform (5) of M is emphasized as indicated by a broken line, M is emphasized at the edges as shown in a waveform (6) and accordingly the color purity is lost. To switch the emphasis by the AND gate 3068 for each process color, the delay circuit 3065 synchronizes the FIFO 3062 with the 5×7 digital filter 3064. When a fresh green character is reproduced by using the conventional image processing, the magenta M is emphatically mixed into the green character and the color purity is lost. To solve this, the spatial filter module, when recognizing green, outputs the colors Y and C in an ordinary manner, but outputs the magenta M being not edge emphasized.

g) TRC Conversion Module

The IOT exercises the copy cycles four times using process colors of Y, M, C and K in accordance with an on/off signal derived from the IPS (in the case of the full color copy). With this, reproduction of a full color original is realized. Actually, however, to exactly reproduce the colors theoretically obtained through the signal processing, delicate and careful adjustment is required taking the characteristics of the IOT into consideration. The TRC conversion module is used for improve the color reproduction. An address conversion table containing various combinations of Y, M and C which is accessed with 8-bit image data is stored in the RAM, as shown in FIG. 15(j). With use of such a table, the following various functions, such as density adjustment, contrast adjustment, negative/positive inversion, color balance adjustment, character mode, and transparent composition, may be exercised in accordance with an area signal. The bits 0 to 3 of the area signal are assigned to the upper three bits of the RAM address, respectively. In an out-of-area mode, the above functions may be appropriately combined. In this instance, the RAM has a memory capacity of 2 k bytes (256 bytes'8 planes), and eight conversion tables. During the IIT carriage return, a maximum of 8 conversion tables are stored every cycle of Y, M and C. These tables are selectively used in accordance with an area designation and a copy mode used. If the memory capacity of the RAM is increased, there is no need for storing the tables every cycle.

h) Reduction/Enlargement Module

The reduction/enlargement module 308 exercises the reduction/enlargement processing by a reduction/enlargement processor 3082 during a period that data X is temporarily stored in a line buffer 3083 and then is transferred therefrom. A resampling generator/address controller 3081 generates a sampling pitch signal and a read/write address for the line buffer 3083. The line buffer 3083 serves as a ping-pong buffer of two lines in which line data is read out of one of one of the lines, while at the same time the next line data is written into the other line. The reduction/enlargement processing in the main scan direction is digitally processed by the reduction/enlargement module 308. For the reduction/enlargement in the vertical scan direction, the scan speed of the IIT is appropriately varied. The scan speed is varied in the range from 2 times to ¼ time, to vary the magnification from 50% to 400%. In the digital processing, when the data is transferred to and from the line buffer 3083, the reduction is based on a thin- out interpolation, while the enlargement is based on an additional interpolation. When the data lies between the adjacent sampling points, the interpolation data is obtained by weighting the in-between data in accordance with the distances of that data to the data located on both sides, as shown in FIG. 15(l). If the data is Xi', for example, the following calculation $$(Xi \times d2) + (Xi+1 \times d1)$$

where $d1 + d2 = 1$, and d1 and d2 are distances from a sampling point to the data Xi and Xi+1 on both sides of the data Xi'.

In the reduction processing, data is loaded into the line buffer 3083 while interpolating the data. At the same time, the reduced data in the previous line is read out of the buffer, and sent to the succeeding stage. In the enlargement processing, the data is loaded into and temporarily stored in the line buffer, while the data is interpolated for enlargement while reading the previous line data out of the line buffer. When the interpolation for enlargement is conducted at the time of writing, a clock frequency must be increased in accordance with a magnification. Such an enlargement process, however, allows the same clock to be used for both the read and write operations. Further, the shift image processing in the main scan direction is possible by reading data at a mid point between one read timing and the next read timing or by delaying the read timing. The repetitive processing is possible by repeatedly reading data. The mirror image processing is also possible when data is read out in the reverse direction.

i) Screen Generator

A screen generator 309 converts a gradation toner signal of each process color into an on/off or binary toner signal. In the screen generator, the digitizing processing and the error diffusion processing are conducted by comparing a threshold matrix with the gradated data. The IOT receives the binary toner signal, and turns on and off a laser beam to reproduce a halftone image. In this case, the laser beam is elliptically shaped in cross section with its geometry of about 80 $\mu m\phi/$ long and about 60 $\mu m\phi/$ wide. These figures are selected so as to satisfy the recording density of 16 dots/mm.

How to express a gradation will first be described. Description to follow is directed for forming halftone cells each of 4×4, for example, as shown in FIG. 15(n). To form the cells, the screen generator sets up a threshold matrix "m" corresponding to such a halftone cell. Then, it compares the matrix with the gradated data. If the value of data is "5", the screen generator generates signals that is turned on in the squares of the matrix "m" whose figures are less than "5".

The 4×4 halftone cell of 16 dots/mm is generally called a mesh point of 100 psi and 16 gradations. If an image is depicted by such mesh points, the image reproduction is poor. In the present invention, to increase the gradations, the 16 dots/mm pixel is further divided into four in the vertical direction (main scan direction). Accordingly, the laser beam is turned on and off at the $\frac{1}{4}$ unit distance, viz., at the 4-times frequency, as shown in FIG. 15(o). The gradation attained is four times that of the conventional gradation expressing method. To this end, a threshold matrix "m'" as shown in FIG. 15(o) is set up in the present invention. Further, if a submatrix method is used, the number of lines will effectively be increased.

The above instance uses the threshold matrices "m" of the type in which the center portion of each halftone cell is used as a sole growth nucleus. In the submatrix method, a pixel consists of a plurality of unit matrices. Each matrix has two growth nuclei or more, as shown in FIG. 15(p). If such a screen pattern design method is used, the number of lines and the gradation may be changed in accordance with bright or dark portions, in such a way that 141 psi and 64 gradations are used for bright portions, and 200 psi and 128 gradations, for dark portions. Such a pattern may be designed while visually judging smoothness in gradation, definition, graininess, and the like.

When the halftone image is reproduced by using the above dot matrix method, the gradation or gray level and the resolution contradictively coexist. For example, if the gray level is increased, the resolution becomes poor. On the other hand, if the resolution is increased, the gray level is decreased. If small threshold data matrices are used, the actually outputted image suffers from quantization error. The error diffusion processing is to improve the gradation reproducibility in such a manner that as shown in FIG. 15(q), the quantization errors of of the on/off or binary signal generated by a screen generator 3092 and the input gradation signal are detected by a density converting circuit 3095 and adder 3091, and are fed back by using a correction circuit 3095 and an adder 3091. For example, the corresponding position of the previous line and the pixels on both sides of it are convoluted through a digital filter.

The screen generator changes over the threshold error and a feedback coefficient for the error diffusion processing every original or area in accordance with the type of image, such as halftone images and character images. In this way, the reproduction of images of high gradation and high definition is improved.

j) Area Image Control Module

In the area image control module 311, seven rectangular areas and a priority order of them can be set in an area generator. Control data relating to the respective areas are set in a switch matrix. The control data includes data of color change and a color mode indicative of mono color or full color, modulation select data of photo graph, characters, and the like, select data of TRC, select data of the screen generator, and the like. The control data is used for controlling the color masking module 302, color conversion module 304, UCR module 305, spatial filter 306, and TRC module 307. The switch matrix may be set by software.

k) Edit Control Module

The edit control module executes an outline-drawing processing in which an original bearing a circular figure, such as a circular graph, not a rectangular figure is read, and a specified area whose configuration is indefinite is painted with specified color. As shown in FIG. 15(m), a CPU bus is clustered with an AGDC (advanced graphic digital controller) 3121, font buffer 3126, logo ROM 3128, and DMAC (DMA controller) 3129. The CPU writes encoded 4-bit area command into a plane memory 3122 through the AGDC 3121, and font is loaded into the font buffer 3126. The plane memory 3126 consists of four memory planes. Each point on an original can be set by 4 bits of planes 0 to 3 in such a manner that for "0000", a command 0 is used to output an original. It is a decoder 3123 that decodes the 4-bit data into commands 0 to 15. It is a switch matrix 3124 that converts the commands 0 to 15 into commands to make jobs of fill pattern, fill logic, and logotype. A font address controller 3125 generates an address of a font buffer 3126 in accordance with a pattern such as mesh point shade and hatching shade, by using a 2-bit fill pattern signal.

A switch circuit 3127 selects one of document data X, font buffer 3126 and color palette in accordance with a fill logic signal of the switch matrix 3124 and the contents of the original data X. The fill logic is used to fill only the background (of original) with a color mesh, to change the color in a specific portion of the image to another color, and to mask or trim a specific portion of the image, and to fill there with a color.

As seen from the foregoing description, in the IPS, the read signals from the IIT are subjected to the END conversion, and the color masking process. The read signals are further subjected to the edge suppress and the color change, and the under color removal process. A tusche color is generated. Then, the read signals are converted into the process colors. In the case of the processings, such as spatial filter, color modulation, TRC, and reduction/enlargement, it is better to use the process colors data rather than to use the full color data, because the amount of processed data is small, and hence the number of the used conversion tables may be reduced to $\frac{1}{4}$. Accordingly, more varieties of the conversion tables may be used, thereby to improve the reproducibility of colors, gradation, and definition.

(B) IPS Hardware

FIGS. 16(a) through 16(d) show a hardware configuration of the IPS.

Figure 16A:
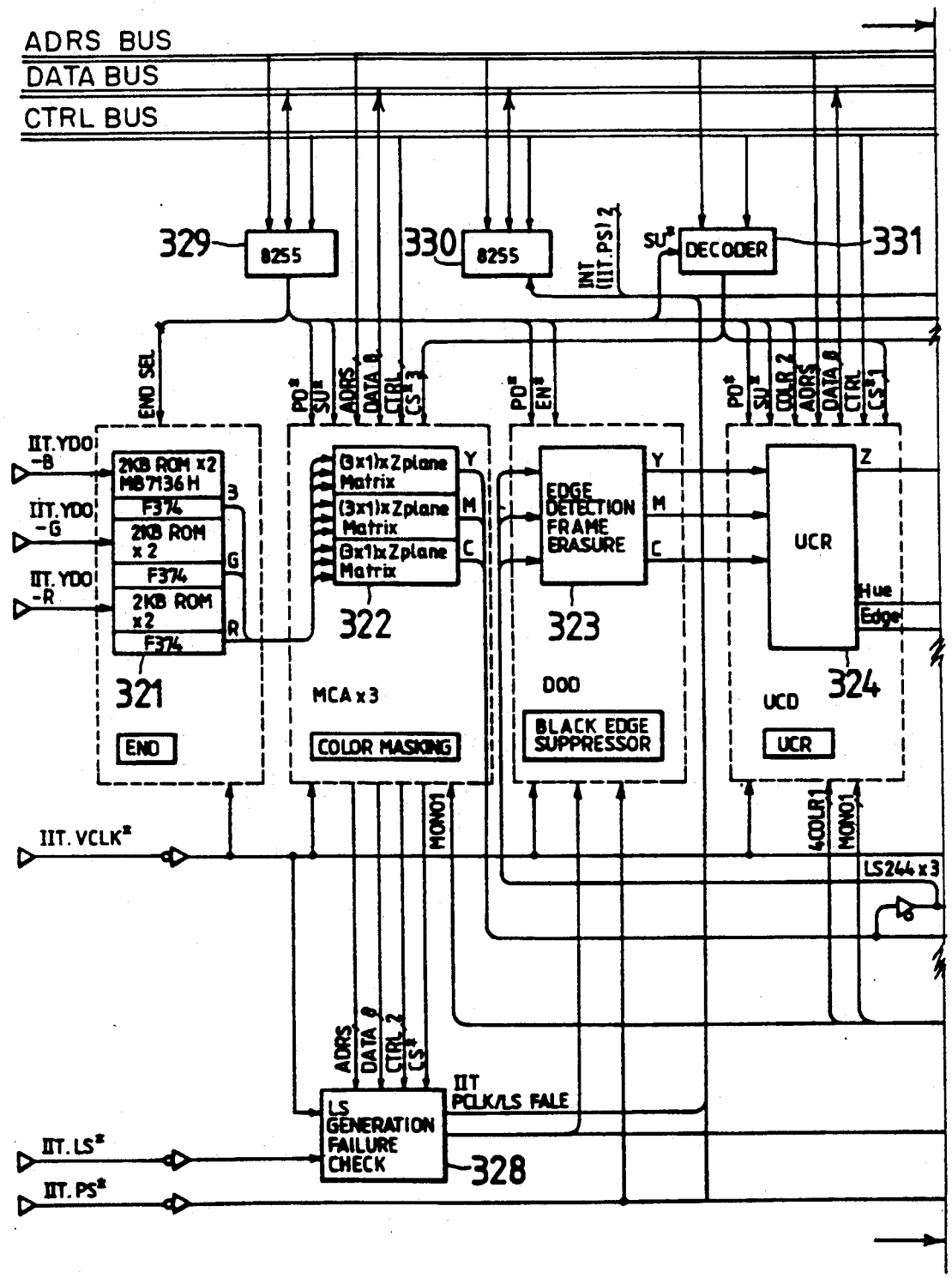
FIGS. 16(a) through 16(d) are diagrams showing a hardware configuration of the IPS.
Figure 16A:
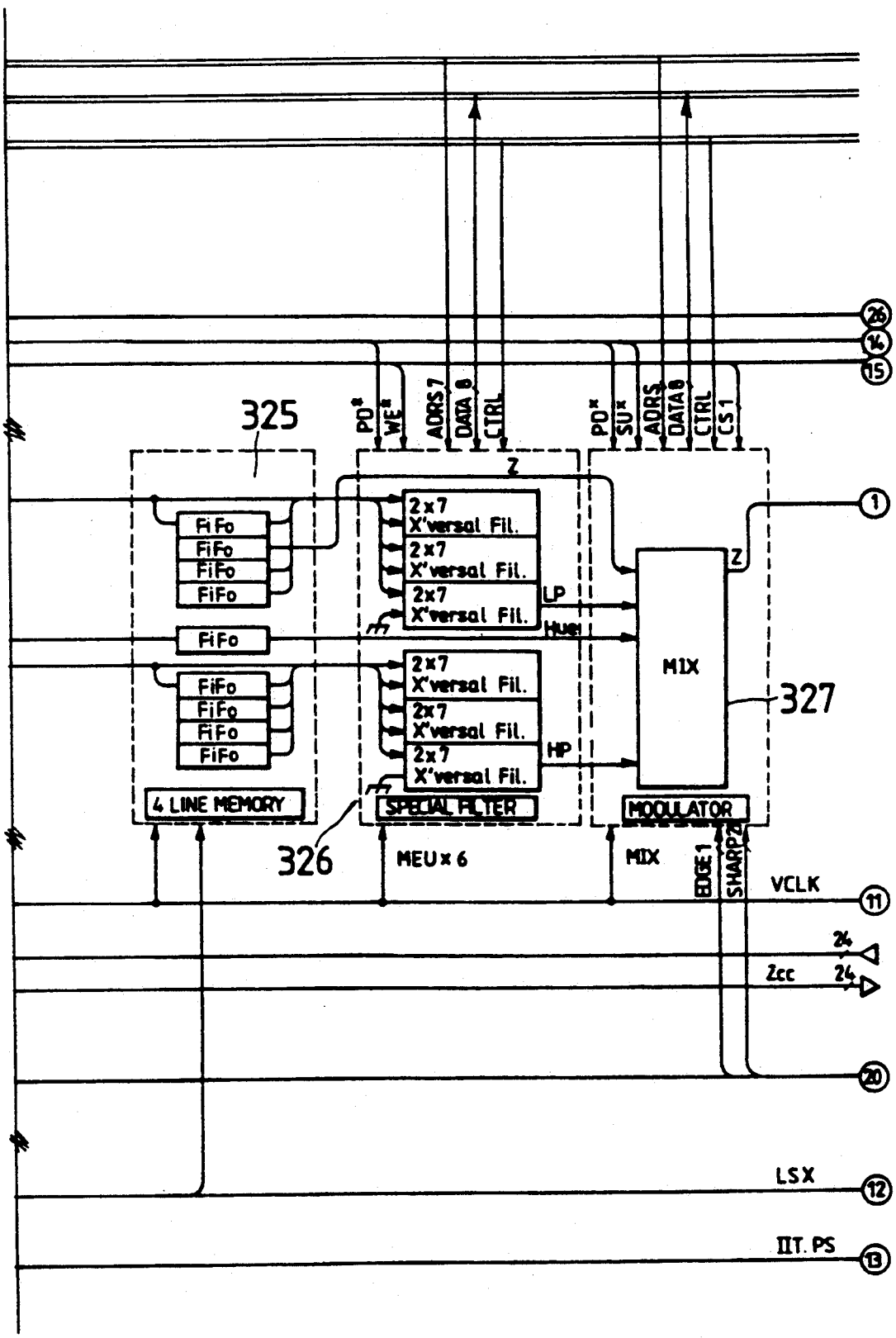
Figure 16B:
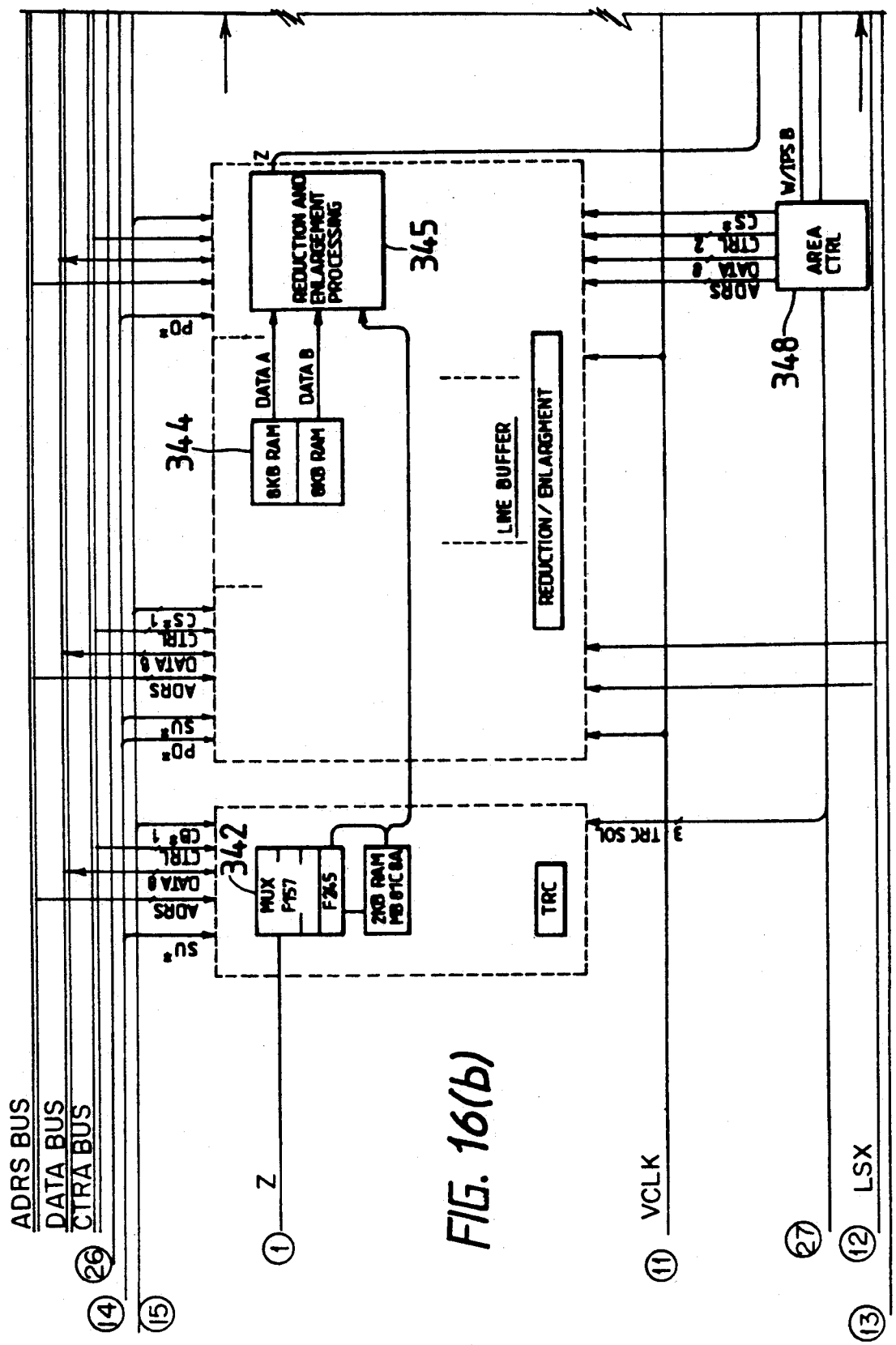
Figure 16C:
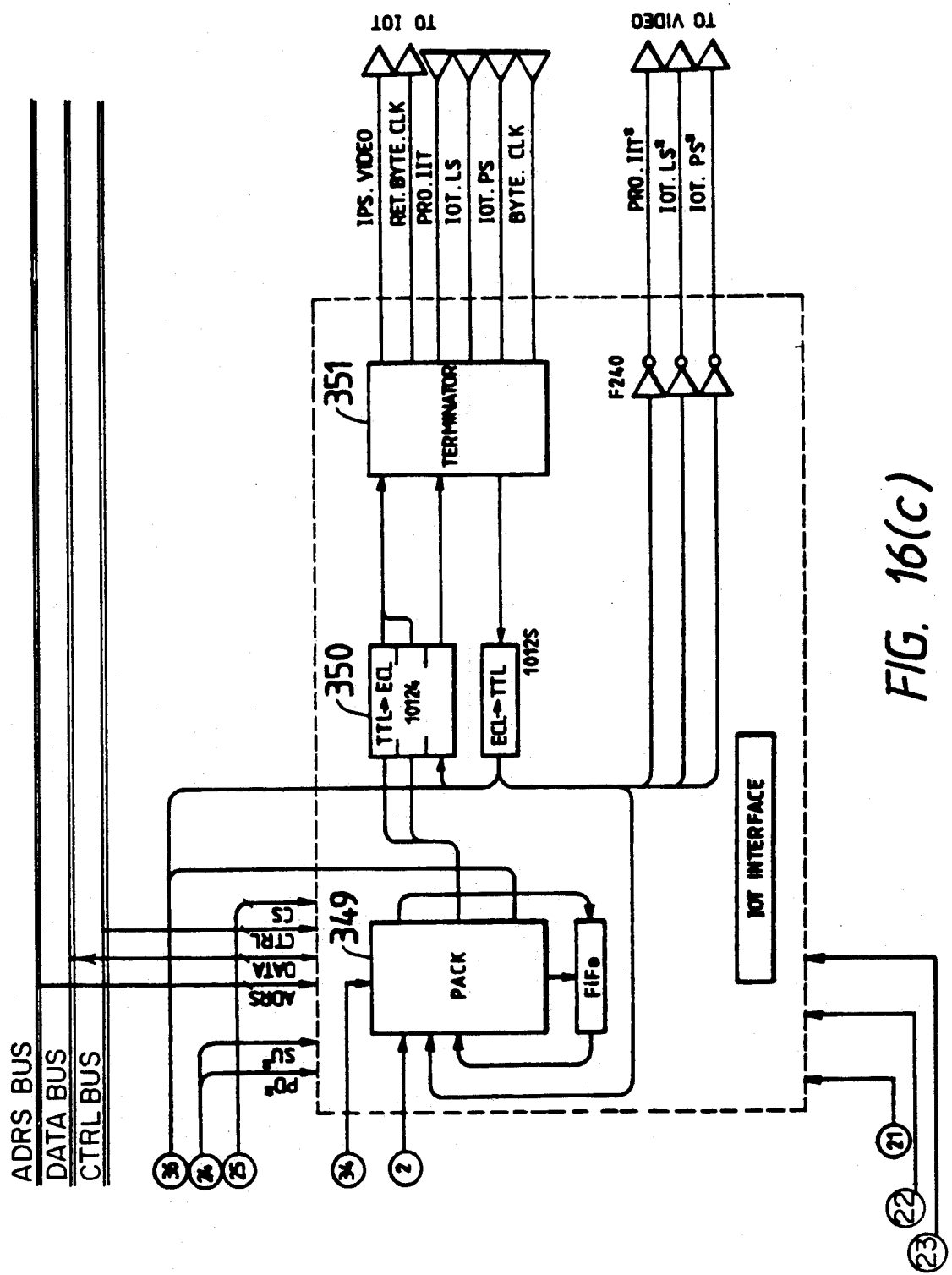
Figure 16D:
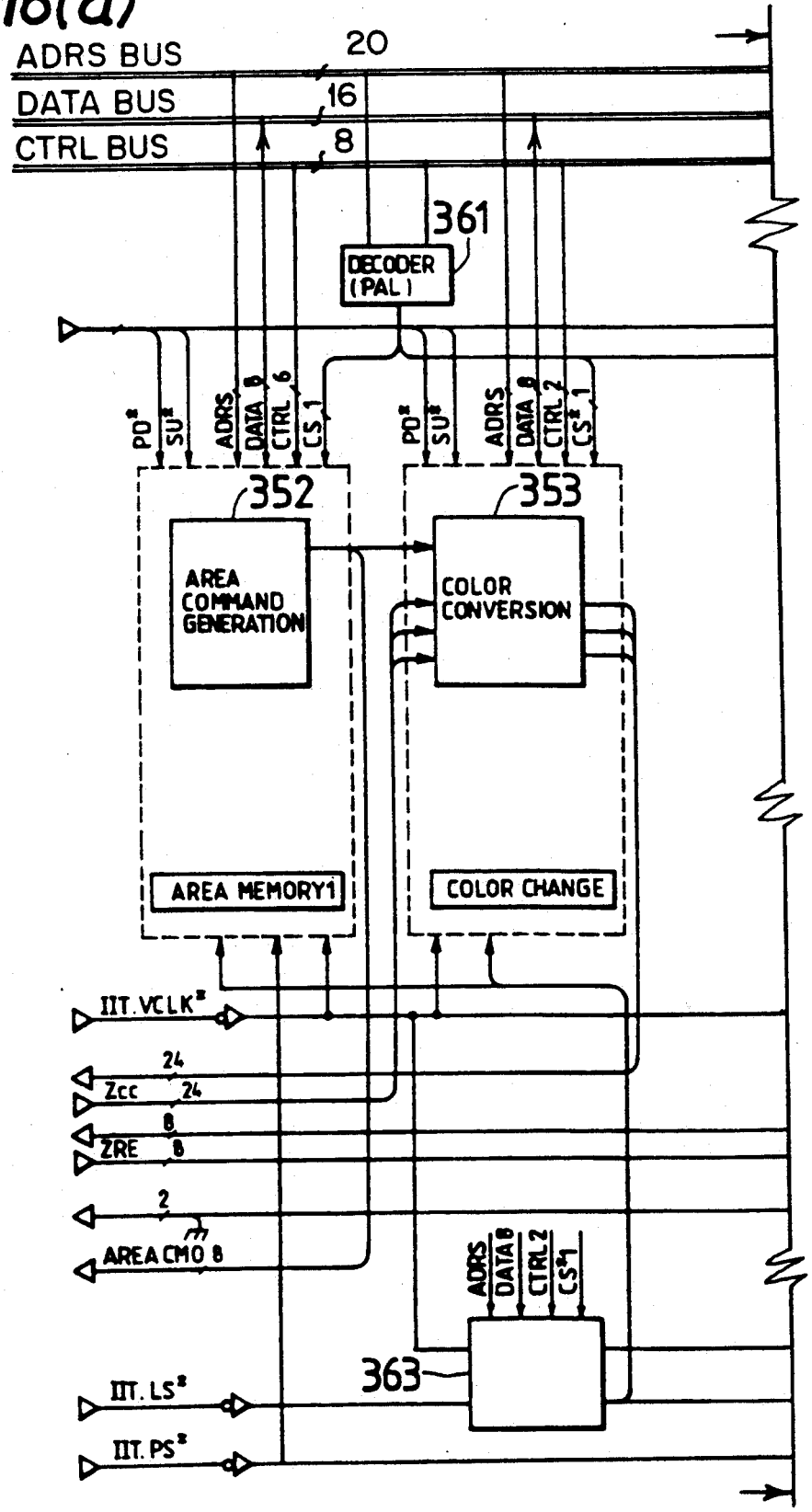
Figure 16D:
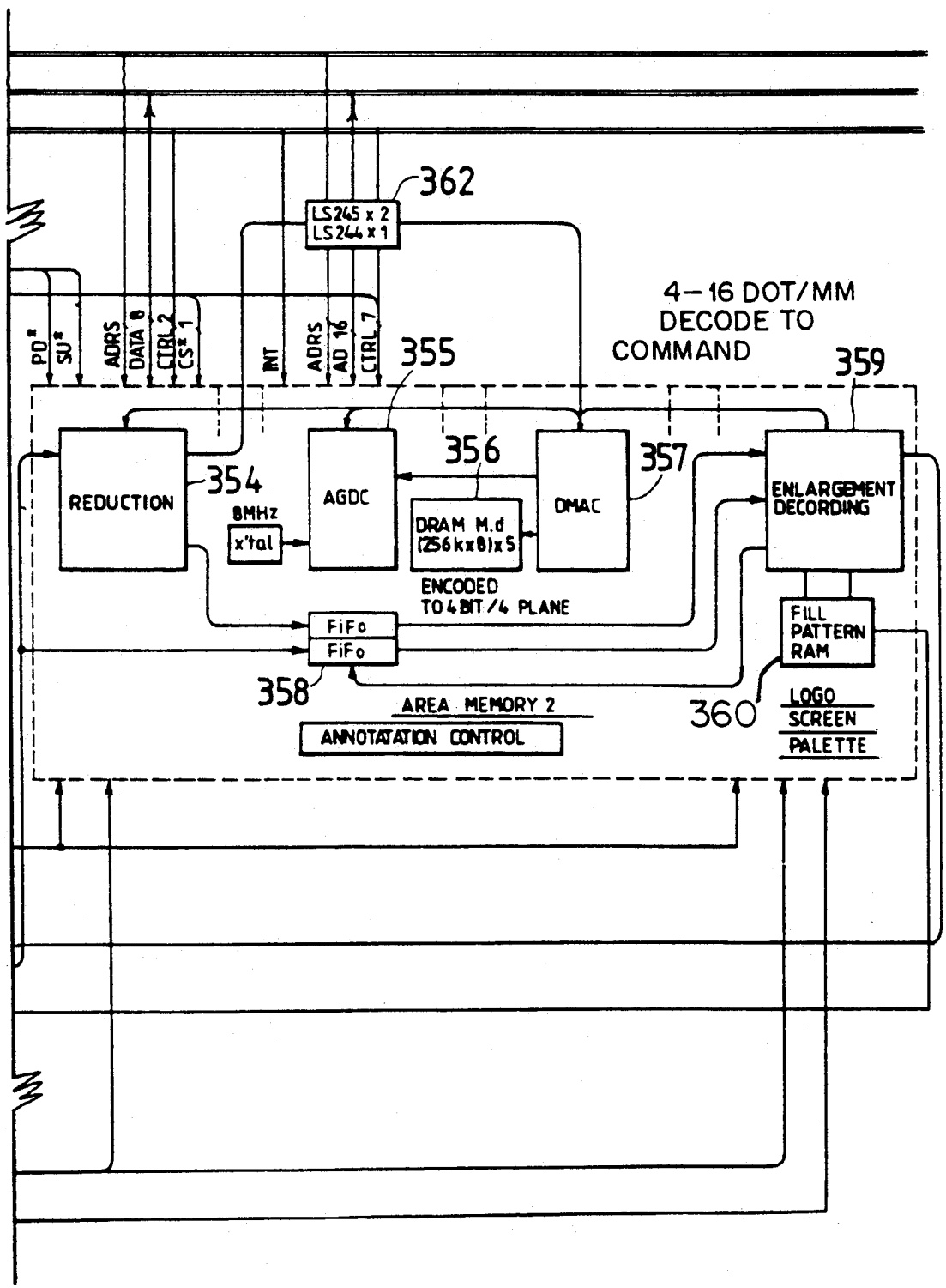

In this instance, a circuitry of the IPS is divided into two circuit boards IPS-A and IPS-B. The circuit board IPS-A contains a circuitry for exercising the basic functions of the color image recording apparatus, such as reproductions of colors, gradation, and definition. The second circuit board ISP-B contains a circuitry for exercising applications and professional works, such as edit works. An arrangement of the circuitry contained in the first circuit board IPS-A is as shown in FIGS. 16(a) through 16(c). A circuit arrangement contained in the second circuit board IPS-B is as shown in FIG. 16(d). During the course of using the copier as the color image recording apparatus of the present invention, there will inevitably occur user's demands for additional and new applications and professional works. The copier may flexibly cope with such demands by merely modifying and altering only the circuitry of the second circuit board IPS-B, because the basic functions of the copier are secured by the circuitry of the first circuit board.

As shown in FIGS. 16(a) through 16(d), the IPS board is coupled with CPU buses including an address bus ADRSBUS, data bus DATABUT and control bus CTRLBUS. The board is also coupled with video data B, G and R from the IIT, video clock IIT VCLK as a sync signal, line sync signal (the main scan direction and the horizontal sync) IIT LS, and page sync (the subsidiary scan direction and the vertical sync) IIT PS.

The video data is pipeline processed in the stage after the ENC converting unit. Accordingly, the video data is delayed by a delay amounting to the number of clocks required for the respective processing stages in the pipeline processing. A line sync generator/fail check circuit 328 is provided for generating and distribute horizontal sync signals to meet such a situation of delay, and for the fail check of the video clock and the line sync signal. Therefore, the line sync signal generator/fail check circuit 328 is coupled with the video clock IIT VCLK and the line sync signal IIT LS. To change the settings of the circuit 328, it is coupled with the CPU buses (ADRBUS, DATABUS and CTRLBUS), and a chip select signal CS.

The video data B, G and R from the IIT are inputted to the ROM 321 in the END converting unit. The END conversion table may be loaded into a RAM, for example, under control of the CPU. Actually, however, when use of the copier progresses, there little occurs a situation that the END table must be altered when the image data is being processed. For this reason, two ROMs of 2 K bytes are used for each of the END conversion tables of B, G and R. That is, this instance employs a LUT (look-up table) system using the ROMs. 16 conversion tables are provided and selectively used by a 4-bit select signal ENDSel.

The END converted data signal outputted from a ROM 321 is coupled with a color masking unit made up of three calculation LSI 322 each having two planes each of 3×2 matrix for each color. The calculation LSI 322 is coupled with the CPU buses. The coefficients of the matrices may be set in the calculation LSI 322 from the CPU. The LSI 322 is coupled with a set-up signal SU and a chip select signal CS. These signals are used for connecting the calculation LSI 322 having processed the image signals to the CPU buses so as to allow the CPU to reprogram the settings in the LSI 322. A 1-bit select signal MONO is coupled with the calculation LSI 322 for selection of the matrices. The LSI 322 further receives a power down signal PD. When no scan is made in the IIT, viz., no image processing is performed, the internal video clock is stopped by the power down signal PD.

Those signals of Y, M and C that have been converted from the color image signals B, G and R by the LSI 322, are applied to a color change LSI 353 in the second circuit board IPS-B shown in FIG. 16(d). Here, the colors of these signals are changed, and inputted to a DOD LSI 323. The color change LSI 353 contains four color change circuits each consisting of a threshold register for setting the not- changed colors, color palette for setting changed colors, and comparator. The DOD LSI 323 contains an original edge detector, black edge suppressor, and the like.

The black edge suppressed data signal outputted from the DOD LSI 323 is applied to an UCR LSI 324. This LSI contains an UCR circuit, black generating circuit, and necessary color generators. The LSI 324 produces a process color X corresponding to the toner color, necessary colors Hue, and edge signal Edge. Accordingly, this LSI also receives a process color designating signal COLR and color mode signals (4COLR, MONO).

The line memory 325 consists of two types of FIFOs. The first FIFOs are used for storing the data of 4 lines in order to transfer the signals of the process color X, necessary colors Hue, and edge Edge to a 5×7 digital filter 326. The second FIFOs are for adjusting the delays by the first FIFOs. The process color X and edge Edge signals of 4 lines are stored, and a total of five lines of those data signals are transferred to the digital filter 326. The data signal of the necessary color Hue is delayed by the FIFO, to synchronize it with the output data signal of the digital filter 326, and then is transferred to a MIS LSI 327.

The digital filter 326 consists of a couple of 5×7 filters (low-pass filter LP and high-pass filter HP) each consisting of three 2×7 filter LSIs. One of the 5×7 filter is used for processing the process color X, and the other, for processing the edge Edge data signal. The MIS LSI 327 applies the mesh-point removal and the edge emphasis to these output data signals by using the conversion tables, and these processed data signals are mixed into the process color X. The LSI 327 receives an edge EDGE signal and a sharp Sharp signal for switching the conversion tables one to another.

The TRC 342 consists of a RAM of 2 K bytes containing eight conversion tables. The conversion table may be reprogrammed during the return period of the carriage before each scan. A 3-bit select signal TRSel is used for selecting any of those conversion tables. The data processed by the TRC 342 is transferred to a reduction/enlargement LSI 345 by a transceiver. In the reduction/enlargement unit, a couple of RAMs 344 of 8 K bytes constitute a ping-pong buffer (line buffer). The LSI 343 generates resampling pitches, and the addresses for the line buffer.

The output data of the reduction/enlargement unit returns by way of an area memory portion in the second circuit board of FIG. 16(d). An EDF LSI 346 contains a FIFO retaining the data of the previous line, and excersizes an error diffusion processing by using the previous line data. A signal X after error diffusion processed is outputted to an IOT interface by way of an SG LSI 347 in a screen generator unit.

In the IOT interface, the signals outputted from the SG LSI 347 that receives it in the form of 1-bit on/off signals are packed into an 8-bit data signal, and sends the 8-bit data signal in parallel to the IOT.

In the second circuit board of FIG. 16(d), the data signal actually flowing in the board are for the 16 dots/mm record density. Because of this, a reduction LSI 354 reduces the data into ¼ and digitizes them, and finally stores them into an area memory. An enlargement decode LSI 359 contains a fill pattern RAM 360. When reading the area data out of the area memory to generate a command, the LSI 359 expands the data into the 16 dots/mm data. By using the expanded data, it generates a log address, color palette, and filter pattern. A DRAM 356, consisting of four planes, stores coded area data of 4 bits. An AGDC 355 is a controller exclusively used for controlling the area commands.

(II-3) Image Output Terminal (IOT)

(A) Outline

Figure 17:
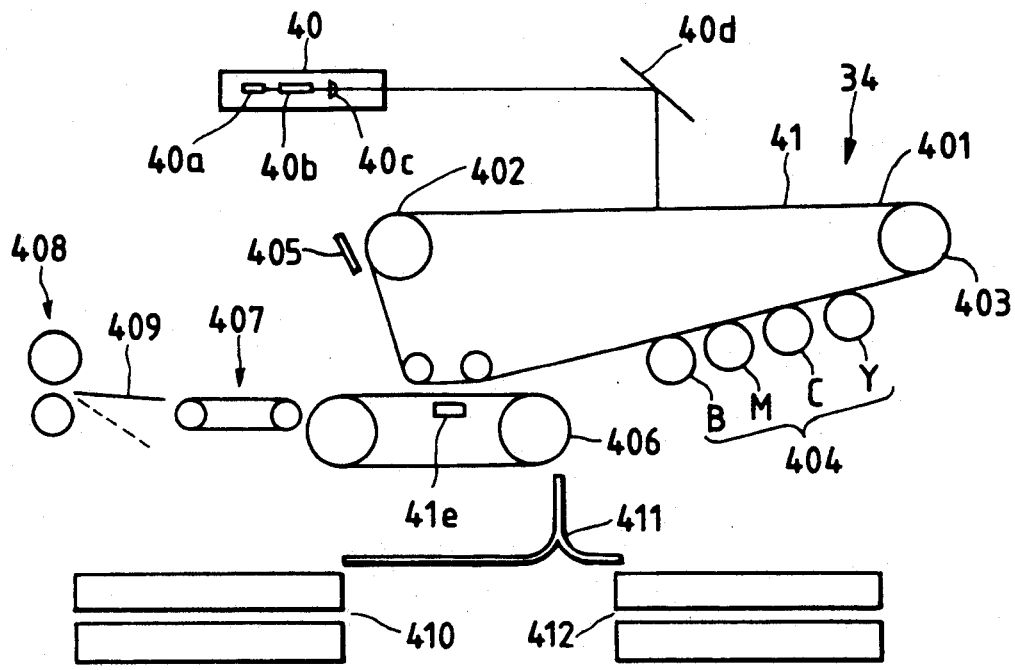
FIG. 17 is an explanatory diagram schematically showing the structure of the IOT.

An outline of the image output terminal (IOT) is shown in FIG. 17.

The IOT uses a photo receptor belt as a photo sensitive member. The IOT is provided with a developing unit 404 consisting of four developing devices of the full color, i.e., black (K), magenta (M), cyan (C) and yellow (Y), a tow roll transfer loop 406 for transferring paper to the transfer unit, a vaccum transfer 407 for transferring paper from the tow roll transfer loop 404 to a fuser 408, paper trays 410 and 412, and a paper transfer path 411. The three units of the photo receptor belt, developing unit 412, and paper transfer path 411 can be pulled out of the IOT to the front side.

The data light obtained by modulating a laser beam from a laser source 40 is guided through a mirror 40d onto the surface of the photo receptor belt 41, thereby forming a latent image thereon. The latent image formed on the surface of the tow roll transfer loop or turtle 41 is developed into a toner image by the developing unit 404. The developing unit 404 consists of four developing devices of K, M, C and Y which are disposed as shown. The layout of the developing devices is determined allowing for a relationship between a dark attenuation and the characteristics of the respective toners, difference in the results of mixing of the respective color toners with the black toner, and the like. In the case of the full color copy, these developing devices are driven in the order of Y→C→M→K.

Papers fed from the two-stage elevator tray 410 and another tray 412 are supplied through the transfer path 411 to the transfer tow roll transfer loop 406. The loop 406 is disposed in the location of the transfer unit, and is made up of a pair of rolls rotatably coupled by a timing chain or a timing belt, and a gripper bar to be given later. The paper is gripped and transferred by using the gripper bar, and the toner image on the the surface of the photo receptor belt is transferred onto the paper. In the case of the 4- color full color, the paper is turned four times by the tow roll transfer belt, during the four turns, the toner images of Y, C, M and K are transferred onto the paper in this order. After the image transfer, the paper is released from the gripper bar, and transferred to the vaccum transfer 407, and fed to the fuser 408. The toner image on the paper is fused by the fuser and delivered outside the base machine.

The vaccum transfer 407 absorbs the difference of the speeds of the transfer loop 406 and the fuser 408, thereby synchronize them in operation. In this instance, the transfer speed (process speed) is 190 mm/sec. In the case of the full color copy, a fusing speed is 90 mm/sec. Thus, the transfer speed is different from the fusing speed. To secure the fusing speed, the process speed is reduced. Since the 1.5 kVA power must be secured, the power cannot be distributed to the fuser.

To cope with this, in the small paper such as B5 and A4 papers, at the instant that the image transferred paper is released from the transfer loop 406 and rides on the vaccum transfer 407, the speed of the vaccum transfer 407 is decreased from 190 mm/sec to 90 mm/sec, thereby to make it equal to the fusing speed. The instant copier is designed to be compact by making the distance between the transfer loop and the fuser as short as possible. The A3 paper is in excess of the distance of the transfer point and the fuser. If the speed of the vaccum transfer is decreased, there inevitably occurs a situation that the leading end of the paper reaches the fuser, but the trailing end portion of the paper is under image transfer process. In such a situation, the paper is braked and consequently a color displacement possibly occurs. To solve this problem, a baffle plate 409 is provided between the fuser and the vaccum transfer. When the A3 paper arrives, the baffle plate is turned down to curve the A3 paper along the plate, thereby to apparently elongate the path between the fuser and the vaccum transfer. Accordingly, the vaccum transfer is operable at the same speed as the transfer speed of the turtle 406. With such an arrangement, after the image transfer is ended, the leading end of the paper reaches the fuser. In other words, the speed difference between the turtle and the fuser is absorbed and both are operable synchronously. The above approach for the A3 paper is correspondingly applied to the OHP, because it has a poor thermal conduction.

The instant copier is designed that a black copy as well as the full color copy can made at a high efficiency. In the case of the black copy, the toner layer is thin and hence it can be fused by a less amount of heat. Accordingly, the fusing speed is 190 mm/sec, viz., without speed down in the vaccum transfer. The same thing is applied to a single color copy, because the single color copy has a single toner layer. After the transfer process is completed, the toner remaining on the surface of the photo receptor belt is wiped out by a cleaner 405.

(B) Transfer Loop

Figure 18A:
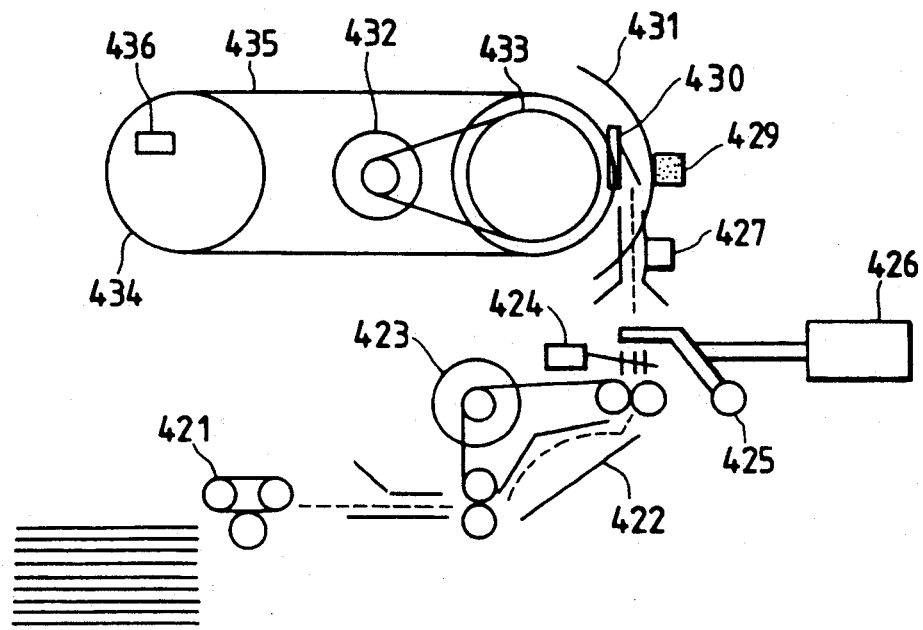
FIGS. 18(a) and 18(b) are explanatory diagrams showing the structure of a transfer unit.

The tow roll transfer loop 406 is configured as shown in FIG. 18(a).

The tow roll transfer loop 406 is featured in that no mechanical paper support member is used to eliminate color irregularity, and the transfer speed can be increased through a speed control.

Papers are picked up from a tray sheet by sheet by a feed head 421, and the picked up paper is transported through a buckle chamber 422 and a regi. gate 425 that is controlled by a regi. gate solenoid 426, to the transfer loop. Arrival of the paper at the regi. gate is detected by a pre-regi. gate sensor 424. The The transfer loop is driven counterclockwise by rotating a roller 433 by a servo motor 432 through a timing belt. No particular drive is applied to another roller 434. A chain or belt for timing is wound around the paired rollers. A grip bar 430 is provided between the chains (in the direction orthogonal to the paper transfer direction). The grip bar is opened at the entrance of the transfer loop with the aid of a solenoid. The gripper 430 grips and pulls about the paper for transfer at the entrance transfer loop. Conventionally, an aluminum or steel support covered with a mylar sheet or mesh supports the paper. When it is heated, difference of thermal expansions over the support makes the support surface irregular. The poor flatness on the support brings about a nonuniform transfer efficiency over the support surface, and consequently a color irregularity. The use of the gripper bar eliminates the need of the paper support, and hence the color irregularity.

The transfer loop is not provided with a support for the transferred paper, and the paper is flung away by the centrifugal force. To hold the paper against the centrifugal force, the paired rollers are designed so as to draw a vaccum, and attract the paper. Therefore, after passing the roller, the paper is transported fluttering. At the transfer point, the paper is electrostatically attracted toward the photo receptor belt near which a detach corotron and a transfer corotron are disposed, and the toner image on the photo receptor surface is transferred onto the paper. After the image transfer, at the exit of the transfer loop, the present position of the gripper bar is detected by a gripper home sensor 436. At a proper timing, the gripper bar is opened by a solenoid to release the paper and transfer it to the vaccum transfer 413.

In the case of the full color copy, the paper is turned around the transfer loop four times, for the color image transfer purposes. In the case of the three-pass color copy, it is turned three times.

Figure 18B:
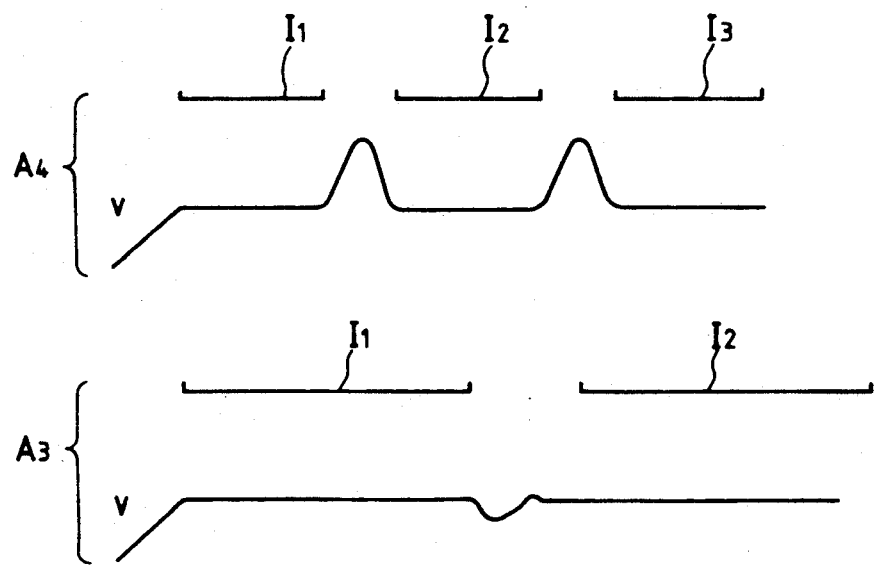

The timing control of the servo motor 432 will be described with reference to FIG. 18(b). The control of the transfer loop is such that, during the image transfer, the servo motor 432 is driven at a constant speed, and that after the transfer process ends, the lead edge transferred onto the paper is coincident with the transfer point of the next latent image. The length of the photo receptor belt 41 is equal to a length within which three latent images can be formed for the A4 paper, and two latent images, for the A3 paper. The length of the belt 435 is slightly longer than the length of the A3 paper, more exactly approximately 4/3 times the length of the A3 paper.

To make a color copy of A4 size, when a latent image I1 of the first color is transferred to the paper, the servo motor 432 is driven at a constant speed. After the transfer ends, the servo motor is rapidly accelerated so that the lead edge transferred onto the paper coincides with the leading edge of a latent image I2 of the second color. To make a color copy of A3 size, after the transfer of the first color latent image I1 ends, the servo motor is decelerated and waits till the lead edge transferred onto the paper coincides with the leading edge of a latent image I2 of the second color.

(II-4) User Interface (U/I)

(A) Use of Color Display

Figure 19A:
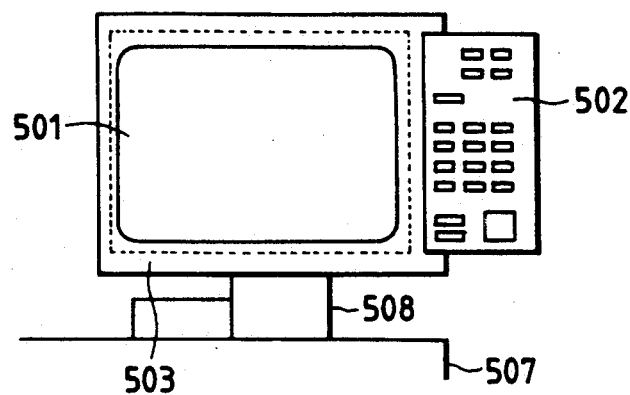
FIGS. 19(a) through 19(c) are diagrams showing an example of mounting an UI using a display.
Figure 19B:
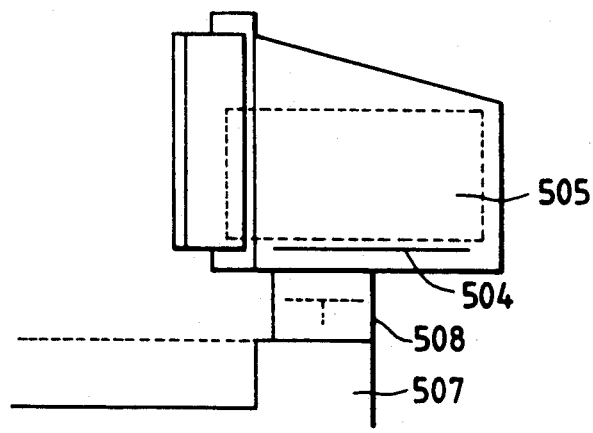
Figure 19C:
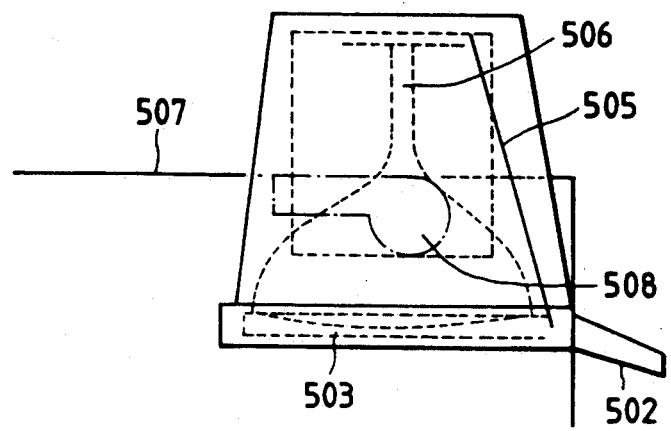
Figure 20A:
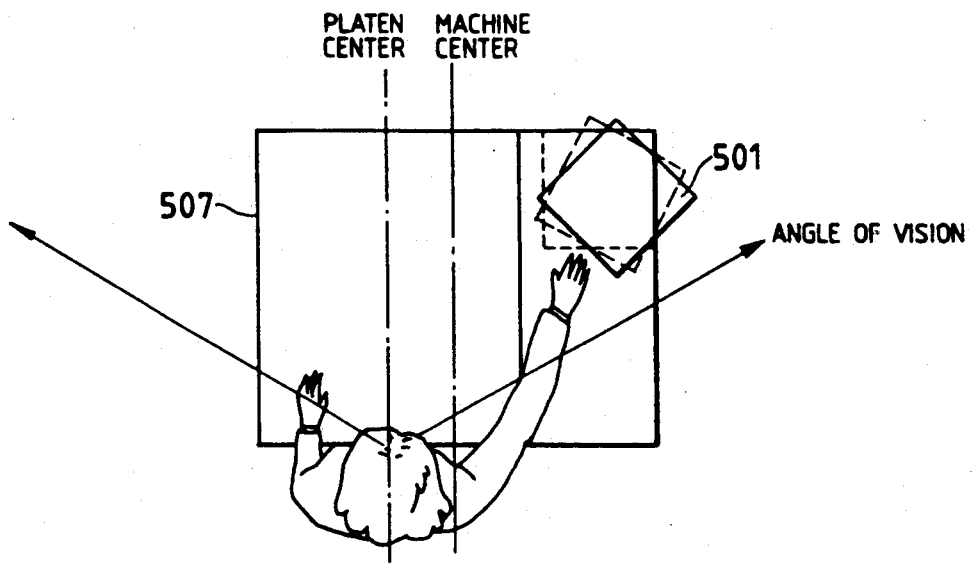
FIGS. 20(a) and 20(b) are diagrams showing an angle and a height of the UI mounted.
Figure 20B:
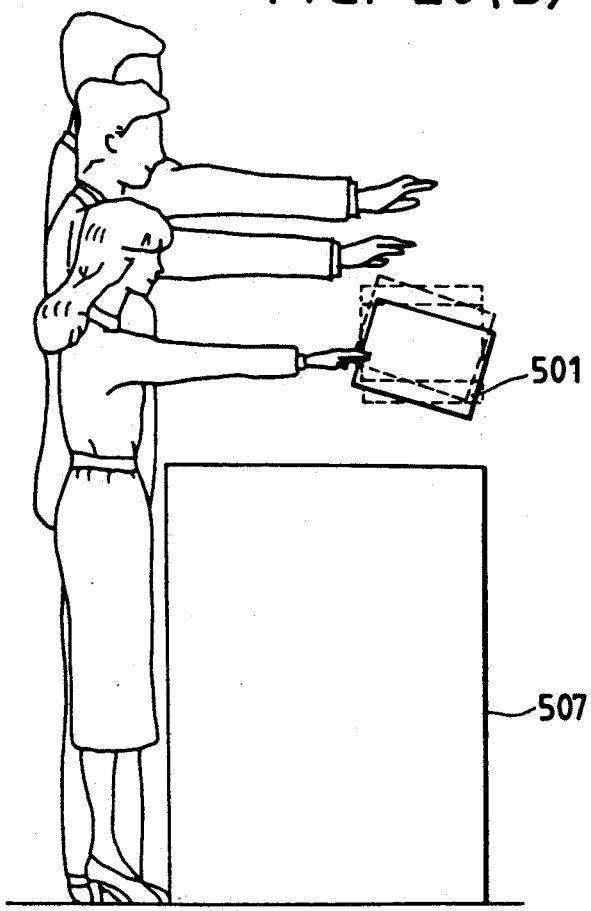

FIGS. 19(a) through 19(c) show how to mount a user interface (UI) using a display device and an appearance of the display. FIGS. 20(a) and 20(b) illustrate an angle and a height of the user interface mounted to the base machine.

The user interface is a man-machine interface aiding an intelligible coversation between an operator and the color copying machine. Accordingly, it must be operable in a simple manner, and distinctively and impressively present necessary information in connection with the related information to an operator. Bear this in mind, and the user interface according to the present invention is inventive and creative in that it is user friendly, intelligible to beginners, and simple to the expertized operators, allows a user to directly select desired functions, exactly and quickly provides necessary information to operators by using colors, and buttons and provides a good operability by gathering controls at one location.

A copying machine, which has many functions and is reliable, in this respect, may be considered as a good machine. However, if such a machine is difficult to operate, it will be evaluated as a mere expensive machine. Accordingly, even a high performance machine, if its operability is poor, will receive a poor evaluation. Thus, the operability constitutes an important factor in evaluating the user interface. In recent copying machines with multi-functions, this is more distinct.

To improve the operability of the user interface, the user interface is provided with a monitor as a color display 501 of 12 inches and a hard control panel 502 placed by the monitor, as shown in FIG. 19(a). A creative color display provides menus legible to users. Further, an infrared ray touch board 503 is disposed on the fringe of the color display 501. Use of the touch board allows a user to directly access to the machine by soft buttons to be displayed in the display screen of the display 501. Various types of operations are properly assigned to the hard buttons on the hard control panel 502 and the soft buttons in the screen of the display 501, thereby providing simple operations and effective use of menu displays.

The color display 501 and the hard control panel 502 are provided on the rear side with a monitor control/power supply board 504, a video engine board 505, and a CRT driver board 506, and the like, as shown in FIGS. 19(b) and 19(c). As shown in FIG. 19(c), the hard control panel 502 is bent toward the front of the display 501.

It is noted that the color display with the hard control panel 502 is placed atop a support arm 508 standing erect on the base machine 507, viz., not directly placed on the base machine. Since the stand type of the color display 501, not the console panel that is used in the conventional machine, is used, the display may be installed above the base machine 507, as shown in FIG. 20(a). Particularly when it is located at the right back corner, as shown in FIG. 20(a), the copier may be designed not taking the console panel space into account. A compact copier may be designed.

A height of the platen, or a height of the base machine, is selected to a height, such as the height of the waist, which is best for a user to set an original on the platen table. This height limits the design freedom in selecting the height of the base machine. The conventional console panel is mounted on the top of the base machine. The console is placed substantially at the height of the waist, and access to the console panel by the hands is easy. However, the display and operating sections for selecting the various functions and for setting the conditions to execute the functions are relatively remote from the operator's eyes. In the case of the user interface of the present invention, the display and operating sections are placed above the platen, viz., it is nearer to the operator's eyes than the conventional console, as shown in FIG. 20(b), and hence is easy to operate and to see. Further, these are positioned not below the operator's eye, but in the forward and right place of the operator. Such a placement makes it easy to operate the machine. Such a placement of the display put close to the eyes of the operator provides a new place to accommodate the control board, and option kits including a memory card device, a key counter and the like. Accordingly, when a memory card device is assembled into the copying machine, any structural and outer appearance modification is not required for the base machine. Further, it makes it easy for a designer to properly select the place to mount the display and the height of the display. The display may be set at a fixed angle, and if necessary, it may be adjustably set at a desired angle.

(B) System Configuration

Figure 21:
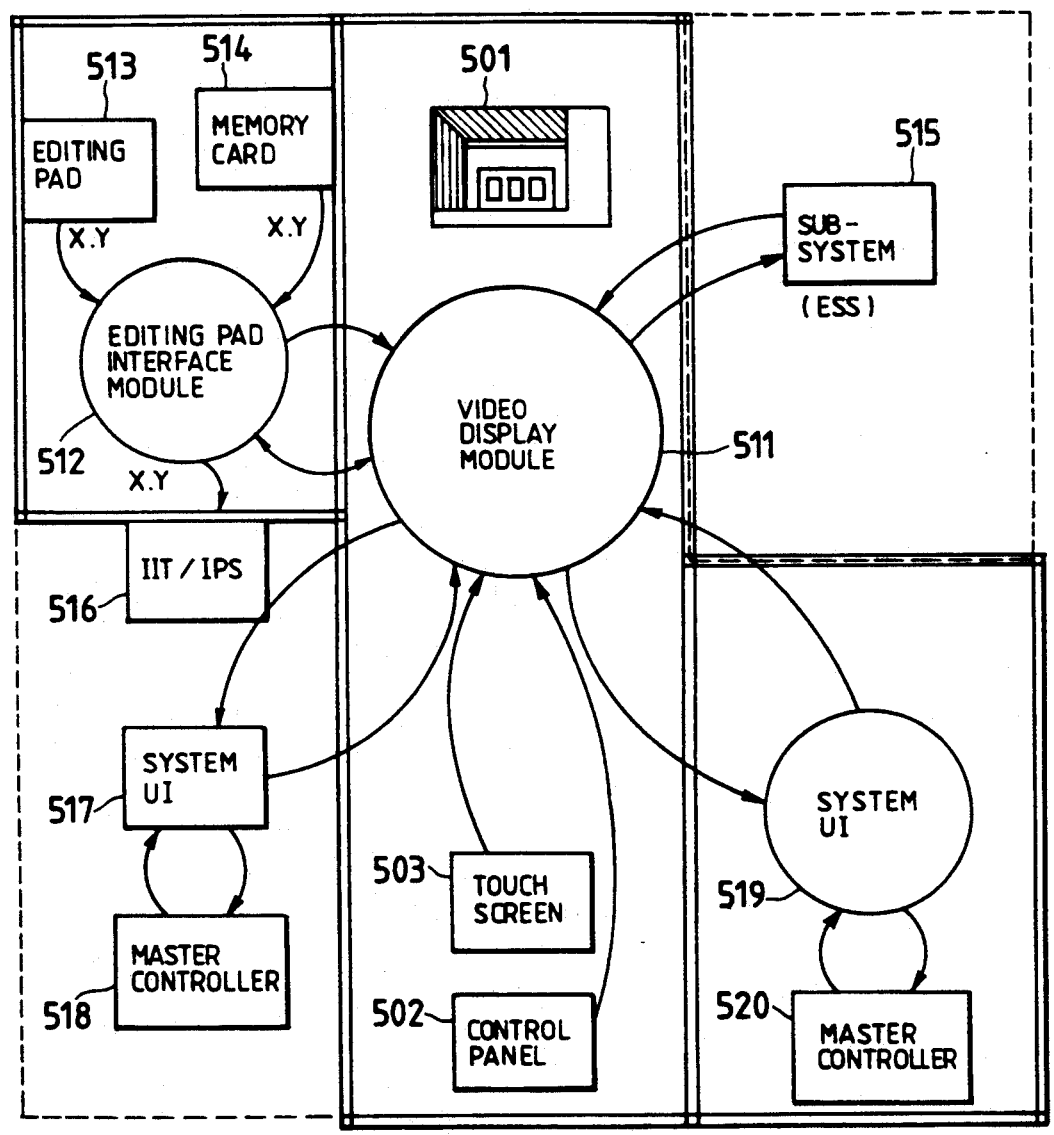
FIG. 21 is a diagram showing a module configuration of the UI.
Figure 22:
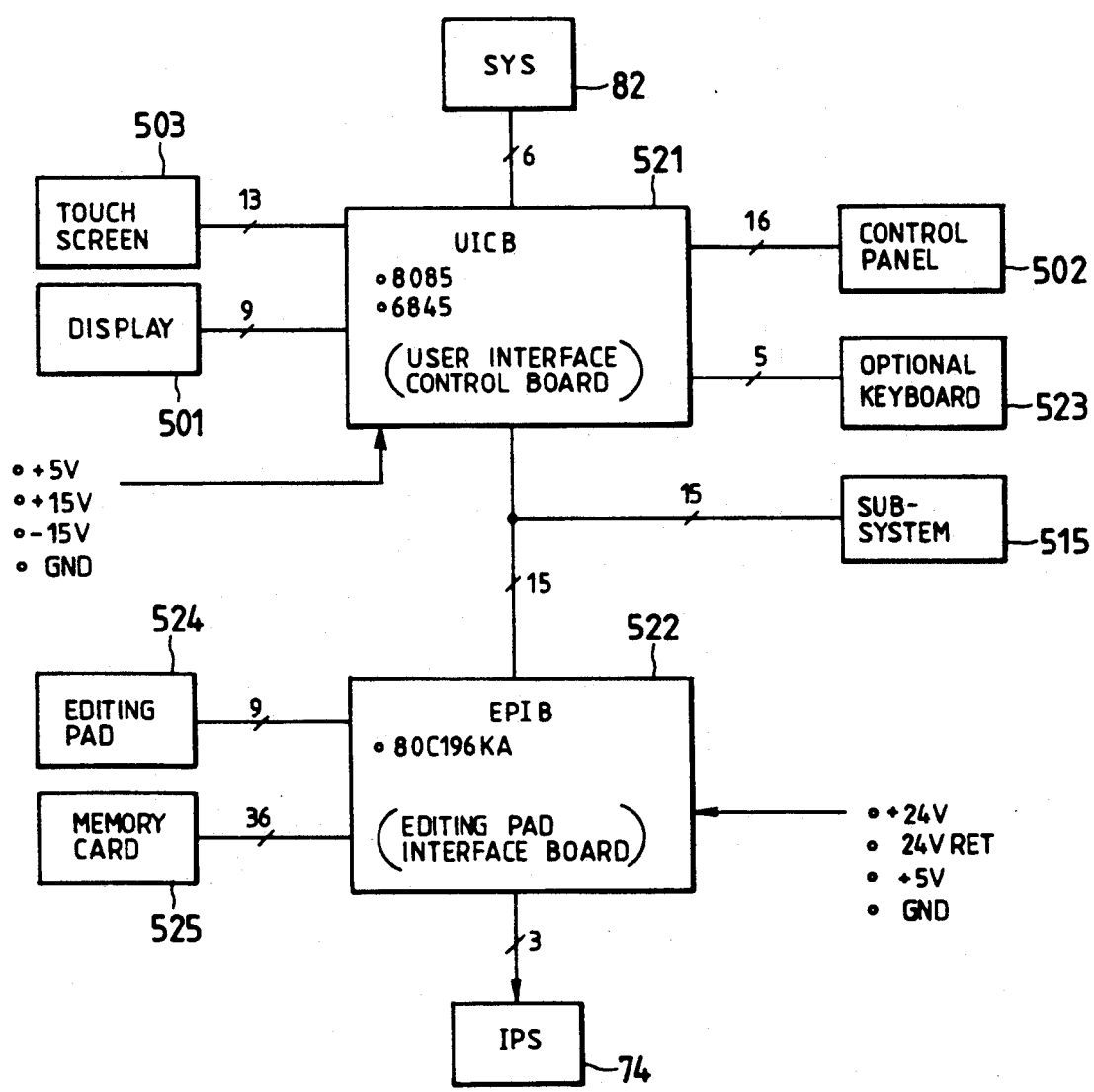
FIG. 22 is a diagram showing a hardware configuration of the UI.

FIG. 21 shows a module configuration of the user interface, and FIG. 22 shows a hardware configuration of the same.

As shown in FIG. 21, the user interface of the present invention is composed of a video display module 511 for controlling the display screen of the color display 501, and an edit pad interface module 512 for inputting and outputting an edit pad 513 and a memory card 514. System UIs 517 and 519 and a subsystem 515 for controlling the above modules, and a touch screen 503 and a control panel 502 are connected to the video display module 511. The edit pad interface module 512 enters X and Y coordinates data from the edit pad 513, and receives jobs and X and Y coordinates from the memory card 514, sends video map display data to the video display module 511, and transfers UI control signals to and from the video display module 511.

An area designation consists of a marker designation to designate a specific area on an original by a red or blue marker for effecting trimming and color change process, a 2-point designation by using coordinates data in a rectangular area, and a close loop designation by tracing an edit pad. The marker designation has no data in particular. The 2-point designation a small amount of data. The close loop designation needs a large amount of data for the area to be edited. The IPS is used for the data edition. The amount of the data is too large to transmit them at a high speed. For this reason, the transfer line connecting to the IIT/IPS 516 and exclusively used for transmitting the X and Y coordinates data is provided separately from the ordinary data transmission line.

The video display module 511 enters vertical and horizontal input points (coordinates positions on the touch screen) on a touch screen 503, recognizes a button ID, and enters a button ID on the control panel 502. Further, it sends a button ID to the system UIs 517 and 519, and receives a display request from the system UIs 517 and 519. The subsystem (ESS) 515 is connected to a work station and a host CPU, for example, and serves as a print controller when the instant copying machine is used as a laser printer. In this case, the data of the touch screen 503, control panel 502, and keyboard (not shown) is transferred to the subsystem 515 as intact. The contents in the display screen are sent from the subsystem 515 to the video display module 511.

The system UIs 517 and 519 transfer the data of copy modes and machine states to and from master controllers 518 and 520. In connection with the software architecture shown in FIG. 4, one of the system UIs 517 and 519 is the SYSUI module 81 in FIG. 4, and the other is the MCBUI module 86 of the MCB remote.

The hardware of the user interface according to the instant invention is made up of a couple of control boards, UICB 521 and EPIB522, as shown in FIG. 22. In connection with the above module configuration, the functions of the user interface are also categorized into two groups. The UICB 521 uses two CPUs, such as 8085 and 6845 or their equivalents by Intel Co., in U.S.A, in order to control the hardware of the UI, to drive the edit pads 513 and 514, and to process the received data of the touch screen 503 and to write the results on the CRT screen. The EPIB 522 uses a CPU of 16 bits such as 80C196KA made by Intel Co., and transfers the depicting data of the bit map area to the UICB in the DMA mode. The 16-bit CPU is used because a CPU of 8 bits is unsatisfactory to gain the function to depict data in the bit map area. In this way, the many functions used are decentralised.

Figure 23:
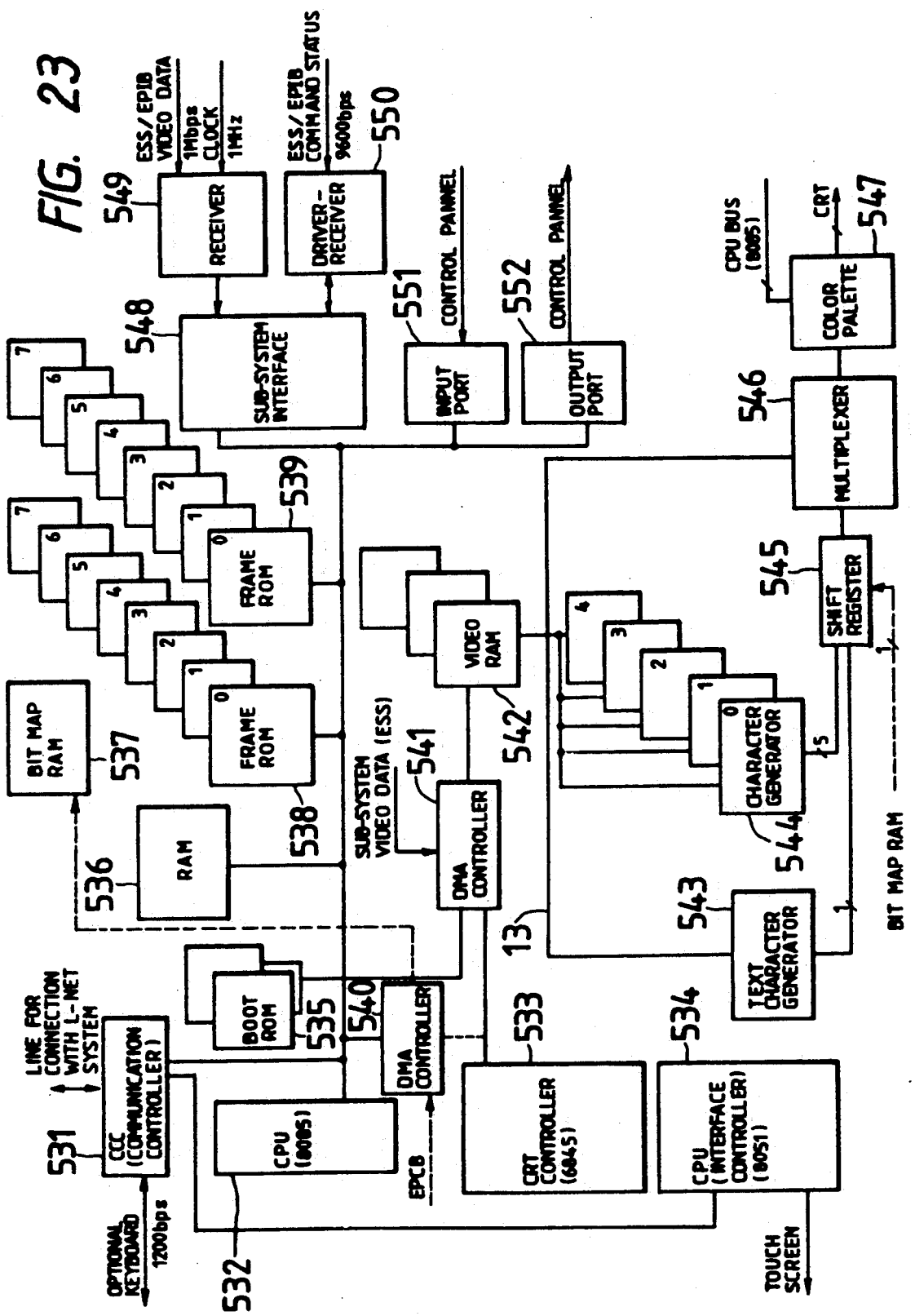
FIG. 23 is a diagram showing a configuration of a UCIB.

FIG. 23 shows a circuit arrangement of the UICB. The UICB uses a CPU 534 such as 8051 by Intel Co., or its equivalent, in addition to the above CPUsA CCC 531 is connected to the high speed communication line L-NET or a communication line of an optional keyboard, and it controls the communication by the CPU 534 and CCC531. Further, the CPU 534 is also used for driving the touch screen. The signals of the touch screen as the coordinates position data are fetched through the CCC531 into the CPU 532, from the CPU 534. In the CPU 532, the button ID is recognized and processed. The UICB is connected to the control panel through an input port 551 and an output port 552. Further, it receives video data at 1 Mbps, together with a 1 MHz clock signal, from the EPIB 522 and the subsystem (ESS) through the subsystem interface 548, receiver 549, and driver 550, and is capable of transmitting and receiving commands and status data at 9600 bps.

The memories used are a boot ROM 535 storing a bootstrap, frame ROMs 538 and 539, RAM 536, bit map RAM 537, and V-RAM 542. The frame ROMs 538 and 539 store the data with regard to the display screen whose data structure is easy to handle in the software, viz., not bit map. When a display request arrives through the L-NET, the CPU 532 generates depicting data in the RAM 536 that used as a work area. Then, the data generated is written into the V-RAM 542 by the DMA 541. The bit map data is transferred from the EPIB 522 to the bit map RAM 537, and written thereinto by the DMA 540. A character generator 544 is for a graphic tile, and a character generator, for a character tile. The V-RAM 542 is controlled by a tile code. The tile code consists of 24 bits (3 bytes). In the tile code, 13 bits are assigned to the data indicative of kinds of tiles; 2 bits, to the data to identify text, graphic or bit map; 1 bit, to brink data; 5 bits, to color data of tiles; 3 bits, to the data indicative of background or foreground. A CRT controller frames a display according to the data of tile codes that is stored in the V-RAM 542, and feeds the video data to the CRT screen by way of a shift register 545, multiplexer 546, and color palette 547. Description in the bit map area is changed by the shift register 545.

Figure 24:
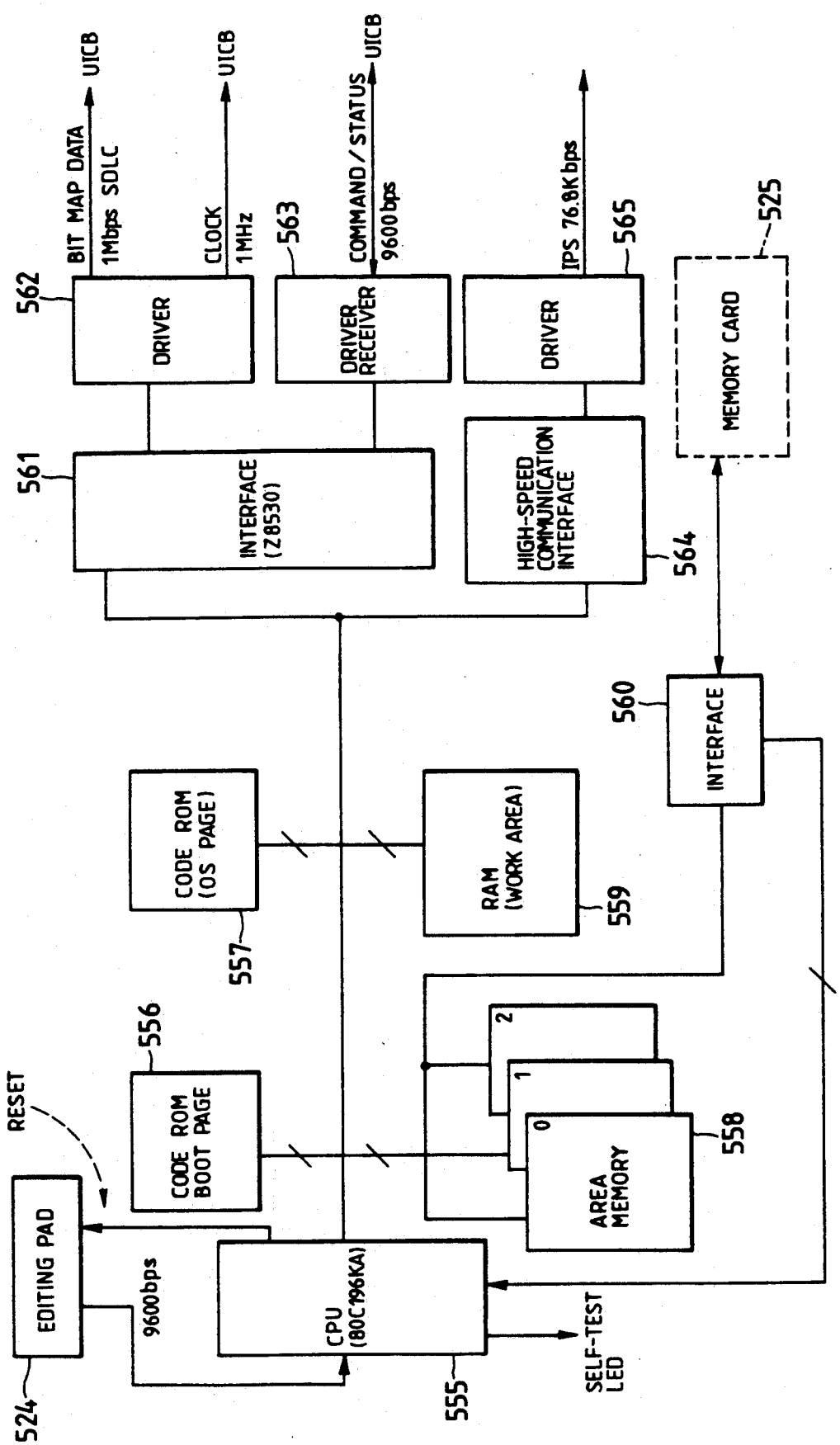
FIG. 24 is a diagram showing a configuration of an EPIB.

FIG. 24 shows an arrangement of the EPIB. The EPIB is made up of a 16-bit CPU 555, such as 80C196KA manufactured by Intel Co., or its equivalent, boot page code ROM 556, OS page code ROM 5557, area memory 558, and RAM 559 used as a work area. The EPIB transfers bit map data to the UICB, and transfers commands and status data to and from the same, through a driver 562 and a driver/receiver 563. Through a high speed communication interface 564 and a driver 565, the EPIB transfers X and Y coordinates data to the IPS. Data transfer to and from a memory card 525 is performed through an interface 560. Accordingly, when the EPIB receives the data to designate a close loop edit area or copy mode data from the edit pad 524 or the memory card 525, the received data is transferred to the UICB through the interface 561 and the driver 562, and to the IPS through the high speed communication interface 564 and the driver 565.

(C) Effective Use of Display Screen

Also in the case of using a display system for the user interface, to visually present a great amount of data of the multi-functioning copying machine, data to assist the display of the machine operating data is correspondingly increased. When plainly considering the increased data, a broad display area is required, and this goes against our intention of the compact machine. If a compact size display is used, all necessary data must be displayed in one display screen. However, a display density would make it difficult to realize this. Further if it would be realized, the displayed items are illegible to operators.

In the present invention, creations are introduced into the display screen layout and its controls, enabling use of the compact display. The color display can provide various display modes by controlling many attributes of display, for example, color, brightness, and the like. In this respect, the color display is superior to LEDs and LCDs used in the conventional console panel. By making use the advantageous features, a legible display is obtained with a compact display unit.

For example, the information to be displayed on the display screen is categorized into a plurality of groups of information. These groups of information are displayed in a plurality of displays. With regard to one display, the detailed information is displayed in a pop-up manner, and is not displayed in the primary display screen. Accordingly, the display is concise and clear with only minimum necessary information. For the display containing different items of information, color and emphatic indications are used so that the operator can readily and distinctly recognize the necessary information on the display screen from among the information.

a) Screen layout

Figure 25A:
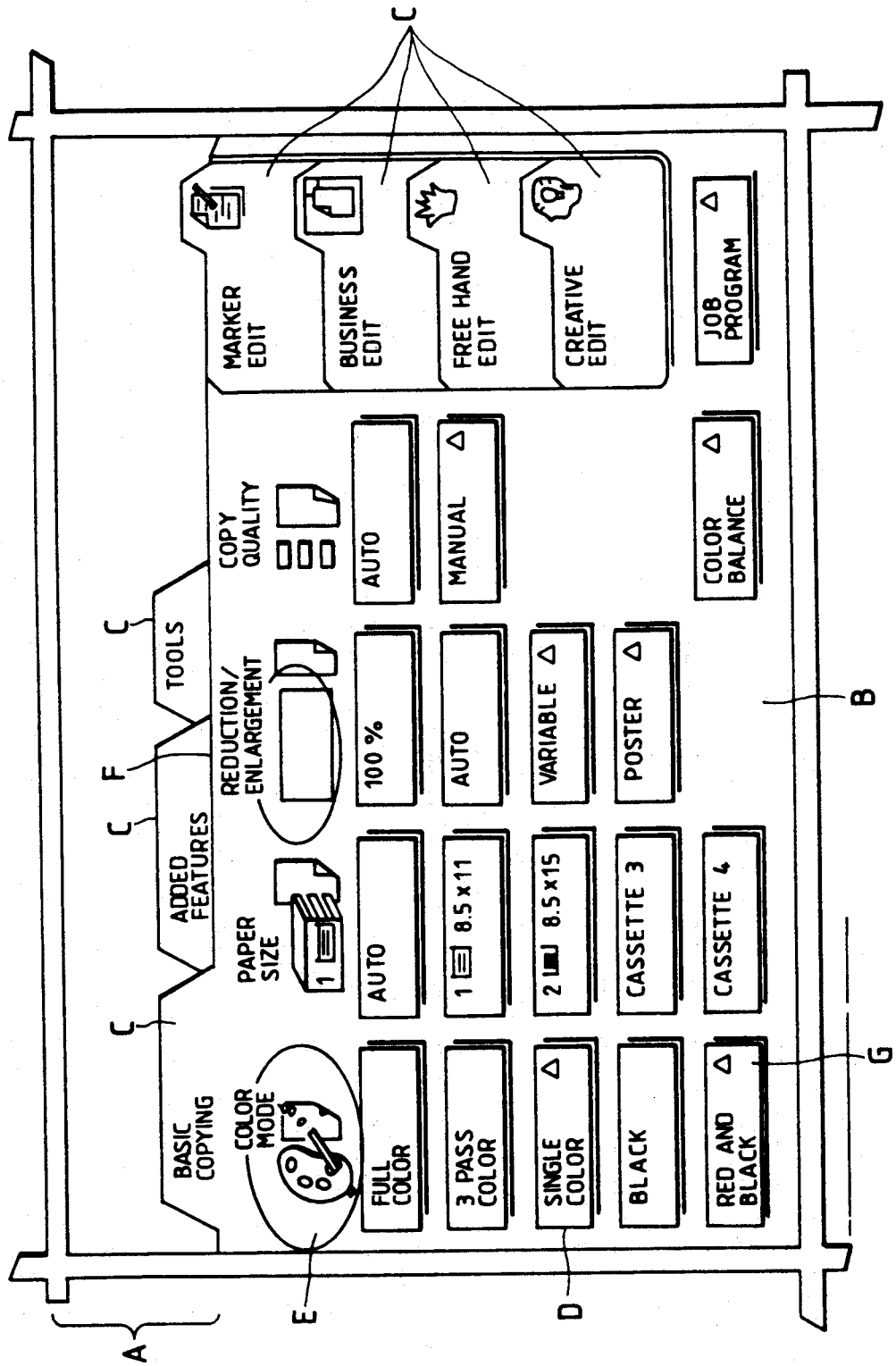
FIGS. 25(a) through 25(c) are diagrams showing layouts in displays for instructive controls.
Figure 25B:
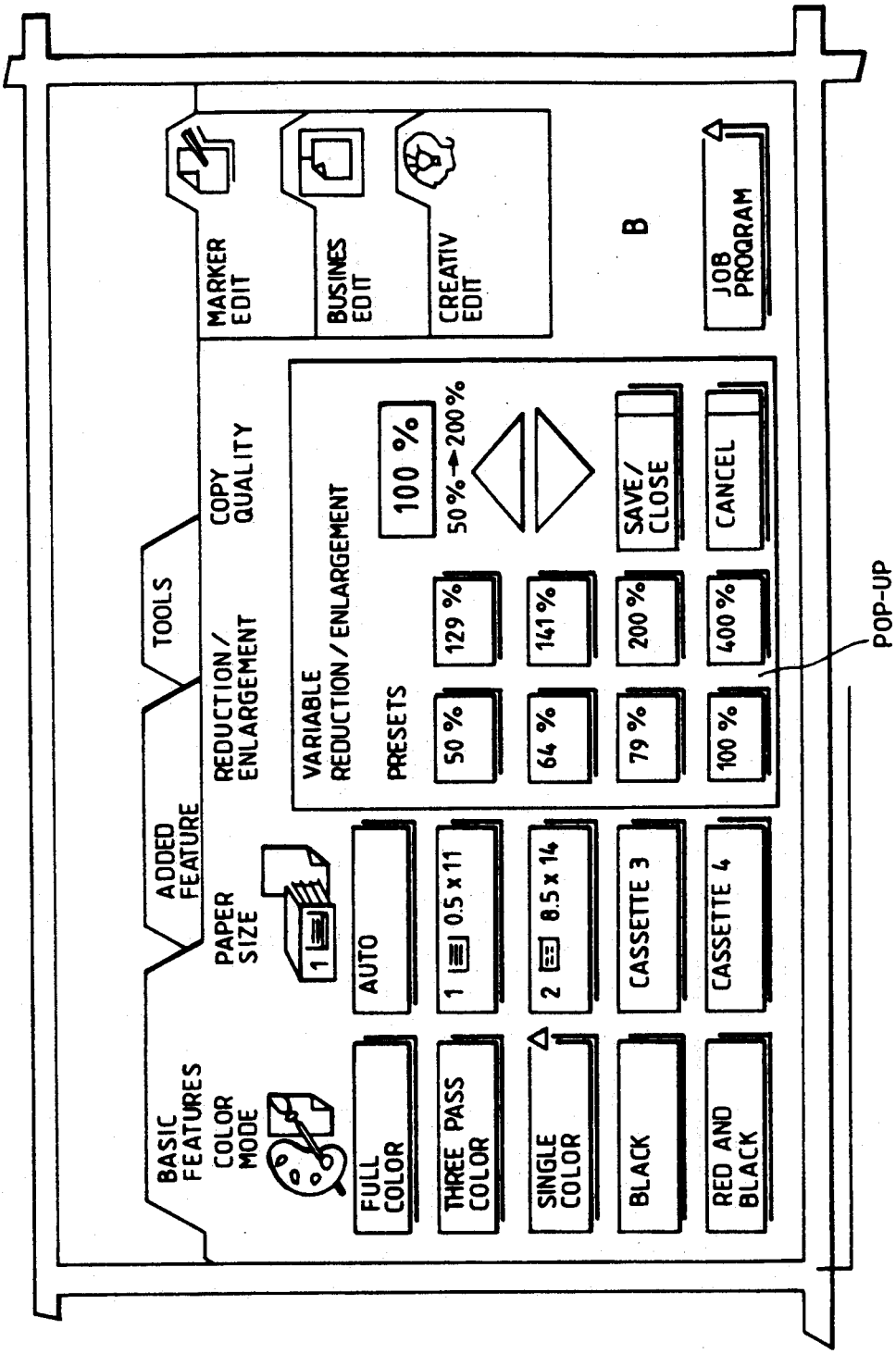
Figure 25C:
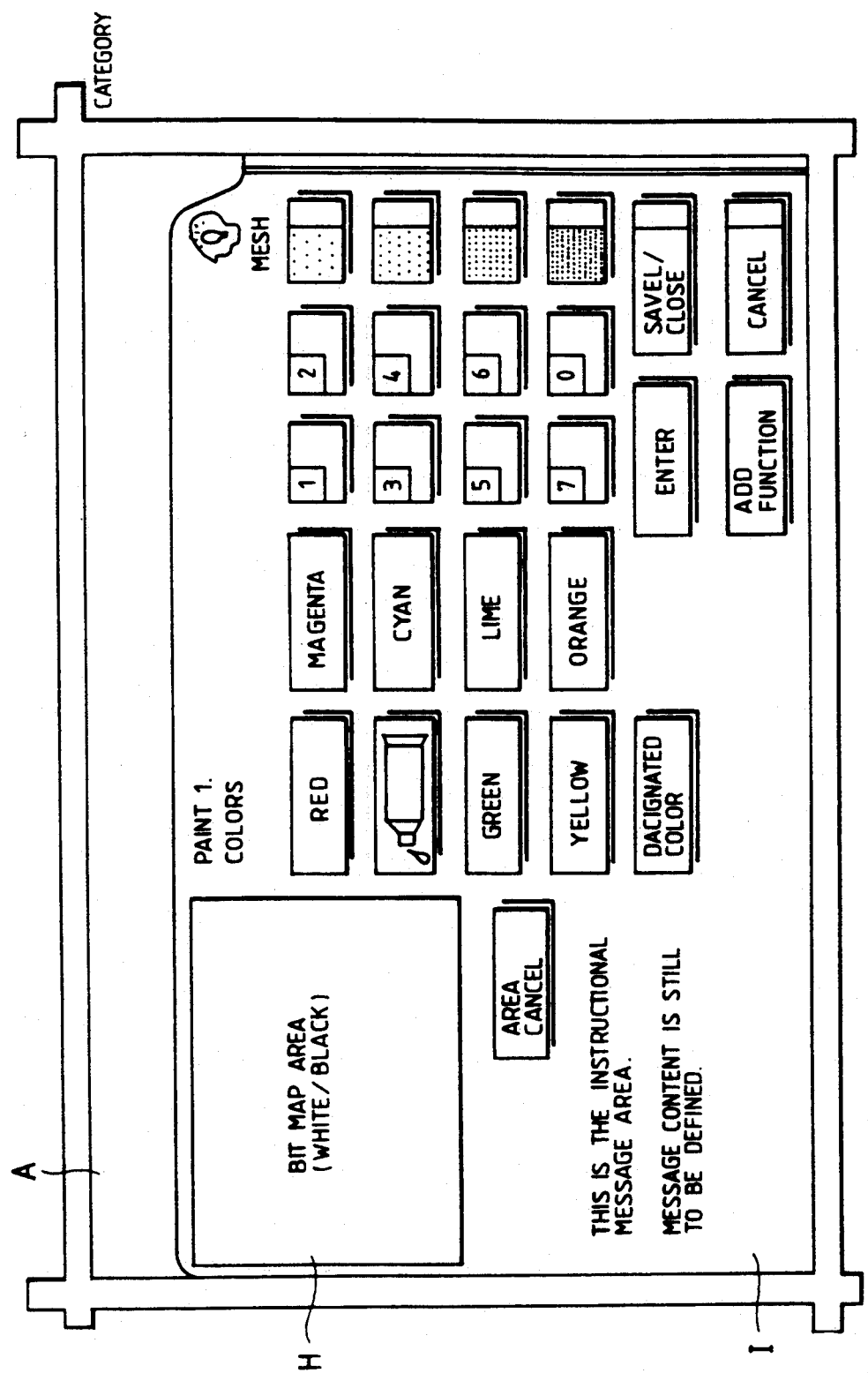

FIGS. 25(a) through 25(c) show some layouts of display screen. FIG. 25(a) shows a basic copy display. FIG. 25(b) shows a display in which a pop-up display is inserted in the basic copy display. FIG. 25(c) shows a paint 1 display of the creative edit.

In the user interface according to the present invention, an initial display is the basic copy display for setting copy modes as shown in FIG. 25(a). The display for setting copy modes is divided into two sections, a message area A and a pathway area B, as shown in FIG. 25(a).

The message area consists of the upper three lines on the screen. The first line is for a statement message. The second and third lines are for various messages, such as a guide message when different functions are contradictively selected, a message showing a faulty state of the machine, and an alarm message. The right end portion of the message area is used as an area for display the number of copies, such as the number of copies set by ten keys, and the number of copies being under copying operation.

The pathway area B is an area to select various functions, and contains many pathways of a basic copy, added feature, marker edit, business edit, free hand edit, creative edit, and tool. The pathway tabs C for those pathways are displayed. Each pathway uses a pop-up function for improving the operability. The pathway area B further contains soft buttons D as choices for selecting functions by touching it by the finger, an icon (picture) E for indicating the function selected, and an indicator F for indicating magnification percentages. Those soft buttons with the pop-up functions are each marked with a pop-up mark G of Δ. By touching the pathway tab C, the pass-way of the touched tab is opened. By touching the soft button, the function indicated by the touched soft button is selected. For gaining a good operability, the soft buttons D are arrayed so that for function select, those buttons are operated in the order from the left upper button to the right lower button.

The basic copy display and other displays are sorted so as to maximize a community between it and other devices, and that between the soft panel and the hard console panel. Further, the edit displays consist each of a plurality of levels that can be selected in accordance with a degree of skill of the operator. Further, the pop-up function is used. Of those functions displayed, the functions requiring a high level of technique or complicated functions are displayed in a pop-up manner.

The pop-up has detailed setting items data for a specific function. The display has a pop-up open function. To see detailed setting items data, the pop-up is opened. With this, the display of each pathway is easy to seen and simple. The pop-up is opened by touching the soft button with the pop-up mark. The pop-up is closed when a closed button or a cancel button, an all-clear button are pushed, or when an auto clear function operates. A display shown in FIG. 25(b) appear when the reduction/enlargement function is selected, the pop-up is opened by touching a variable reduction/enlargement soft button.

In the basic copy display, when the pathway tab for the creative edit is touched, the display is changed to the screen of the creative edit pathway. The display of paint 1 of those creative edit pathway displays is shown in FIG. 25(c). The display includes a bit map area H and an instructional message area I. The bit map area H is located in the left upper portion in the screen. When an edit area is designated by the edit pad, a single color bit map is displayed in the area. An instructional message area I is located in the lower left portion in the screen. By using this area, instructive messages for edit work are presented to the operator. As a matter of course, the message differs with the type of the edit work. In the screen, a work area occupies an area except the bit map area H, instructional area I and the message area A in the upper portion of the screen.

b) Basic copy display

As shown in FIG. 25(a), the pathway for the basic copy includes soft buttons (choices) for selecting the color mode, paper select, reduction/enlargement, copy image quality, color balance, and job program, and the pathway tabs for the maker edit, business edit, free-hand edit, and creative edit, and the edit feature and tool. This pathway is an initial pathway as is displayed after power on and when au auto clear mode is set up by pushing the all clear button.

The color mode consists of five modes, a full color (4-pass color) mode using four colors Y, M, C and K for copy, 3-pass color mode using three colors except color K, single color mode using a single color selected from among 12 colors, black mode, and black/red mode. A default automatically selected may be set appropriately. The single color mode and the black/red mode have detailed setting items. Accordingly, these modes are displayed in a pop-up mode.

The paper select mode consists of an automatic paper select (APS), tray 1 and tray 2, cassette 3 and cassette 4. The APS functions when a specific magnification is set in the reduction/enlargement mode, and does not function when an auto magnification select (AMS) mode is set up. The default is the APS.

The reduction/enlargement mode has two choices, 100%, an AMS for determining a magnification on the basis of document size and paper size when paper of a specific size is set, and a variable magnification select. In this mode, a set magnification and calculated magnification or an auto is indicated by the indicator on the top. In the variable magnification select, a magnification may be set with the steps of 1% in the range from 50% to 400%. The magnifications in the vertical and the horizontal may independently be set. Accordingly, these detailed items are displayed in the pop-up mode. The default is 100%.

In respect to the reduction/enlargement, as described above, the magnification in the subsidiary scan direction (X direction) is adjusted by controlling the scan speed. The magnification in the main scan direction is adjusted by changing the method of reading data from the line memory in the IPS.

The copy image quality consists of two choices, an auto mode and a manual mode. In the auto mode, an optical density is automatically controlled for a mono color document, and a color balance is automatically controlled for a color document. In the manual mode, the pop-up technique is used for controlling an optical density of the document in seven steps. The control is carried out by the IPS.

The job program is effective only when as memory card is inserted into a slot of the card reader. In this mode, jobs can be written into and read out of the memory card. The memory card used in this instance has 32K bytes and is capable of storing a maximum of 32 jobs. Accordingly, all other jobs than that of the projector mode can be programmed.

c) Aided feature display

The pathway of the aided feature display includes soft buttons (choices) for selecting a copy output, copy sharpness, copy contract, copy position, film projector, page programming, job program, and binding margin, and the pathway tabs for the maker edit, business edit, free-hand edit, and creative edit, and the basic copy and tool.

The copy output has two choices, a top tray and a sort mode. The default is the top tray, and when not sorter is used, this item is not indicated.

The copy sharpness has three choices, a standard, a manual and a photo. In the manual, the pop-up is used and control of 7-steps is possible. In the photo, the pop-up is used. It contains items of photo, character, print and photo/character. The control for this is carried out in the IPS.

The copy contrast has a copy contrast control in seven steps. The copy position has a choice of an auto center function in which the center of the copy image is positioned at the center of paper by the default.

The film projector is used for copying images on various kinds of films, and will be described in detail later. The pop-up is used for selecting any of 35 mm negative film and 35 mm positive film by the projector, and 35 mm negative 6 cm×6 cm slide and 4"×5" slide on the platen.

The page programming has choices of a cover for laying a cover to copies, insert for inserting a white or color paper into copied papers, color mode to set up a color mode every page of document, and paper to select a desired tray every page of document. This item is not displayed when the ADF is not set up.

In the binding margin mode, the margin may be set with the steps of 1 mm in the range of 0 to 30 mm. The binding margin is allowed to designate one location for one document. The length of the binding margin is from the lead end of the paper to the lead end of an image area. The length of the margin in the main scan direction is adjusted by a shift operation by the line buffer in the IPS. The length of the margin is adjusted by shifting the scan timing of the IIT.

d) Edit and tool display

The edit display consists of four pathways; the marker edit, business edit, free hand edit, and creative edit.

The marker edit pathway and the free hand pathway have choices of extract, delete, color application (mesh/line/solid), and color change. Further, it has pathway tabs of a basic copy, edit feature, and tool.

The business edit pathway has choices of extract, delete, color application (mesh/line/solid), color conversion, coloring, logotype insertion, and binding margin. Further, the business edit, like the marker edit pathway, etc., has pathway tabs of a basic copy, edit feature, and tool.

The creative edit pathway has choices of extract, delete, color application (mesh/line/solid), color conversion, coloring, logotype insertion, binding margin, negative/positive inversion, inlay composition, transparency composition, paint, reflected image, repeat, enlargement continuous projection, partial movement, corner/center movement, manual/auto one-side magnification, color mode, color balance control, page continuous copy, and color composition. Further, the creative edit, like the marker edit pathway, etc., has pathway tabs of a basic copy, edit feature, and tool.

The tool pathway is used by key operators and customer engineers. This pathway is opened by entering a password. Choices of the tool pathway are: an auditron, machine initial value set-up, select of default of the respective functions, color registration, film type registration, fine adjustment of registered color, preset of the respective choices of the machine, setting of a film projector scan area, audio tone (kind of tone and volume), setting of timers for the paper transport system and others (auto clear, etc.), billing meter, setting of dual languages, diag. mode, max. control value, and memory card format.

The default select is directed for the color mode, paper select, copy density, copy sharpness, copy contrast, paper tray for page programming, color of the single color, color and mesh of a color palette for color application, pattern of a logotype, binding margin, and color balance.

e) Other display controls

In the user interface, progress of the copying operation is constantly monitored. When jamming occurs, the user interface displays the jamming occurrence. In respect to the function settings, an information display for presenting the information of the current display is provided, which is ready for display at all times.

The displays except the bit map area are composed of tiles whose width is 3 mm (8 pixels) and height is 6 mm (16 pixels). The width of each display is 80 tiles and the height is 25 tiles. The bit map area is displayed with pixels and its height is 151 pixels and width is 216 pixels.

As described above, the user interface is arranged such that the functions are categorized into different modes such as the basic copy, edit feature, and edits. The displays are assigned to those modes, and accordingly, the display is changed in accordance with the mode used. The display of each mode presents items of function select, setting of conditions for function exercise, and the like. For exercise a function, a choice is selected by pushing the related soft button. Necessary condition data can be entered while seeing the display. Some of the choices in the menu are displayed in the form of a pop-up display (overlay display or window display). Use of the pop-up display provides a concise and easy-to-see visual presentation, even if the numbers of selectable functions and conditions settings are large. Accordingly, the operability of the copying machine is improved.

(D) Hard Control Panel

The hard control panel, as shown in FIG. 19(a), is disposed on the right side of the color display panel, and is slightly bent toward the center. The control panel is provided with various buttons of ten keys, ten key clear, all clear, stop, interrupt, start, information, auditron, and language.

The ten key buttons are used to set the number of copies, to enter codes and data, and to enter a password when the tool is used. These buttons are invalid when a job occurs or it is interrupted.

The all clear button is used to return all of the copy modes as are set to the defaults, and to return the displays to the basic copy display except when the tool display is opened. When an interrupt job is being set, the copy mode returns to the default, but the interrupt mode is not removed.

The stop button is used to interrupt the job at a proper place to end in the copy during the execution of copying operation, and to stop the machine after the copied paper is delivered outside. In the diag. mode, it is used to stop (interrupt) the input/output check.

The interrupt button is used to set up an interrupt mode during the primary job except when the job is interrupted, and returns control to the primary job when control is being interrupted. When this button is operated during the execution of the primary job, the machine is placed into a reserve mode, and the job is interrupted or ends at the end of delivering the copied paper.

The start button is used to start the job or to restart the interrupted job. In the diag. mode, it is used to enter and save codes and data, and to start the inputting and outputting the same. When the machine is being preheated, if this button is operated, the machine automatically starts at the end of preheating.

The information button consists of an on button and an off button. These buttons are in a ready state except the progressing of copying operation. When the on button is operated, an information display for the display being currently presented appears. To remove the information display, the off button is operated.

The auditron button is used to enter a password at the start of job.

The language button is used to select a desired language of expressions in the display from among a plurality of languages.

The hard control panel is also provided with LEDs (light emitting diodes) for indicating operations of the respective buttons.

Figure 1:
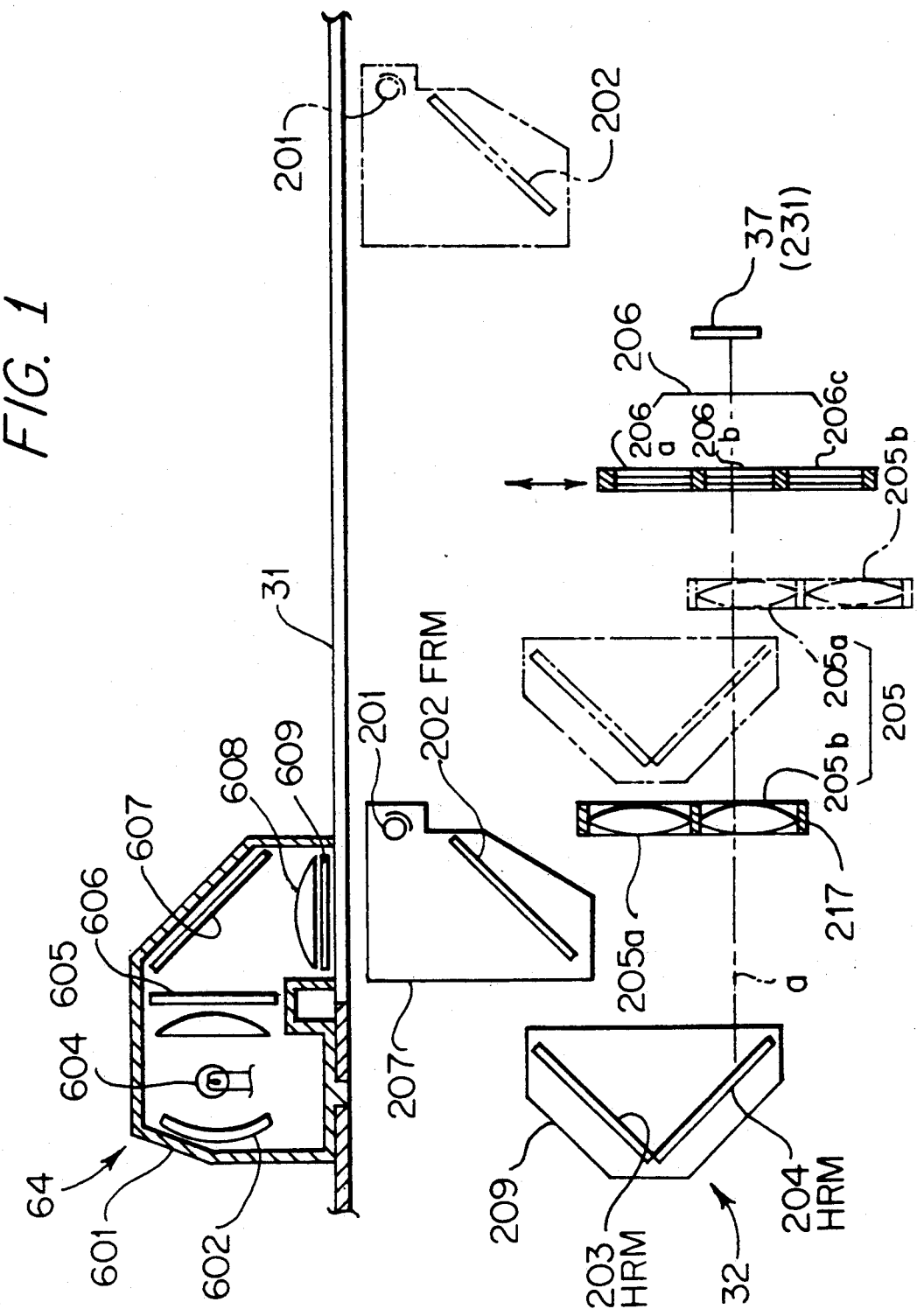
FIG. 1 is a schematic diagram showing an embodiment in which the image read device according to the present invention is applied to a color copying machine.

(III) IMAGE READ DEVICE (III-1) Outline (A) Simultaneous Movement of Platen Lens and F/P Lens A schematic illustration of the input terminal (IIT) 32 of the color copying machine according to an embodiment of the present invention is shown in FIG. 1. In FIG. 1, the IIT 32, as described above, includes the optical scanning mechanism and the read sensor 37.

The optical scanning mechanism is made up of a pair of full rate mirrors (FRMs) 202, a pair of half rate mirrors (HRMs) 203 and 204, an optical lens 205 for focusing an image on a read sensor 37, and a correction filter 206. The FRM 202, which is mounted on a first carriage 207, is slanted at approximately 45° with its reflecting surface directed to the left upper as viewed in the drawing. The exposure lamp 201 is also mounted on the first carriage 207. The first carriage 207 is movable in the subsidiary scan direction of the copying machine. With such a structure, it is possible to scan an original on the platen glass 31.

The pair of HRMs 203 and 204, which are mounted on a second carriage 209, are slanted at approximately 45° and disposed one upon the other. The upper HRM 203 is with its reflecting surface directed to the right lower as viewed in the drawing. The lower HRM 204 is disposed with its reflecting surface directed to the right upper as viewed in the drawing. Such an array of the mirrors 202, 203, and 204 optically guides an image of an original placed on the platen glass 31 to the optical lens 205.

The second carriage 209 is movable in the subsidiary scan direction. A moving speed v1 of the first carriage 207 is set to be two times a moving speed v2 of the second carriage 209. Since a ratio of the moving speeds of the first and second carriages 207 and 209 is set at 2, a run length of the FRM 202 is two times that of each of the HRMs 203 and 204. Accordingly, at any position of each the moved mirrors 202, 203, and 204, an optical distance from the original to the optical lens 205 remains unchanged (in other words, a distance from any image on the original to the read sensor is equal).

Figure 26:
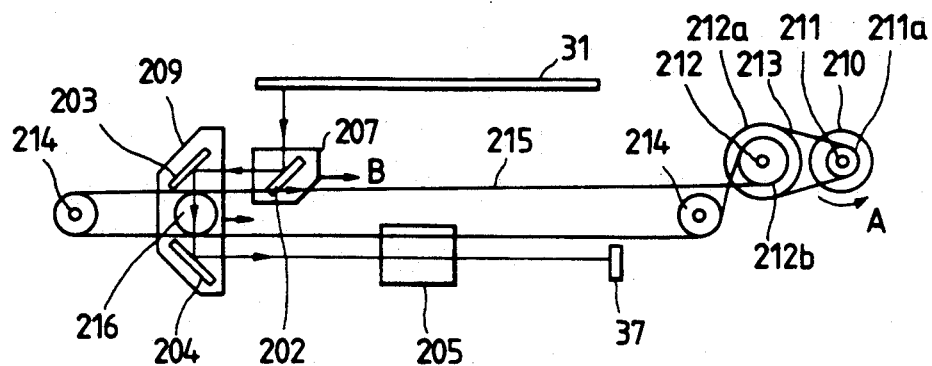
FIG. 26 is a schematic diagram showing a mirror drive mechanism in the IIT.

As shown in FIG. 26, the first and second carriages 207 and 209 are driven by a carriage motor 210, such as a DC servo motor and a pulse motor. An output shaft 211 of the carriage motor 210 is provided in parallel to a transfer shaft 212. A timing belt 213 is stretched between a timing pulley 211a fixed to the output shaft 211 and a timing pulley 212a fixed to the transfer shaft 212. A capstan pulley 212b is fixed to the transfer shaft 212. A wire cable 215 is stretched, in a crossed fashion as shown, among the capstan pulley 212b, and follower rollers 214 and 214 which are disposed in connection with the capstan pulley 212b. The wire cable 215 is wound around a reduction pulley 210, which is coupled with the first carriage 207 and fixed to the second carriage 209. Accordingly, with rotation of the carriage motor 210 in the direction of arrow A, the first carriage 207 moves at speed v1 in the direction of arrow B. At the same time, the second carriage 209 moves at the same speed in the same direction.

Figure 27A:
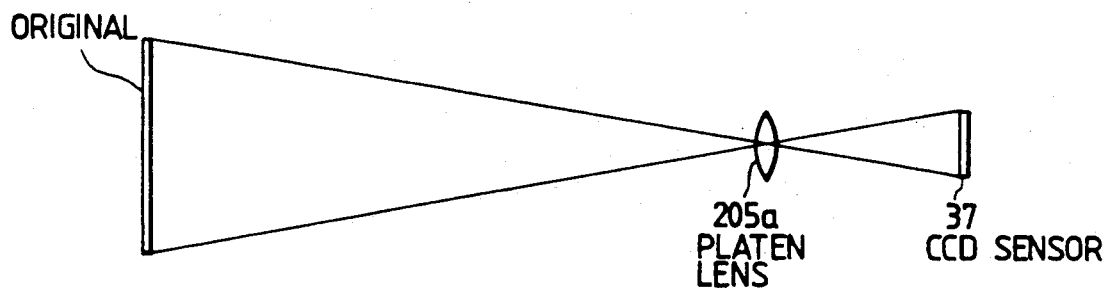
FIGS. 27(A) and 27(B) are diagrams showing a magnification in a platen mode and that in an F/P mode.
Figure 27B:
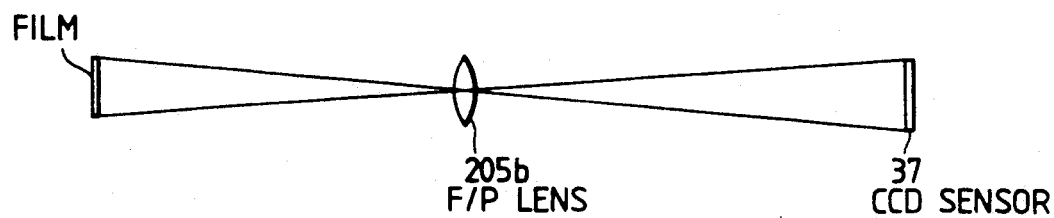

As shown in FIG. 1, two lenses, an optical lens 205a for platen and an optical lens 205b for a film projector (F/P), are provided for the optical lens 205. As shown, those lenses 205a and 205b are set at different positions on the optical axis. The reason for this is that a magnification in a platen mode and a magnification in an F/P mode are different from each other. To be more specific, when considering two modes, platen mode and F/P mode, as shown in FIG. 27, the size of the CCD sensor 37 is unchanged at about 70 mm. In the platen mode, the size of an original is about 300 mm, while the size of a film original is about 60 mm. To cope with this, the platen lens 205a is set closer to the CCD sensor 37, and the F/P lens 205b is set at a mid point between the film and the CCD sensor 37. The position where the F/P lens 205b is set is located a little to the right of a home position (the leftmost position) of the second carriage 209 as viewed in FIG. 1. The position where the platen lens 205a is set is located a little to the right of the rightmost position (as indicated by a two-dot chain line) of the second carriage 209.

Figure 28:
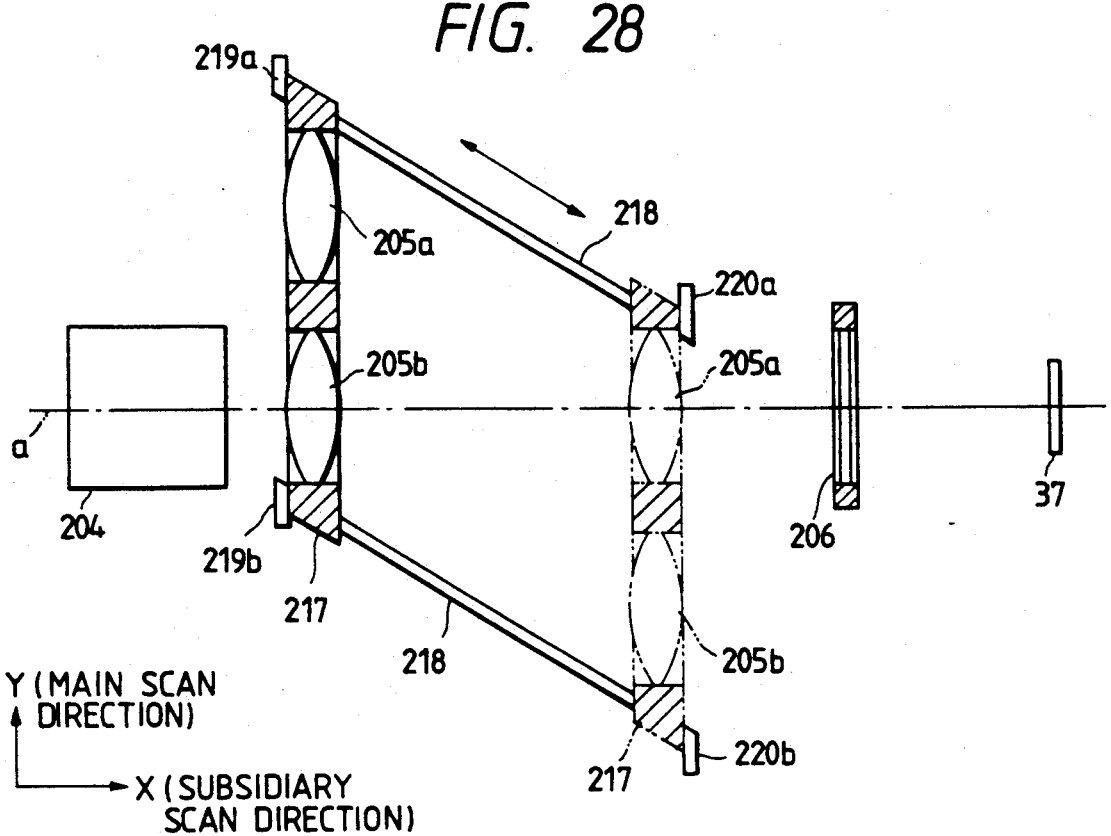
FIG. 28 is an explanatory diagram for explaining how to set a platen lens and an F/P lens on the optical axis.

In FIG. 1, the two optical lenses 205a and 205b are illustrated as if those are supported by different support tables. Actually, however, as shown in FIG. 28, those two lenses 205a and 205b are supported by a single support table 217 with their optical axes being in parallel to each other. The support table 217 is guided by a pair of guide rails 218 and 218. The paired guide rails 218 and 218 are disposed in a plane and obliquely crosses an optical axis of an optical image incident on the CCD sensor 37. Accordingly, when the support table 217 moves in the subsidiary scan direction, it also moves in the main scan direction. One of the paired guide rails 218 and 218 is provided at both ends with positioning stoppers 219a and 220a. The other likewise is provided at both ends with 219b and 220b. When the support table 217 moves, abuts against the stoppers 219a and 219b, and comes to stop there, the F/P optical lens 205b is set on the optical axis. When the support table 217 moves, abuts against the stoppers 220a and 220b, and comes to stop there, the platen optical lens 205a is set on the optical axis. In this instance, the support table 217 is moved by drive means (not shown). In the platen mode of the base machine 30, the drive means moves the support table 217 to the rightmost position so that the platen optical lens 205a is set at a predetermined position on the optical axis. When the F/P mode is set up in the base machine 30, the drive means moves the support table 217 to the leftmost position so that the F/P optical lens 205b is set at a predetermined position on the optical axis.

In the F/P mode, the first and second carriages 207 and 209 are at home positions, and remains standstill there. Accordingly, in this mode, even if the F/P optical lens 205b is set at the predetermined position as described above, it will never interfere with the second carriage 209. In the platen mode, the F/P lens 205b retracts from the optical axis, while the platen lens 205a is set at the predetermined position on the optical axis. Under this condition, the platen lens 205a is positioned to the right of the rightmost position of the second carriage 209, and hence it will never interfere with the second carriage 209.

As described above, the two optical lenses 205a and 205b are supported by the single support table 217, and moved obliquely with respect to the optical axis. This feature brings about three advantageous effects, 1) to set those optical lenses 205a and 205b on the optical axis, 2) to set those lenses at an image forming positions, and 3) to provide no interference between the HRM 204 and the second carriage 209.

Figure 29:
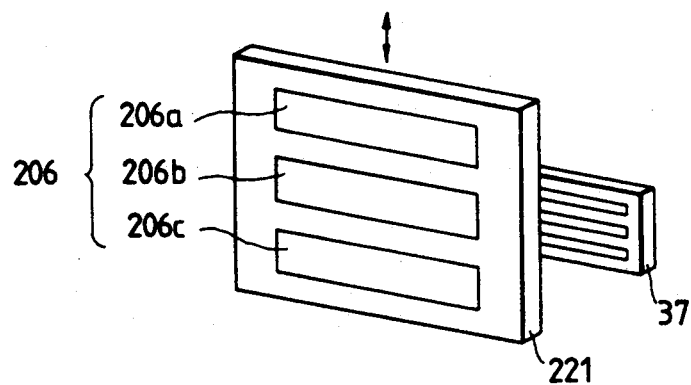
FIG. 29 is a perspective view of a correction filter.

As shown in FIG. 29, a correction filter 206 consists of three filters, a filter 206a for platen mode, a filter 206b for negative film, and a filter 206c for reversal film. Those correction filters are arrayed in this order and contained in a filter holder 221. This three-line array of the correction filters 206a, 206b, 206c makes the correction filter compact.

The filter holder 221 is vertically movable by a drive means (not shown) in the following way. When the base machine 30 is set to the platen mode, the filter 206a is set on the optical axis. When it is set to the F/P mode and a negative filter is selected, the filter 206b is set on the optical axis. When it is set to the F/P mode and a reversal film is selected, the filter 206c is set on the optical axis. In the platen mode in which the FRM 202 makes a scan, the filter 206a is positioned on the optical axis. Accordingly, the filter holder 221 is moved down to the lowermost position. At this position, the filter case 221 is located outside a scan area of the FRM 202. Under this condition, there never occur an interference between the FRM 202 and the filter holder 221. In the F/P mode, a correction filter for each film is set on the optical axis. Accordingly, the filter holder 221 is moved upward to enter the scan area of the FRM 202. In this situation, however, the FRM 202 is positioned at a home position and will not make a scan. Therefore, no interference occur between the FRM 202 and the support case 221. Since the filter holder 221 is positioned in the scan area of the FRM 202 in the F/P mode, the vertical dimension of the IIT is reduced.

The size of an optical image emanating from the optical lens is small in a range close to the front of the CCD sensor 37. Therefore, if the correction filter 206 is disposed close to the CCD sensor 37, the size reduction of the correction filter 206 is allowed. This feature further reduces the size of the correction filter.

Figure 30:
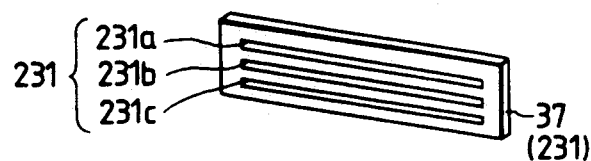
FIG. 30 is a perspective view of a read sensor.

As shown in FIG. 30, the CCD sensor 37 is a 3-line sensor 231 in which three sensors 231a, 231b, and 231c, disposed one upon another, are linear arrays consisting of picture elements and coupled with color filters with spectral sensitivities of red (R), green (G), and blue (B).

In a predetermined location on the upper surface of the base machine 30, a film projector (F/P) 64 is mounted on the upper surface, for example, swingably in the range between an operating position on the platen glass 31 and an inoperative position outside the platen glass 31. Within a housing 601 of the F/P 64 the following components are contained; a reflector 602, a light source 604, e.g., a halogen lamp, an aspherical lens 605 for converging rays of light emitted from the light source 604, a heat wave absorption filter 606 for removing light beams of predetermined wave lengths, and a convex lens 608 tubular in shape. A film 609 is set between the convex lens 608 and the platen glass 31. When the F/P 64 is set at the operating position, the convex lens 608 faces the FRM 202.

With such a structural arrangement of the F/P 64, when the F/P mode is set up in the base machine 30, an optical image of a film image 609 caused by the light source 604 is projected onto the platen glass 31. The optical image is reflected the FRM 202, the upper HRM 203, and the lower HRM 204, and then is focused on the 3-color line-sequential sensor 231 by the F/P optical lens 205b.

In the platen mode, a light beam emitted from the exposure lamp 201 hits and is reflected by the platen glass 31, and is reflected by the FRM 202 and the HRMs 203 and 204, and finally is focused on the 3-color line-sequential sensor 231 by the F/P optical lens 205b. In this case, it is corrected by the platen correction filter 206. To obtain a sheet of full color copy of 4-pass color, the combination of the FRM 202 and HRMs 203 and 204 repeats a scan operation four times.

It is noted that in the instant embodiment, the MTF (modulation transfer function) is improved because a single number of focusing lens is used. It is further noted that the F/P optical lens is not only inserted in the IIT, but also contains the mirrors. This feature makes the whole system compact. It is additionally noted that one motion of the support table can set both the platen glass lens and the F/P lens respectively at the preset positions. This feature makes the operation control of the device simple. It is noted that the F/P optical system for projecting an film image onto the platen glass is substantially closed. Because of this feature, the optical system is little influenced by disturbing light from a fluorescent lamp, for example.

(B) F/P Lens Contained IIT

Figure 31:
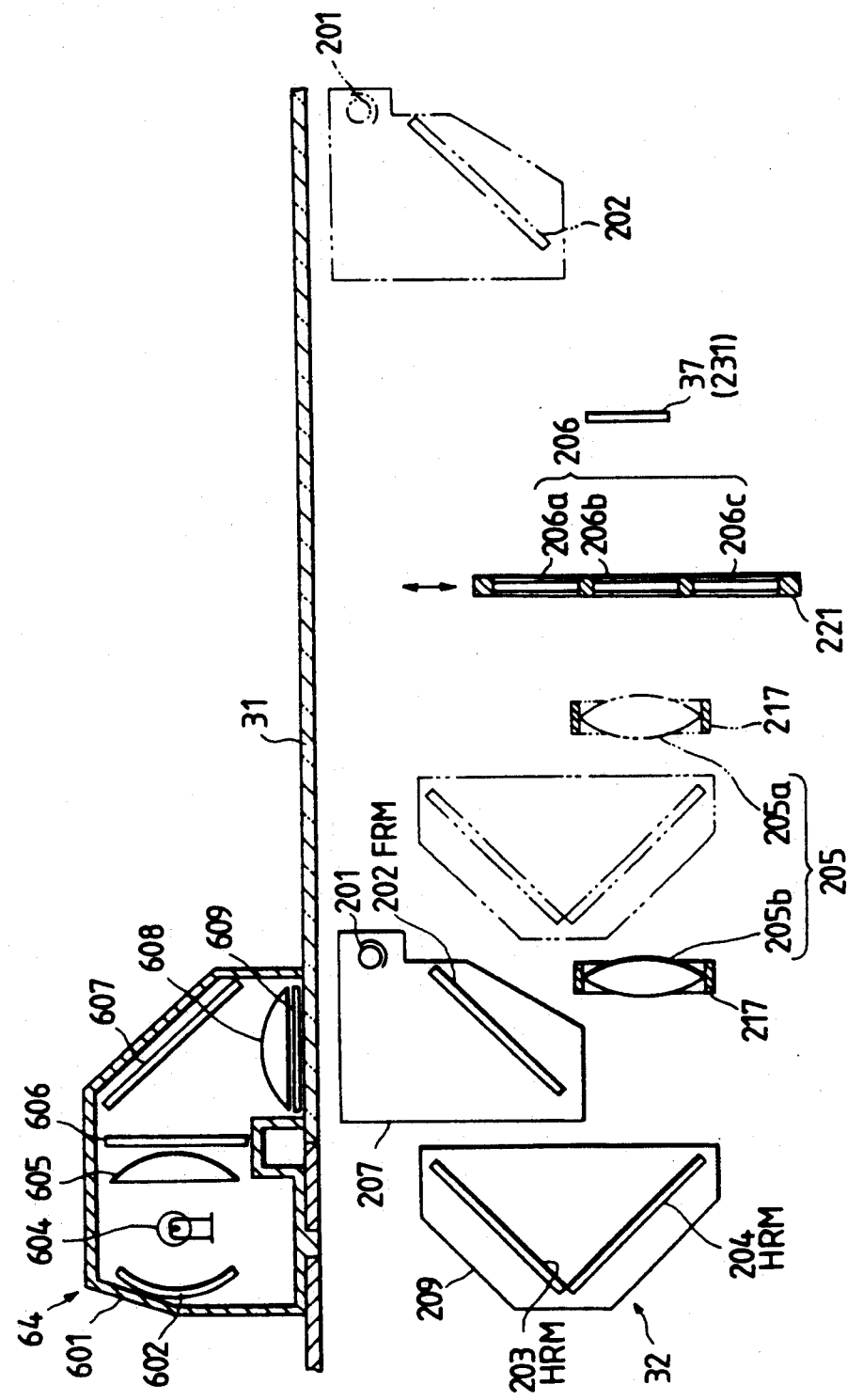
FIG. 31 is a schematic diagram showing another embodiment of the present invention.

FIG. 31 shows a schematic illustration of an image read device for the color copying machine according to another embodiment of the present invention. In the figure, like reference symbols are used for like or equivalent portions in the drawings of the previous embodiment, for simplicity.

A major difference of the present embodiment from the previous embodiment resides in that the F/P lens 205b and the platen lens 205a are installed in a separate fashion. Specifically, those lenses 205a and 205b are supported by different support tables 217a and 217b, respectively.

Accordingly, in this embodiment, such a control is required that in the platen mode, the platen lens is set on the optical axis of the IIT, while the F/P lens is retracted from the optical axis, and in the F/P mode, the reverse operation is performed.

This embodiment has the same advantageous effects as those of the first embodiment. The MTF is excellent because the single optical lens is used. Further, the F/P optical lens is not only inserted in the IIT, but also contains the mirrors. Accordingly, the whole system is made compact. Additionally, the F/P optical system for projecting an film image onto the platen glass is substantially closed. This feature protects the optical system from the disturbing light from a fluorescent lamp, for example.

(C) Optical Lens Contained F/P

Figure 32:
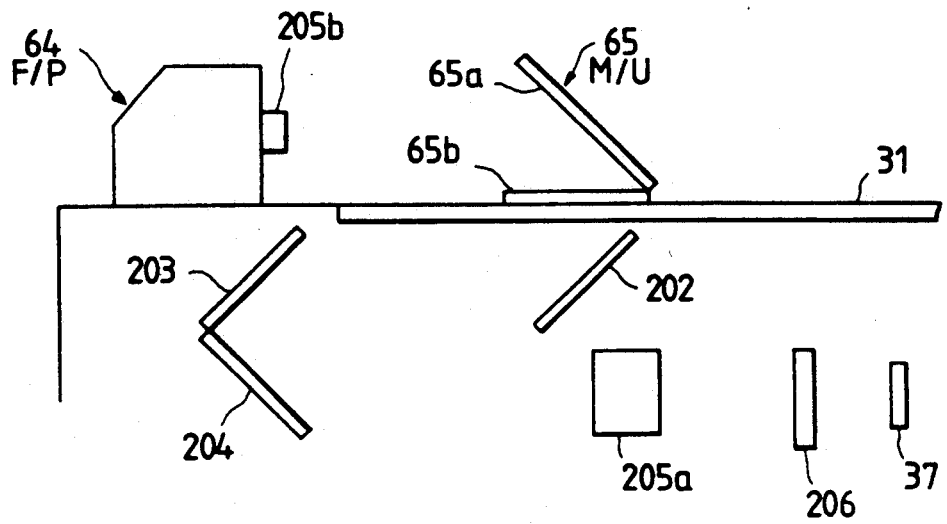
FIG. 32 a schematic diagram showing yet another embodiment of the present invention.

FIG. 32 shows a schematic illustration of a further embodiment of an image read device for a color copying machine according to the present invention. In the figure, like reference symbols are used for like or equivalent portions in the drawings of the previous embodiments, for simplicity.

As shown in FIG. 32, the F/P lens 205b is contained in the F/P 64. Since it is difficult to install the mirrors in the F/P main body, a mirror unit M/U 65 is provided outside the F/P main body. The mirror unit 65 includes a mirror 65a for directing a projection image from the F/P 64 toward the FRM 202, and a Fresnel lens 65b for collimating light beams reflected from the mirror 65a.

In the instant embodiment, there is no need of providing the hardware for F/P within the IIT 32. Accordingly, cost to manufacture the image read device 30 is reduced. Further, an OHP (overhead projector), for example, may be used in place of the F/P.

(III-2) Video Signal Processing System (A) Circuit Arrangement

Figure 33:
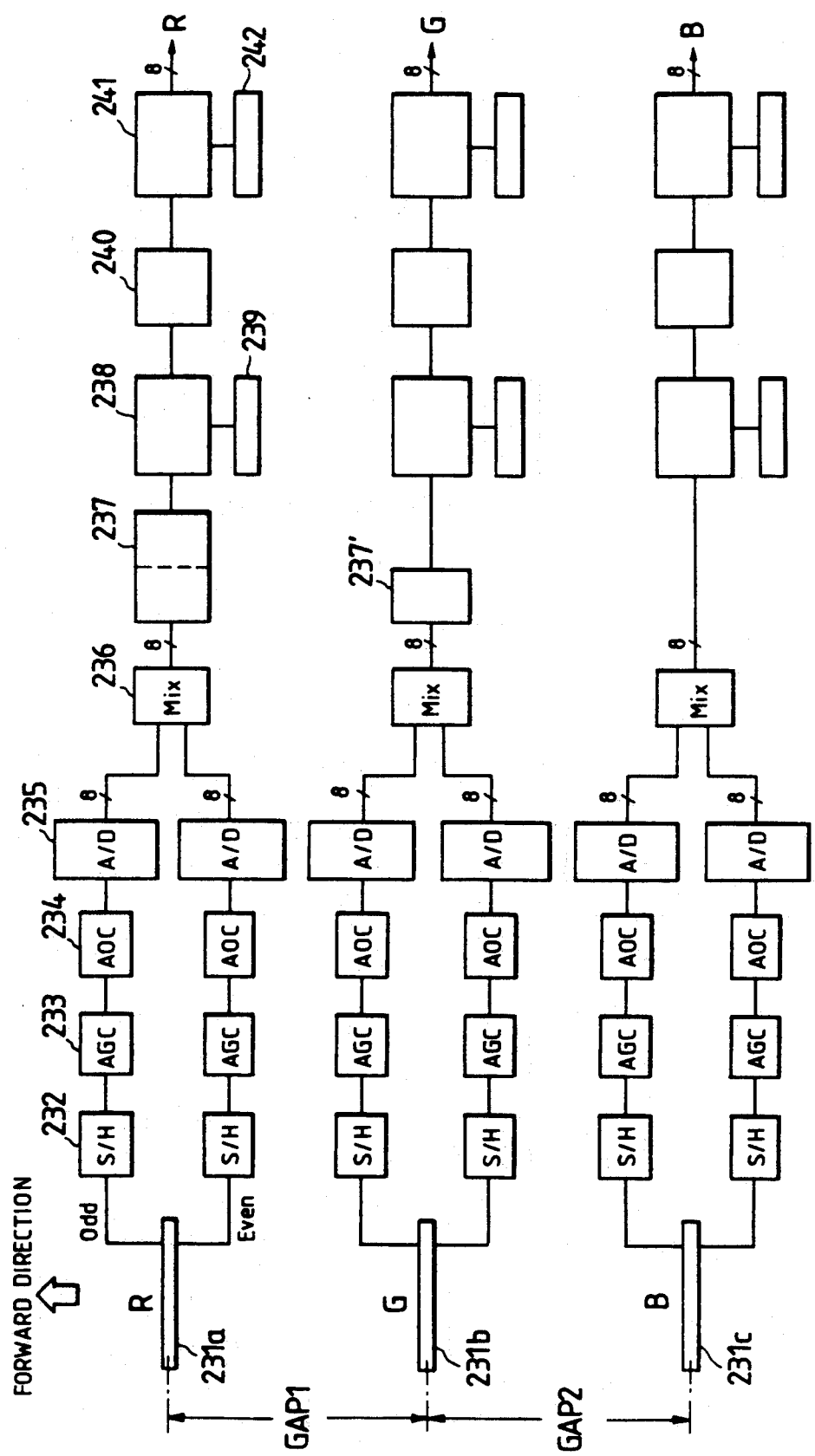
FIG. 33 is a block diagram showing a video signal processing circuit.
Figure 34:
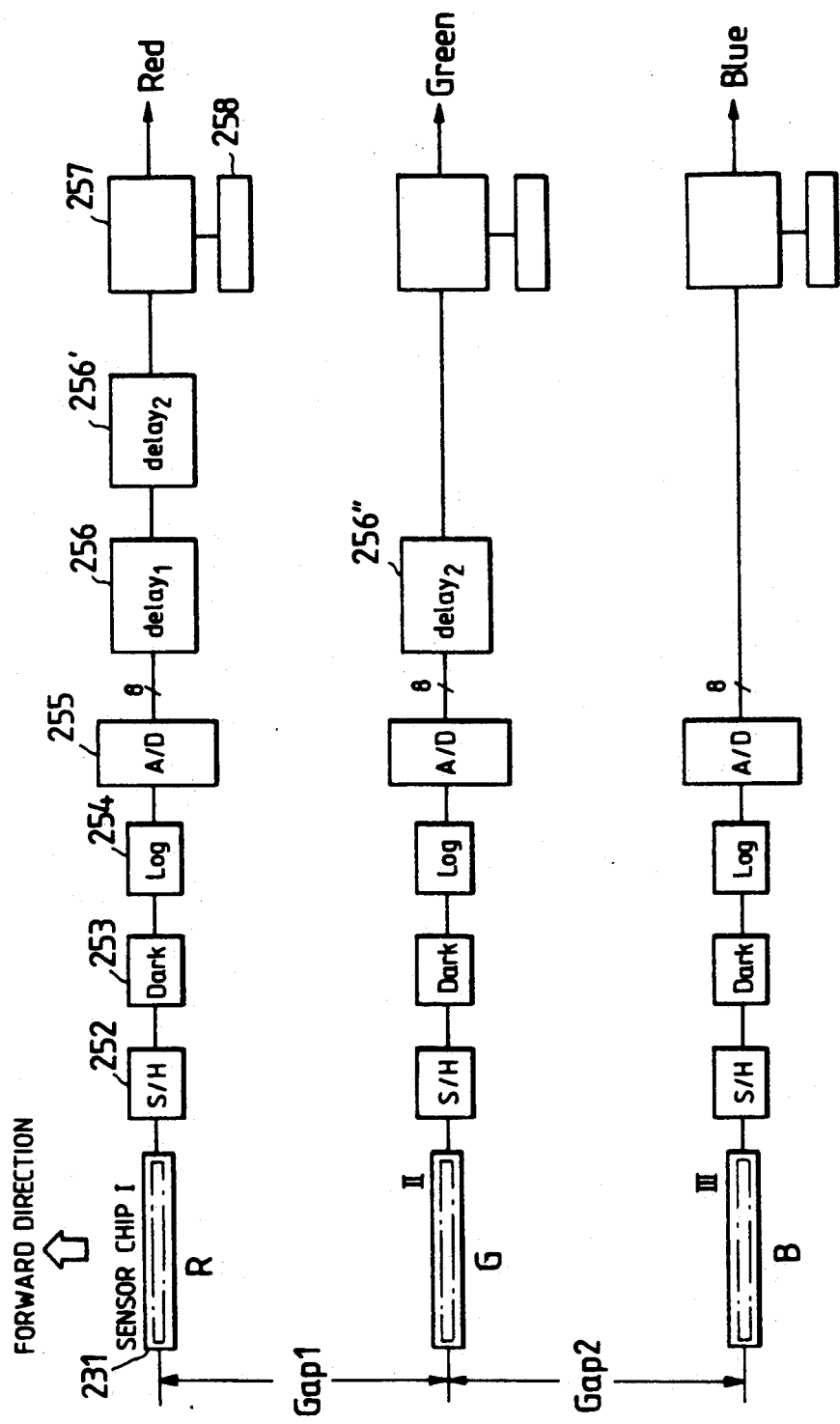
FIG. 34 is a block diagram showing another video processing circuit.

FIGS. 33 and 34 show circuit arrangements of video signal processing circuits.

In FIG. 33, the 3-color line-sequential sensor 231 is composed of a sensor 231a consisting of a linear array of picture elements (pixels) coupled with a color filter 231a of red (R) spectral sensitivity, a color filter 231b of green (G) spectral sensitivity, and a color filter 231c of blue (B) spectral sensitivity. The sensor 231 separates a video signal as obtained from light reflected by a color original into a trio of color signals of R, G and B, and outputs the color signals a signal representative of a train of even numbered pixels (Even) and a signal representative of a train of odd numbered pixles (Odd). The video signal processing circuit is comprised of sample/hold circuits 232, automatic gain control (AGC) circuits 233, automatic offset control (AOC) circuits 233, A/D (analog to digital)converters 235, mixers 236, gap correction memories 237 and 237', shading correction circuits 238 and 241, and log- conversion tables 240. In operation, the video signal processing circuit thus arranged receives analog vide signals output from the 3-color line-sequential sensor 231, and samples and holds them, makes gain and offset adjustments, converts the analog signals into digital signals, mixes the odd and even pixel signals, makes corrections of gap and shading, and converts luminance signals into density signals.

The gap correction memories 237 and 237', as line memories of the FIFO type, are provided for correcting gaps among linear arrays of pixels. As for the amount of correction, in case where a sampling density of the vertical scan direction is varied in accordance with a reduction/enlargement, an amount of the gap correction is adjusted in accordance with a variation of the sampling density. The signals of pixel trains as obtained through the preceding scanning of an original are stored. The signals of the respective pixel trains are synchronously output.

The log conversion table 240 is an LUT stored in a ROM, for example, and converts the reflecting signals into density signals, that is, converts the color separated signals as obtained from the light reflected by an original, into density signals of R, G, and B. The shading correction circuits 238 and 241 contain SRAMs 239 and 242, and are for making shading correction and image data input adjustment.

For the shading correction, reference data is stored in the SRAM, and the reference data is subtracted from input image data. This correction is applied for correcting deviation of the light intensity characteristic of the light source and characteristic deviation due to aging of the light source, characteristic deviations of the optical system due to smear on the reflecting mirrors and lenses, and variations in the sensitivities among the 3-color line- sequential sensor. Of the circuits for executing the shading correction, the shading correction circuit 238 is located at the preceding stage of the conversion table 240, and makes a correction of a dark level (output level when the fluorescent lamp is lit off). Another shading correction circuit 241 is located at the post-stage of the conversion table 240, and makes a correction of a read signal from a white reference board. To this end, the data level signal and the white reference board read data are stored as reference data in the SRAMs 239 and 242.

A video signal processing circuit shown in FIG. 34 is realized by a simplified circuit arrangement.

The video signal processing circuit of FIG. 34 uses such a 3-color line-sequential sensor 231 as to output for each channel a video signal in serial, without separating the read signal into the even pixel signal and the odd pixel signal. The sensor 231 is coupled with three circuit systems for the color separated pixel trains. Each circuit system includes a sample/hold circuit 252, dark processing circuit 253 for clamping a video signal at the reference dark level, log conversion circuit 254 for converting a video signal into a density signal, A/D converter 255 for converting an analog video signal into a digital signal, gap correction memory 256, 256', 256", and a shading correction circuit 257.

The gap correction memories 256, 256' and 256" have equal memory capacities. Let us consider a case that a gap length on the surface of an original is 875 $\mu$m, and the size of one pixel is 16 dots/mm, or 62.5 $\mu$m. In this case, the following number of scan lines must be interpolated $$875/62.5 = 14 \text{ lines.}$$

For 8 bits and 256 gradations, a required memory capacity of the gap correction memory 256" is $$8 \times 5000 \times 14 = 70 \text{ Kilo bytes.}$$

A memory capacity required for each of the gap correction memories 256 and 256' is two times that of the correction memory 256", 140 Kilo bytes for 28 lines. A memory capacity totally required for those memories is 210 Kilo bytes. For the white shading correction, data as read from a white object (white reference board) is prestored in the SRAM 258. The shading correction circuit 258 reads out the stored reference data of the memory, and subtracts the reference data from input image data.

(B) Operation

An operation of the video signal processing circuit thus arranged will be described in the line of flowing of an image signal.

The 3-color line-sequential sensor 231 reads an image on an original in terms of three colors of R, G and B, and separate each train of pixels into a train of even numbered pixels (Even) and a train of odd numbered pixels (Odd). Then, the sensor 231 sends those video signals representative of the pixel trains (Even and Odd) to the sample/hold circuit SH 232. The circuit SH 232 holds each video signal by a sample/hold pulse signal, to remove noise therefrom. The held vide signal is applied to the ADC 233 and the AOC 234 where its gain and offset are properly adjusted. Then, it is converted into a digital vide signal by the A/D converter 235. The pixel train signals of Even and Odd are composed by the mixer 236. To synchronize the image data, with respect to the preceding pixel train signal of those composite signals of R, G, and B, the remaining signals are delayed by times amounting to the gap by means of the gap correction memories 237 and 237'. Each image data signal is subjected to a dark level correction in the shading correction circuit 238. Then, it is converted into a density signal by the log conversion table 240. Then, it is subjected to a white level correction in the shading correction circuit 241.

In this instance, a color detect sample scan mode is used in addition to a copy scan mode as mentioned above. In the color detect sample scan mode, In the color detect sample scan mode, the IIT carriage is moved to a color detect designated point. After 50 ms, the density data as read from the original is written into the SRAM, and data of the designated pixels is transferred to a VCPU (not shown). The 50 ms is a period of time taken for a vibration of the carriage of the IIT 32 to settle down. An area to be read for the color detection is defined by five pixels as counted from a designated point in the main scan direction and five pixels in the subsidiary scan direction, in this instance. Pixel data of the pixel at a designated point and five consecutive pixels is stored in the SRAM, and then transferred to and stored in the RAM of the VCPU. The IIT carriage is further moved four times pulse by pulse, and the pixel data read of five points is read. The above sequence of operations is for the case of one designated point. In case where a plurality of designated points are present, the above sequence is performed for each of those designated points.

(C) Read Data Adjustment

The 3-color line-sequential sensor 231 reads image information contained in the light that is emitted from a light source and is reflected by an original. Accordingly, a level of a read signal depends on a reflectivity of the original. It becomes higher as the color on the original becomes white. Under a condition that the fluorescent light is being lit off, an output signal of the 3-color line-sequential sensor 231 is at the lowest level (output level at dark, or dark level). When this dark level is measured over a single chip, it is not uniform or varied. Usually, a white signal (read signal from the white reference board) and a black signal (output signal at dark) output from the sensor 231 are different for different channels and for different pixels in the channel.

It is the AGC 233 that adjusts a gain of the image data signal, to guarantee satisfactory gradation in the image read device using such a 3-color line-sequential sensor 231. It is the AOC 234 that shifts up the lowest dark level to a given level, thereby to guarantee satisfactory gradation. Accordingly, in this instance, for the AGC 256, the reference level of the A/D output signal is set at "200" for 256 gradations. The AGC 256 adjusts gains of the image data signals so that peak values of the white signals of the respective channels are set at this value. For the AOC 234, the reference level of the A/D output signal is set at "10" for 256 gradations. The AOC 234 adjusts an offset value so that the minimum value of the black signal is set at this value.

In the gain adjustment, image data read from the white reference board is written into the SRAM of the white shading circuit, for example. Afterwards, the VCPU samples the read data from the SRAM at preset pixel intervals, thereby to obtain a peak value of the white signal. The gain is adjusted so that the peak value reaches a given output level, e.g., 200 for 256 gradations.

In the offset adjustment, the log conversion table 240 is placed "through", and the at-dark output level is written into the SRAM of the white shading correction circuit. Then, the VCPU samples the read data from the SRAM at preset pixel intervals, thereby to obtain a minimum value of the data signal. The gain is adjusted so that the minimum value reaches a given output level, e.g., 10 for 256 gradations. In this way, when the minimum value is above the reference value of the A/D output level, it is decreased to the reference value. When it is below the reference level, it is increased up to the reference value.

In case where the A/D converter is such that for an input range from 0 to 2.5 V, the A/D converter converts an input signal to a digital signal of one byte, or 8 bits, of 0 to 255, if a level of the signal read from the white reference board is set at approximately 2.5 V, an accuracy of the original reading can be improved. Since the reflectivity of the white reference board is approximately 80%, if the read signal level is increased to about 2.3 V, it is saturated at bright white on the original. To avoid this, a level of a signal read from the white reference board is controlled so as to be about 2.0 V through the gain adjustment. This value is divided into 256 levels, for the conversion into digital signals. When the fluorescent lamp ages, an amount of light emitted from it decreases. Under this condition, the level of the signal read from the white reference board gradually decreases. Consequently, a resolution per bit is degraded.

The AGC 233 is also used to provide a fixed resolution in any situation. Where the level of the signal read from the white reference board is set at 2.0 V, for example, the AGC 233 controls the gain so as to keep this figure. Even in the chip whose sensor sensitivities are not uniform, the AGC 233 provides an optimum gain.

Use of only the gain adjustment and the offset adjustment fails to equalize the signal levels of the pixels and to prevent such phenomena that in the high density region, an image is made coarse or lines appears in the image. A $\Delta V$ dark correction (dark shading correction) is for correcting varied dark levels among the pixels. A white shading correction is for correcting varied white levels among the pixels.

In the $\Delta V$ dark correction, the log conversion table 240 is placed "through", and the at-dark output signal is written into the SRAM of the white shading correction circuit. Then, the VCPU reads out the data from the SRAM. This sequence of operations is repeated four times, and the data as obtained are multiplied to obtain an average value. The average value is written into the SRAM of the dark shading correction circuit.

Following the gain adjustment, offset adjustment, and $\Delta V$ dark correction, the machine is ready for entering a copying operation mode. In the copying operation mode, the log conversion table 240 is selected, and prior to the copy cycle, the machine executes a processing of writing the reference data into the SRAM of the white shading correction circuit. In this processing, after the gain adjustment, offset adjustment, and $\Delta V$ dark correction are executed, the white reference board is read and the read data is stored as reference data into the SRAM. The data as written into the SRAM is given by $$\log (D_W - D_D),$$

Where $D_W$ is the read data read from the white reference board, and $D_D$ is the correction data written into the SRAM of the dark shading correction circuit.

When the machine operation enters an actual copy cycle, original read data $D_X$ is first subjected to the $\Delta V$ dark correction in the dark shading correction circuit. Accordingly, input data to the white shading correction circuit is $$\log (D_X - D_D).$$

In the dark shading correction circuit, the reference data as stored in the SRAM is subtracted from the input data, as given below $$\log (D_X - D_D) - \log (D_W - D_D).$$

As the result of the corrections by the dark shading correction circuit and the white shading correction circuit, for the density signal, the following correction is carried out $$\log (D_X - D_D) - \log (D_W - D_D) = \log (D_X - D_D)/(D_W - D_D) = \log R.$$

For the reflecting signal, the following correction is carried out $$R = (D_X - D_D)/(D_W - D_D).$$

Thus, the $\Delta V$ dark correction, which is based on the black signal, is applied to the reflecting signal before its log conversion. The shading correction, which is based on the white signal, is applied to the density signal after its log conversion. In this way, the correction value is made small, and improves the correction efficiency. Such a correction processing that the correction data of one line is stored in the SRAM, and the data is subjected to a subtraction, allows use of a general full-adder IC, thereby simplifying arithmetic operations. Such a correction processing eliminates the need of constructing a hard logic divider using complicated and large scale circuits, which is essential to the conventional machine.

(III-3) IIT Control

The IIT remote has many functions, such as a sequence control for various copying operations, service support function, self-check function, and fail-safe function. The sequence control of the IIT consists of a normal scan, a sample scan, and an initialize. Various commands and parameters for the IIT control are sent from the SYS remote 71 by the serial communication.

In the normal scan, for the scan length data, paper size and magnification are set depending on figures 0 to 432 mm (in step of 1 mm). A scan speed is set depending on the magnification (50% to 400%). The prescan length data (distance from the stop position to the registration position) is also set depending on the magnification (50% to 400%).

In the normal scan, upon receipt of a scan command, the IIT remote lights on the fluorescent lamp by an FL-ON signal, and turns on the motor driver by an SCN-RDY signal, and starts a scan after a preset time. When the registration position is reached, an image area signal IMG-AREA goes low and keeps its logical state for a period of time amounting to a preset scan length. In synchronism with this, an IIT-PS signal is output to the IPS.

The sample scan is used for the color detection at the time of color change, a color balance correction when the F/P is used, and a shading correction. In this function of the sample scan, depending on the data of stop position from the registration position, moving speed, number of minute operations, and step intervals, the first and second carriages 207 and 209 are moved to a target position, and stopped there temporarily. After the minute operation is repeated several times, the carriages are stopped and sampling data are gathered.

In the function of the initialize by the IIT, when receiving a command from the SYS remote at the time of power on, the IIT remote checks the registration sensor, an operation of the imaging unit by the registration sensor, and corrects a home position of the imaging unit by the registration sensor.

In the video signal processing circuit shown in FIG. 34, the gap correction memories 256, 256', and 256" requires a total of 210 Kilo bytes. To obtain a signal for an enlargement copy by increasing a sampling density in the vertical scan direction, the memory capacity must be further increased in proportion to an increase of the sampling density. To set the magnification at 400%, a sampling density in the vertical scan direction is: $16 \times 4 = 64$ dots/mm. In this case, the required memory capacity is four times that for the 100% copy, viz., at least 840 kilo bytes.

Use of the color image read device comes in two varieties: one is for the full color read in which a so-called pictorial original, such as color photograph, picture, and printing material, is faithfully read, and the other is for a so-called functional read in which it is only needed to merely separate an optical color information into a total of eight colors, C, M, Y, R, G, B, K, and W, for example. The circuit arrangements shown in FIGS. 33 and 34 are applicable both for the full color read and the functional read.

(III-4) Control Flow in F/P Mode

An overall control flow of the color copying machine with the present embodiment, or the film projector, will be described.

Figure 35:
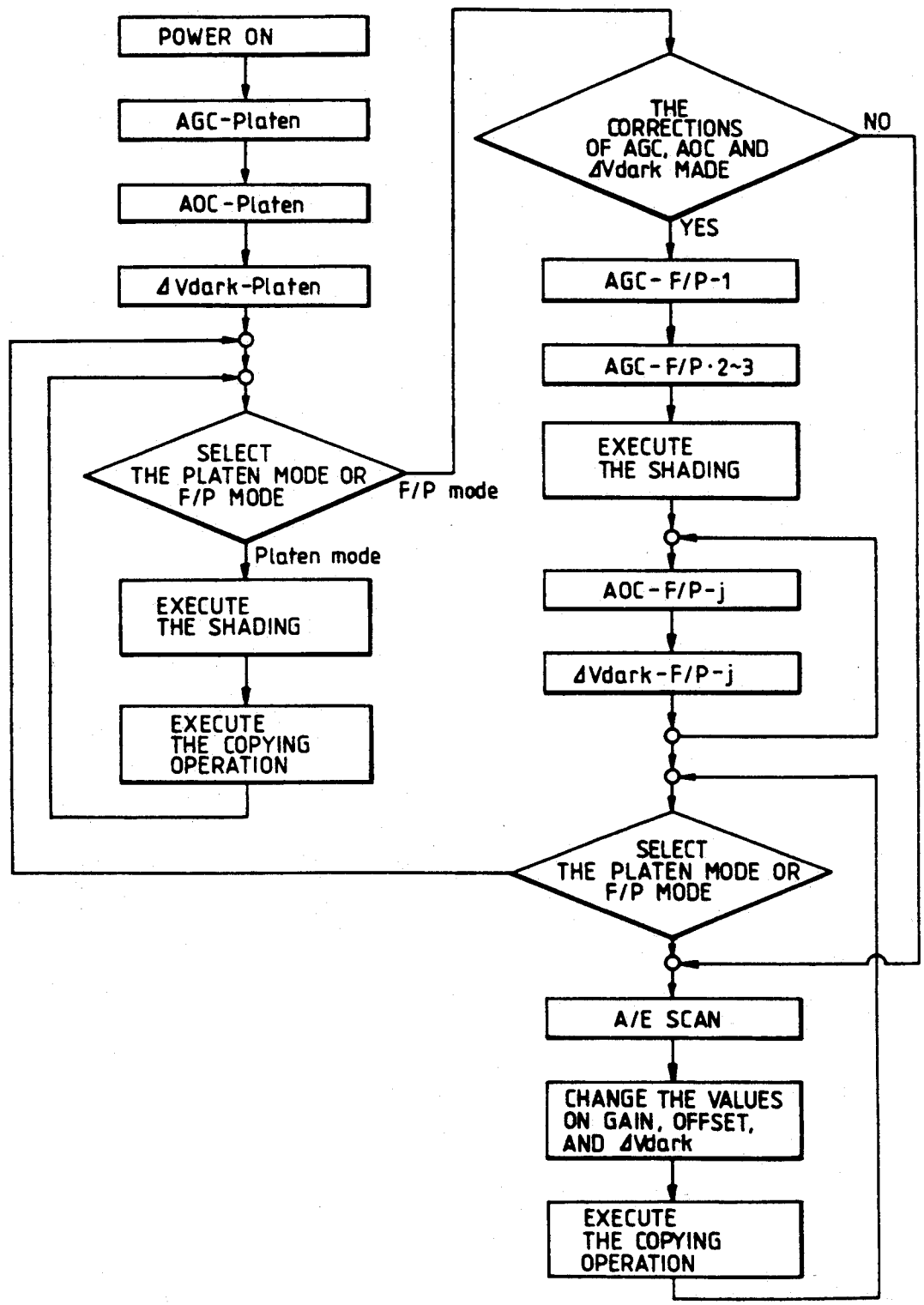
FIG. 35 is a flowchart showing a control flow of the color copying machine.

The control flow of the color copying machine is shown in FIG. 35.

In the figure, the power source of the copying machine is turned on. The imaging unit 37 is driven to make a prescan. Through the prescan, the AGC, AOC, and ΔV dark of the copying machine per se are corrected. The copying machine is set to the platen mode or the F/P mode. When the machine is set to the platen mode, the shading in the platen mode, and a copying operation are carried out. The copying machine then returns to the status of the mode setting.

When the copying machine is set to the F/P mode, if the AGC, AOC, and ΔV dark of the copying machine have not yet been corrected in this mode, the AGC, shading, AOC, and ΔV dark are corrected. Then, a mode of the color copying machine is set up. When the F/P mode is set up, the imaging unit 37 scans one time for the automatic density adjustment (A/E). Then, by the AGC and AOC, a gain of the amplifier and an offset value are changed to the corrected ones and the ΔV dark is also changed to the corrected one. Subsequently, a copying operation is performed. Finally, the copying machine returns to the mode setting status.

After the corrections of the AGC, AOC, and ΔV dark in the F/P mode are completed, if the platen mode is set up, the copying machine carries out the shading and copying operations in the platen mode.

When the copying machine is placed to the F/P mode, if the corrections of the AGC, AOC, and ΔV dark in this mode have already been made, the automatic density adjustment is instantly performed, and the copying machine is controlled in the previous manner.

(III-5) Operation Procedure in F/P Mode and Signal Timings

An operation procedure and timings of signals in the F/P mode will be described with reference to FIG. 36. In the figure, signals as indicated by broken lines may be used if required.

The F/P 64 is operated through the U/I 36 of the base machine 30. The machine machine is placed to the F/P mode by operating an F/P key as displayed on the screen of the display of the U/I 36.

Figure 36:
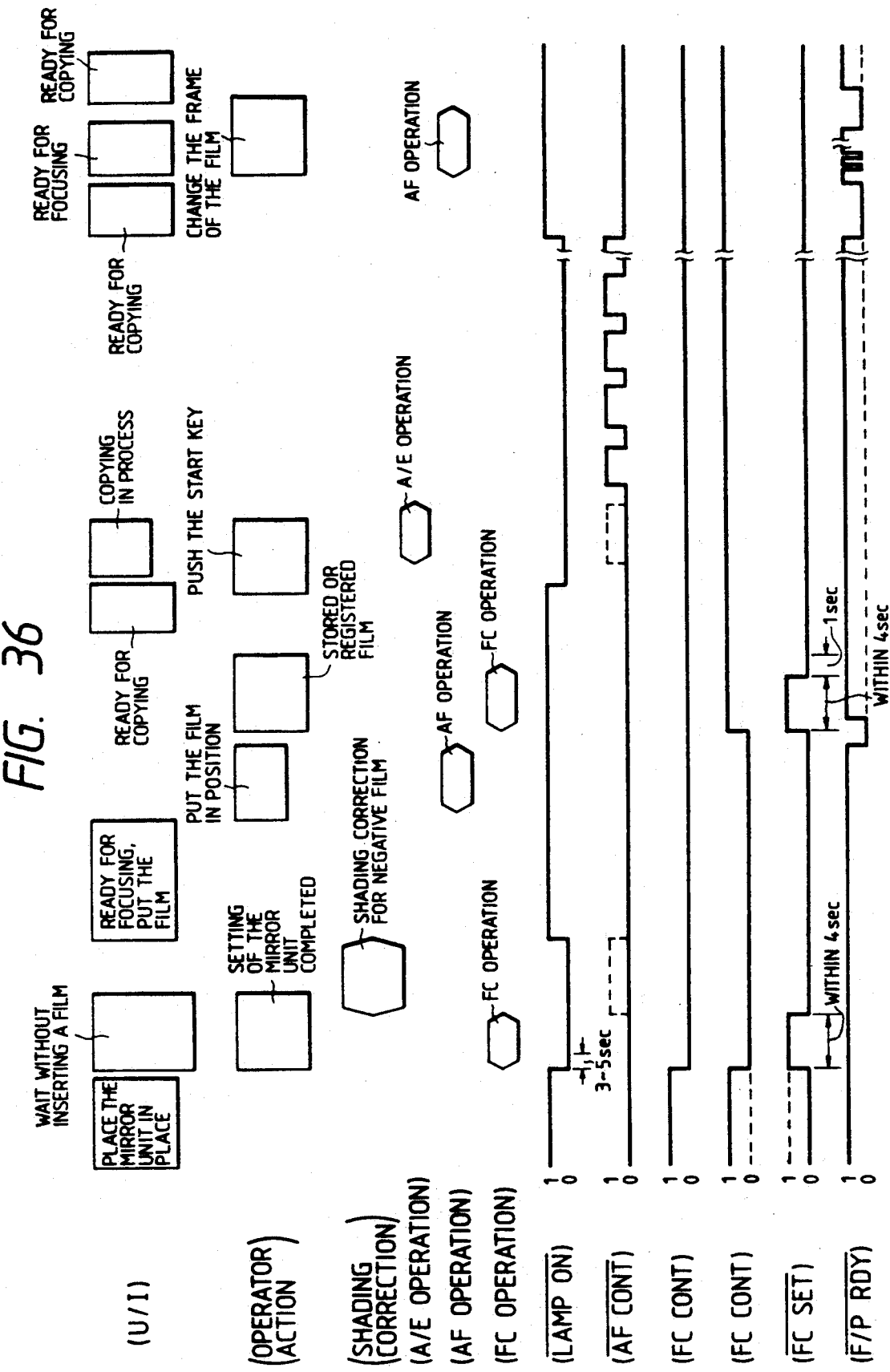
FIG. 36 is a diagram showing an operation procedure and signal timings when the color copying machine is in the F/P mode.

When the F/P key is operated, a message "Put the mirror unit in place" is displayed on the display screen of the U/I 36, as shown in FIG. 36. In accordance with the instruction, an operator opens the cover of the M/U 36, and sets the mirror unit at a preset location on the platen glass 31.

An M/U 65 set end key on the screen of the U/I 36 is operated. Then, a message "Please wait without inserting a film" is displayed. At this time, the lamp 613 lights on, and a correction filter control (FC CONT) signal becomes (0, 0) in logic level. And an FC operation, viz., a correction filter exchange operation, is performed. Also at the same time, a correction filter exchange (FC SET) signal goes high. The automatic filter exchange device operates to set the correction filter 635 for reversal film at the set position. In this way, when the shading data is gathered, the filter 635 is necessarily set at the set position irrespective of the type of a film as an original, a negative film and a reversal film.

When the correction filter 635 is set, the $\overline{\text{FC SET}}$ signal goes low. In such a situation that a preset period of time, e.g., 4 sec. has elapsed after the FC CONT signal become (0, 0), but the $\overline{\text{FC SET}}$ signal has not gone low, a message "Failure" or "Is power switch turned on ?" appears on the display screen.

After seeing the message, an operator recognizes that something is wrong with the machine or he failed to turn on the power switch.

When the $\overline{\text{FC SET}}$ signal has gone low, and the lamp 613 is lit on and its rise time, e.g., 3 to 5 sec., has elapsed, the work to gather shading data for shading correction starts. At the completion of the data gathering work, the display displays a message "Ready for focusing, and put the film", while at the same time the lamp 613 lights off. According to the instruction, the operator sets the film case 607 containing the film 633 to the F/P 64. Then, light from the light emitter 623 is reflected by the film 633, and the reflected light is detected by the photo receptor 624.

When a difference of an amount of the reflected light between two elements in the photo receptor is not zero (0) due to the fact that the film is incorrectly positioned, and distortion of the film, the motor 625 of the AF device operates to move a projection lens 610 so as to zero the difference. Through the operation, it is focused. In other words, the AF operation is performed. At the completion of the focusing operation, an F/P ready completion ($\overline{\text{F/P RDY}}$) signal goes low. Upon completion of the focusing operation, messages "Select the type of film" and "Select keys for the films" are displayed.

It is assumed that the original film 633 is one of the three types of films as already stated or a registered negative film.

When the key as marked with "Stored or registered film" is pressed, the FC CONT signal becomes (0, 1), and the $\overline{\text{FC SET}}$ signal goes high. Under this condition, the correction filter automatic exchange device operates to set the correction filter 636 for negative film at the operating position. Upon completion of the film setting, the $\overline{\text{FC SET}}$ signal goes low. After the $\overline{\text{FP RDY}}$ signal goes low and the $\overline{\text{FC SET}}$ signal goes low, one second elapses. Then, the display presents a message "Ready for copy".

After seeing the message, an operator pushes "Start key" on the display screen of the U/I 36. In turn, a message "Copy progresses" is displayed, and at the same time the lamp 613 lights on. After a rise time of the lamp 613, the work of gathering data for the automatic density adjustment, viz., the A/E operation, starts. Thus, the image reading unit 37 scans one time to read a part or the whole of a projection image, in order to collect the data for the density adjustment, color balance adjustment, γ correction, and the like.

In a full color copy mode, the imaging unit 37 scans four times to make the full color copy. In this case, the shading correction and the density adjustment are automatically performed on the basis of the shading data and the automatic density adjustment data. An END curve for the γ correction is selected depending on an amount of the density adjustment. For the density adjustment amount in which the data as read from a low density part on the film is treated as the effective pixel data, the curve (3) or (4) shown in FIG. 29 is selected. At the end of the copying operation, the lamp 613 lights off, and the message "Ready for copy" is displayed. Then, if the start key is pushed again, another copying operation starts.

To copy another image, the film is fed to another frame. At this time, the F/P RDY signal goes high, and the message "Ready for focusing" is presented on the screen. Then, a new frame of the film is set and the AF operation starts. After the AF operation is terminated, the F/P RDY signal goes low and the "Ready for copy" is displayed. Then, the start key is operated and the copying operation starts.

As seen from the foregoing description, according to the present invention, the platen lens and the F/P lens are provided separately. In the platen mode, the platen lens is used to focus an image on an original on the read sensor. In the F/P mode, the F/P lens is used. Thus, in reading an image, the lens exclusively provided for the read mode as selected can be used. Accordingly, in either mode, a single optical lens is used, to thereby improve the MTF.

What is claimed is:

1. An image read device for scanning an original in either of a platen mode or a film projector mode, comprising:
   a read sensor; and
   an optical scan mechanism disposed between the original and the read sensor, the optical scan mechanism including
   a plurality of mirrors for transmitting an optical image of the original to the read sensor along an optical axis,
   a first optical lens for focusing the optical image on the read sensor when the image read device is operating in the platen mode,
   a second optical lens for focusing the optical image on the read sensor when the image read device is operating in the film projector mode, the second optical lens having a fixed positional relationship with respect to the first optical lens, and
   lens positioning means for alternatively positioning the first optical lens and the second optical lens along the optical axis while maintaining the fixed positional relationship between the first optical lens and the second optical lens.

2. The image read device of claim 1, includes:
   means for positioning the first optical lens along the optical axis only when the image read device is operating in the platen mode; and
   means for positioning the second lens along the optical axis only when the image read device is operating in the film projector mode.

3. The image read device of claim 1, further comprising a correction filter unit.

4. The image read device of claim 3, wherein the correction filter unit includes filter support means for supporting the platen mode correction filter and the film projector mode correction filter to maintain the fixed positional relationship between the platen mode correction filter and the film projector mode correction filter.

5. The image read device of claim 4, wherein the platen mode correction filter and the film projector mode correction filter are vertically disposed in the filter support means, the first platen mode correction filter being disposed at a top position.

6. The image read device of claim 3, wherein the correction filter unit includes
   a platen mode correction filter, and
   a film projector mode correction filter, the film projector mode correction filter having a fixed positional relationship with respect to the platen mode correction filter.

7. The image read device of claim 6, wherein the correction filter unit includes filter positioning means for alternatively positioning the platen mode correction filter and the film projector mode correction filter along the optical axis.

8. The image read device of claim 7, wherein the filter positioning means includes:
   means for positioning the platen mode correction filter along the optical axis only when the image read device is operating in the platen mode; and
   means for positioning the film projector mode correction filter along the optical axis only when the image read device is operating in the film projector mode.

9. The image read device of claim 6, wherein the film projector mode correction filter includes a negative film correction filter and a reversal film correction filter.

10. The image read device of claim 9, wherein the correction filter unit includes filter positioning means for alternatively positioning the platen mode correction filter, the negative film projector mode filter, and the reversal film correction filter along the optical axis.

11. The image read device of claim 10, wherein the filter positioning means includes:
    means for positioning the platen mode correction filter along the optical axis only when the image read device is in the platen mode;
    means for positioning the negative film correction filter along the optical axis only when the image read device is operating in the film projector mode and the original is a negative film; and
    means for positioning the reversal film correction filter is positioned along the optical axis only when the image read device is operating in the film projector mode and the original is a reversal film.

12. The image read device of claim 1, wherein a last one of the plurality of mirrors transmits the optical signal to the read sensor along the optical axis.

13. The image read device of claim 12, wherein the lens positioning means includes lens support means for supporting the first optical lens and the second optical lens to maintain the fixed positional relationship between the first optical lens and the second optical lens.

14. The image read device of claim 13, wherein the lens positioning means further includes lens support drive means for driving the lens support means in a predetermined direction to alternatively position the first optical lens and the second optical lens along the optical axis while maintaining the fixed positional relationship between the first optical lens and the second optical lens.

15. The image read device of claim 14, wherein the predetermined direction is oblique to the optical axis.

16. The image read device of claim 14, wherein the lens support drive means includes guide member means for guiding the lens support means in the predetermined direction while the lens support means is being driven by the lens support drive means.

17. The image read device of claim 14, wherein the lens support drive means further includes
    first position stopper means for stopping movement of the lens support means when the first and second optical lenses are positioned at respective first preset positions corresponding to the platen mode, and
    second position stopper means for stopping movement of the lens support means when the first and second optical lenses are positioned at respective second preset positions corresponding to the film projector mode.

* * * * *